United States Patent
Weaver et al.

(10) Patent No.: US 11,511,546 B2
(45) Date of Patent: *Nov. 29, 2022

(54) LOGIC CIRCUITRY PACKAGE

(71) Applicant: HEWLETT-PACKARD DEVELOPMENT COMPANY, L.P., Spring, TX (US)

(72) Inventors: Quinton B. Weaver, Corvallis, OR (US); Anthony D. Studer, Corvallis, OR (US); David N. Olsen, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 341 days.

This patent is subject to a terminal disclaimer.

(21) Appl. No.: 16/768,228

(22) PCT Filed: Oct. 25, 2019

(86) PCT No.: PCT/US2019/057989
§ 371 (c)(1),
(2) Date: May 29, 2020

(87) PCT Pub. No.: WO2020/117393
PCT Pub. Date: Jun. 11, 2020

(65) Prior Publication Data
US 2021/0213748 A1  Jul. 15, 2021

Related U.S. Application Data

(63) Continuation-in-part of application No. PCT/US2019/026133, filed on Apr. 5, 2019, and a
(Continued)

(51) Int. Cl.
*B41J 2/175* (2006.01)
*B41J 2/045* (2006.01)
(Continued)

(52) U.S. Cl.
CPC ......... *B41J 2/17546* (2013.01); *B29C 64/259* (2017.08); *B33Y 30/00* (2014.12);
(Continued)

(58) Field of Classification Search
CPC ............... B41J 2/17546; B41J 2/04508; B41J 2/04541; B41J 2/04546; B41J 2/04563;
(Continued)

(56) References Cited

U.S. PATENT DOCUMENTS

| | | |
|---|---|---|
| 3,109,125 A | 10/1963 | Wachowiak |
| 3,553,483 A | 1/1971 | Jarvis |

(Continued)

FOREIGN PATENT DOCUMENTS

| | | |
|---|---|---|
| AU | 2014202104 A1 | 5/2014 |
| CA | 2507422 A1 | 1/2002 |

(Continued)

OTHER PUBLICATIONS

Arnostech, "Thermal Inkjet Printers," http://www.arnostech.com/machines/coding-systems/thermal-inkjet-printers/, retrieved Jul. 1, 2019, 3 pgs.
(Continued)

*Primary Examiner* — Paul R. Myers
(74) *Attorney, Agent, or Firm* — Dicke, Billig & Czaja, PLLC

(57) ABSTRACT

A logic circuitry package for a replaceable print apparatus component includes an interface to communicate with a print apparatus logic circuit, and at least one logic circuit to transmit, via the interface, a sensor ID parameter and a limit parameter, the sensor ID parameter indicating a first sensor ID. The logic circuit is to receive, via the interface, a first request corresponding to the first sensor ID with the component connected to the apparatus and the apparatus not pneumatically actuating the component. The logic circuit is
(Continued)

to transmit, via the interface, a first digital value in response to the first request. The logic circuit is to receive, via the interface, a second request corresponding to the first sensor ID with the component connected to the apparatus and the apparatus pneumatically actuating the component. The logic circuit is to transmit, via the interface, a second digital value in response to the second request. A difference between the first digital value and the second digital value is greater than the limit parameter.

22 Claims, 27 Drawing Sheets

Related U.S. Application Data continuation-in-part of application No. PCT/US2019/026152, filed on Apr. 5, 2019, and a continuation-in-part of application No. PCT/US2019/026161, filed on Apr. 5, 2019, and a continuation-in-part of application No. PCT/US2018/063631, filed on Dec. 3, 2018.

(51) Int. Cl.
| | |
|---|---|
| *G06F 13/42* | (2006.01) |
| *G06F 21/44* | (2013.01) |
| *G06F 1/12* | (2006.01) |
| *G06F 1/08* | (2006.01) |
| *H03K 19/0175* | (2006.01) |
| *B33Y 30/00* | (2015.01) |
| *B29C 64/259* | (2017.01) |
| *G06F 3/12* | (2006.01) |
| *G01F 23/24* | (2006.01) |
| *G01F 23/80* | (2022.01) |

(52) U.S. Cl.
CPC ......... *B41J 2/0458* (2013.01); *B41J 2/04508* (2013.01); *B41J 2/04541* (2013.01); *B41J 2/04546* (2013.01); *B41J 2/04563* (2013.01); *B41J 2/04586* (2013.01); *B41J 2/1753* (2013.01); *B41J 2/17513* (2013.01); *B41J 2/17526* (2013.01); *B41J 2/17566* (2013.01); *G01F 23/247* (2013.01); *G01F 23/802* (2022.01); *G01F 23/804* (2022.01); *G06F 1/08* (2013.01); *G06F 1/12* (2013.01); *G06F 3/121* (2013.01); *G06F 13/4291* (2013.01); *G06F 21/44* (2013.01); *H03K 19/017509* (2013.01); *G06F 13/42* (2013.01); *G06F 2213/0016* (2013.01)

(58) Field of Classification Search
CPC .. B41J 2/0458; B41J 2/04586; B41J 2/17513; B41J 2/1753; B41J 2/17566; B33Y 30/00; B29C 64/259; G01F 23/804; G01F 23/802; G01F 23/247; G06F 1/08; G06F 1/12; G06F 3/112; G06F 3/121; G06F 13/4291; G06F 21/44; H03K 18/017509; H03K 19/017509
USPC ......................................................... 702/122
See application file for complete search history.

(56) References Cited

U.S. PATENT DOCUMENTS

| | | |
|---|---|---|
| 3,614,576 A | 10/1971 | Raphael |
| 4,074,284 A | 2/1978 | Dexter et al. |
| 4,503,441 A | 3/1985 | Tamukai |
| 4,506,276 A | 3/1985 | Kyser et al. |
| 4,639,738 A | 1/1987 | Young et al. |
| 4,734,787 A | 3/1988 | Hayashi |
| 5,001,596 A | 3/1991 | Hart |
| 5,045,811 A | 9/1991 | Lewis |
| 5,079,570 A | 1/1992 | Mohr et al. |
| 5,142,909 A * | 9/1992 | Baughman ............ G01F 23/266 73/304 C |
| 5,329,254 A | 7/1994 | Takano |
| 5,438,351 A | 8/1995 | Trenchard et al. |
| 5,471,176 A | 11/1995 | James et al. |
| 5,583,544 A | 12/1996 | Stamer et al. |
| 5,680,960 A | 10/1997 | Keyes et al. |
| 5,682,184 A | 10/1997 | Stephany et al. |
| 5,699,091 A | 12/1997 | Bullock et al. |
| 5,731,824 A | 3/1998 | Kneezel et al. |
| 5,751,323 A | 5/1998 | Swanson |
| 5,757,406 A | 5/1998 | Kaplinsky et al. |
| 5,777,646 A | 7/1998 | Barinaga et al. |
| 5,788,388 A | 8/1998 | Cowger et al. |
| 5,861,780 A | 1/1999 | Fukuda |
| 5,975,688 A | 11/1999 | Kanaya et al. |
| 6,068,363 A | 5/2000 | Saito |
| 6,098,457 A | 8/2000 | Poole |
| 6,151,039 A | 11/2000 | Hmelar et al. |
| 6,164,766 A | 12/2000 | Erickson |
| 6,175,929 B1 | 1/2001 | Hsu et al. |
| 6,219,933 B1 | 4/2001 | Taniguchi et al. |
| 6,299,273 B1 | 10/2001 | Anderson et al. |
| 6,312,074 B1 | 11/2001 | Walker |
| 6,341,853 B1 | 1/2002 | Scheffelin et al. |
| 6,386,693 B1 | 5/2002 | Michele |
| 6,402,299 B1 | 6/2002 | DeMeerleer |
| 6,412,901 B2 | 7/2002 | Su et al. |
| 6,431,670 B1 * | 8/2002 | Schantz ............ B41J 2/17509 347/7 |
| 6,456,802 B1 | 9/2002 | Phillips |
| 6,457,355 B1 | 10/2002 | Philipp |
| 6,494,553 B1 | 12/2002 | Donahue et al. |
| 6,494,568 B2 | 12/2002 | Hou et al. |
| 6,598,963 B1 | 7/2003 | Yamamoto et al. |
| 6,641,240 B2 | 11/2003 | Hsu et al. |
| 6,641,243 B2 | 11/2003 | Anderson et al. |
| 6,648,434 B2 | 11/2003 | Walker et al. |
| 6,685,290 B1 | 2/2004 | Farr et al. |
| 6,736,497 B2 | 5/2004 | Jung |
| 6,796,644 B1 | 9/2004 | Anderson, Jr. et al. |
| 6,802,581 B2 | 10/2004 | Hasseler et al. |
| 6,802,602 B2 | 10/2004 | Sakai et al. |
| 6,811,250 B2 | 11/2004 | Buchanan et al. |
| 6,902,256 B2 | 6/2005 | Anderson et al. |
| 6,908,179 B2 | 6/2005 | Pan et al. |
| 6,959,599 B2 | 11/2005 | Feldstein et al. |
| 6,966,222 B2 | 11/2005 | Carson et al. |
| 6,969,137 B2 | 11/2005 | Maeda |
| 7,039,734 B2 | 5/2006 | Sun et al. |
| 7,077,506 B2 | 7/2006 | Chen |
| 7,155,972 B2 | 1/2007 | Kosugi |
| 7,171,323 B2 * | 1/2007 | Shipton ................ G06F 21/554 331/1 R |
| 7,240,130 B2 | 7/2007 | Larson |
| 7,260,662 B2 | 8/2007 | Moriwaki et al. |
| 7,328,115 B2 | 2/2008 | Shipton et al. |
| 7,380,042 B2 | 5/2008 | Wang et al. |
| 7,458,656 B2 | 12/2008 | Smith |
| 7,533,960 B2 | 5/2009 | Yasuda et al. |
| 7,547,082 B2 | 6/2009 | Lee et al. |
| 7,630,304 B2 | 12/2009 | Larson et al. |
| 7,686,423 B2 | 3/2010 | Sato et al. |
| 7,740,347 B2 | 6/2010 | Silverbrook et al. |
| 7,775,638 B2 | 8/2010 | Hirosawa et al. |
| 7,841,712 B2 | 11/2010 | Muyskens et al. |
| 7,886,197 B2 | 2/2011 | Wegman |
| 7,890,690 B2 | 2/2011 | Naderi et al. |
| 7,970,042 B2 | 6/2011 | Lexmark |
| 8,040,215 B2 | 10/2011 | Zakriti |
| 8,161,224 B2 | 4/2012 | Laurencin et al. |
| 8,215,018 B2 | 7/2012 | Morita et al. |
| 8,220,910 B2 | 7/2012 | Wanibe |
| 8,224,602 B2 | 7/2012 | Lory et al. |
| 8,289,788 B2 | 10/2012 | Asauchi |

(56) References Cited

U.S. PATENT DOCUMENTS

| | | | |
|---|---|---|---|
| 8,331,581 B2 | 12/2012 | Pennock | |
| 8,348,377 B2 | 1/2013 | Asauchi | |
| 8,350,628 B1 | 1/2013 | George et al. | |
| 8,364,859 B2 | 1/2013 | Sato | |
| 8,386,657 B2 | 2/2013 | Adkins et al. | |
| 8,393,718 B2 | 3/2013 | Kida et al. | |
| 8,393,721 B2 | 3/2013 | Katoh et al. | |
| 8,429,437 B2 | 4/2013 | Asauchi | |
| 8,432,421 B2 | 4/2013 | Muraki et al. | |
| 8,438,919 B2 | 5/2013 | Phillips et al. | |
| 8,454,137 B2 | 6/2013 | Price et al. | |
| 8,556,394 B2 | 10/2013 | Chen | |
| 8,558,577 B1 | 10/2013 | Soriano Fosas et al. | |
| 8,562,091 B2 | 10/2013 | Sabanovic et al. | |
| 8,591,012 B2 | 11/2013 | Yoshino et al. | |
| 8,608,276 B2 | 12/2013 | Oohashi et al. | |
| 8,621,116 B2 | 12/2013 | Fister et al. | |
| 8,651,614 B2 | 2/2014 | Sakamoto et al. | |
| 8,651,643 B2 | 2/2014 | Harvey et al. | |
| 8,721,059 B2 | 5/2014 | Kodama et al. | |
| 8,721,203 B2 | 5/2014 | Ehrhardt, Jr. | |
| 8,752,943 B2 | 6/2014 | Hirano et al. | |
| 8,864,277 B2 | 10/2014 | Rice et al. | |
| 8,876,257 B2 | 11/2014 | Harada et al. | |
| 8,888,207 B2 | 11/2014 | Furness, III et al. | |
| 8,892,798 B2 | 11/2014 | Tailliet et al. | |
| 8,898,358 B2 | 11/2014 | DeCesaris et al. | |
| 8,978,487 B2 | 3/2015 | Fergusson et al. | |
| 8,990,467 B2 | 3/2015 | Saito | |
| 9,079,414 B2 | 7/2015 | Lester et al. | |
| 9,108,448 B1 | 8/2015 | Bergstedt | |
| 9,132,656 B2 | 9/2015 | Nicholson, III et al. | |
| 9,137,093 B1 | 9/2015 | Abraham et al. | |
| 9,176,921 B2 | 11/2015 | Fister et al. | |
| 9,194,734 B2 | 11/2015 | Mehrer | |
| 9,213,396 B1 | 12/2015 | Booth et al. | |
| 9,213,927 B1 | 12/2015 | Ahne et al. | |
| 9,254,661 B2 | 2/2016 | Otaka et al. | |
| 9,298,908 B1 | 3/2016 | Booth et al. | |
| 9,370,934 B2 | 6/2016 | Asauchi et al. | |
| 9,400,204 B2 | 7/2016 | Schoenberg | |
| 9,413,356 B1 | 8/2016 | McKinley | |
| 9,413,359 B2 | 8/2016 | Stirk | |
| 9,454,504 B2 | 9/2016 | Evans | |
| 9,483,003 B2 | 11/2016 | Thacker, III | |
| 9,487,017 B2 | 11/2016 | Ge et al. | |
| 9,496,884 B1 | 11/2016 | Azenkot et al. | |
| 9,511,596 B2 | 12/2016 | Anderson et al. | |
| 9,561,662 B2 | 2/2017 | Ward et al. | |
| 9,582,443 B1 | 2/2017 | Switzer et al. | |
| 9,599,500 B2 | 3/2017 | Ge et al. | |
| 9,619,663 B2 | 4/2017 | Refstrup | |
| 9,671,820 B2 | 6/2017 | Maruyama et al. | |
| 9,734,121 B2 | 8/2017 | Pitigoi-Aron et al. | |
| 9,738,087 B2 | 8/2017 | Kato et al. | |
| 9,746,799 B2 | 8/2017 | Jeran | |
| 9,770,914 B2 | 9/2017 | Harvey et al. | |
| 9,776,412 B2 | 10/2017 | Ge et al. | |
| 9,789,697 B1 | 10/2017 | Knierim et al. | |
| 9,796,178 B2 | 10/2017 | Maxfield | |
| 9,852,282 B2 | 12/2017 | Jeran et al. | |
| 9,876,794 B2 | 1/2018 | Adkins et al. | |
| 9,895,917 B2 | 2/2018 | Corvese et al. | |
| 9,914,306 B2 | 3/2018 | Jeran | |
| 9,922,276 B2 | 3/2018 | Fister et al. | |
| 9,994,036 B2 | 6/2018 | Angulo Navarro et al. | |
| 10,031,882 B2 | 7/2018 | Srivastava et al. | |
| 10,052,878 B2 | 8/2018 | Benneton | |
| 10,107,667 B2 | 10/2018 | Cumbie et al. | |
| 10,146,608 B2* | 12/2018 | Giovannini | G06F 11/073 |
| 10,155,379 B2* | 12/2018 | Ng | B41J 2/14072 |
| 10,214,018 B2 | 2/2019 | Nozawa et al. | |
| 10,214,019 B2 | 2/2019 | Campbell-Brown et al. | |
| 10,259,230 B2 | 4/2019 | Asauchi | |
| 10,279,594 B2* | 5/2019 | Horade | B41J 2/17513 |
| 10,338,838 B2 | 7/2019 | Olarig | |
| 10,412,461 B2 | 9/2019 | Long et al. | |
| 10,471,725 B2 | 11/2019 | Esterberg et al. | |
| 10,875,318 B1 | 12/2020 | Gardner et al. | |
| 10,894,423 B2 | 1/2021 | Gardner et al. | |
| 11,034,157 B2 | 6/2021 | Gardner et al. | |
| 11,312,146 B2* | 4/2022 | Weaver | B41J 2/04586 |
| 11,345,158 B2* | 5/2022 | Weaver | G01F 23/247 |
| 11,351,791 B2* | 6/2022 | Gardner | B41J 2/17566 |
| 2001/0029554 A1 | 10/2001 | Namba | |
| 2001/0033316 A1 | 10/2001 | Eida | |
| 2002/0012016 A1 | 1/2002 | Wilson et al. | |
| 2002/0012616 A1 | 1/2002 | Zhou et al. | |
| 2002/0033855 A1 | 3/2002 | Kubota et al. | |
| 2002/0109761 A1 | 8/2002 | Shimizu et al. | |
| 2002/0126164 A1 | 9/2002 | Walker et al. | |
| 2002/0129650 A1 | 9/2002 | Zimmermann | |
| 2002/0154181 A1 | 10/2002 | Kubota et al. | |
| 2003/0009595 A1 | 1/2003 | Collins | |
| 2003/0018300 A1 | 1/2003 | Duchon et al. | |
| 2003/0071862 A1 | 4/2003 | Tsukada et al. | |
| 2003/0202024 A1 | 10/2003 | Corrigan | |
| 2004/0021711 A1 | 2/2004 | Hasseler | |
| 2004/0036733 A1 | 2/2004 | Kubota et al. | |
| 2004/0085382 A1 | 5/2004 | Kosugi et al. | |
| 2004/0155913 A1 | 8/2004 | Kosugi et al. | |
| 2004/0252146 A1 | 12/2004 | Naka et al. | |
| 2005/0010910 A1 | 1/2005 | Lindhorst et al. | |
| 2005/0093910 A1 | 5/2005 | Im | |
| 2005/0125105 A1 | 6/2005 | Halstead et al. | |
| 2005/0126282 A1 | 6/2005 | Maatuk | |
| 2005/0185595 A1 | 8/2005 | Lee | |
| 2005/0229699 A1 | 10/2005 | Chai et al. | |
| 2006/0007253 A1 | 1/2006 | Kosugi | |
| 2006/0007295 A1 | 1/2006 | Ueda | |
| 2006/0072952 A1 | 4/2006 | Walmsley | |
| 2006/0110199 A1 | 5/2006 | Walmsley et al. | |
| 2006/0181583 A1 | 8/2006 | Usuda | |
| 2006/0181719 A1 | 8/2006 | Aoki et al. | |
| 2006/0221386 A1 | 10/2006 | Brooks et al. | |
| 2006/0244795 A1 | 11/2006 | Hayasaki et al. | |
| 2006/0268030 A1 | 11/2006 | Walmsley et al. | |
| 2006/0274103 A1 | 12/2006 | Kim | |
| 2006/0290723 A1 | 12/2006 | Jeong et al. | |
| 2007/0024650 A1 | 2/2007 | Reinten et al. | |
| 2007/0068249 A1 | 3/2007 | Eguchi et al. | |
| 2007/0088816 A1 | 4/2007 | Hrustemovic et al. | |
| 2007/0115307 A1 | 5/2007 | Smith | |
| 2007/0146409 A1 | 6/2007 | Kubota et al. | |
| 2007/0247497 A1 | 10/2007 | Buchanan et al. | |
| 2008/0024555 A1 | 1/2008 | Kimura | |
| 2008/0041152 A1 | 2/2008 | Schoenberg | |
| 2008/0107151 A1 | 5/2008 | Khadkikar et al. | |
| 2008/0129779 A1 | 6/2008 | Walmsley et al. | |
| 2008/0143476 A1 | 6/2008 | Cheung et al. | |
| 2008/0165232 A1 | 7/2008 | Yuen | |
| 2008/0192074 A1 | 8/2008 | Dubois et al. | |
| 2008/0211838 A1 | 9/2008 | Zhang | |
| 2008/0246626 A1 | 10/2008 | Sheafor et al. | |
| 2008/0298455 A1 | 12/2008 | Ilia et al. | |
| 2008/0307134 A1 | 12/2008 | Geissler et al. | |
| 2009/0013779 A1 | 1/2009 | Usui | |
| 2009/0021766 A1 | 1/2009 | Yamazaki | |
| 2009/0177823 A1 | 7/2009 | Chao | |
| 2009/0179678 A1 | 7/2009 | Hardin | |
| 2009/0290005 A1 | 11/2009 | Wanibe | |
| 2009/0309941 A1 | 12/2009 | Price | |
| 2010/0082271 A1 | 4/2010 | McCann et al. | |
| 2010/0138745 A1 | 6/2010 | McNamara | |
| 2010/0205350 A1 | 8/2010 | Bryant-Rich | |
| 2010/0220128 A1 | 9/2010 | Zaba | |
| 2010/0248208 A1 | 9/2010 | Okubo et al. | |
| 2010/0254202 A1 | 10/2010 | Asauchi | |
| 2010/0257327 A1 | 10/2010 | Kosugi | |
| 2010/0306431 A1 | 12/2010 | Adkins et al. | |
| 2011/0009938 A1 | 1/2011 | Dowling | |
| 2011/0029705 A1 | 2/2011 | Evans | |
| 2011/0050793 A1 | 3/2011 | Kumagai et al. | |
| 2011/0087914 A1 | 4/2011 | Files et al. | |

(56) References Cited

U.S. PATENT DOCUMENTS

| | | |
|---|---|---|
| 2011/0113171 A1 | 5/2011 | Radhakrishnan et al. |
| 2011/0131441 A1 | 6/2011 | Asauchi |
| 2011/0279530 A1 | 11/2011 | Love |
| 2011/0285027 A1 | 11/2011 | Lee |
| 2012/0128379 A1 | 5/2012 | Takeda |
| 2012/0243559 A1 | 9/2012 | Pan et al. |
| 2012/0284429 A1 | 11/2012 | Adkins et al. |
| 2012/0299989 A1* | 11/2012 | Prothon ............... B41J 2/17596 347/6 |
| 2013/0018513 A1 | 1/2013 | Ecobee |
| 2013/0054933 A1 | 2/2013 | Fister |
| 2013/0067015 A1 | 3/2013 | Vasters |
| 2013/0067016 A1 | 3/2013 | Adkins |
| 2013/0155142 A1 | 6/2013 | Browning et al. |
| 2013/0250024 A1 | 9/2013 | Kakishima |
| 2013/0295245 A1 | 11/2013 | Gardner |
| 2014/0040517 A1 | 2/2014 | Fister et al. |
| 2014/0095750 A1 | 4/2014 | Tailliet |
| 2014/0164660 A1 | 6/2014 | DeCesaris et al. |
| 2014/0211241 A1 | 7/2014 | Rice et al. |
| 2014/0260520 A1 | 9/2014 | Schoenberg |
| 2014/0265049 A1 | 9/2014 | Burris et al. |
| 2014/0337553 A1 | 11/2014 | Du et al. |
| 2014/0351469 A1 | 11/2014 | Fister et al. |
| 2014/0354729 A1 | 12/2014 | Vanbrocklin et al. |
| 2014/0372652 A1 | 12/2014 | Shu |
| 2014/0375321 A1 | 12/2014 | Ikeya |
| 2014/0375730 A1 | 12/2014 | Campbell-Brown |
| 2015/0028671 A1 | 1/2015 | Ragaini et al. |
| 2015/0052996 A1 | 2/2015 | Niemann |
| 2015/0074304 A1 | 3/2015 | Adkins et al. |
| 2015/0089630 A1 | 3/2015 | Lee |
| 2015/0239254 A1 | 8/2015 | Muyskens et al. |
| 2015/0253271 A1 | 9/2015 | Giridhar et al. |
| 2015/0285526 A1 | 10/2015 | Smith et al. |
| 2015/0343792 A1 | 12/2015 | Refstrup |
| 2016/0055402 A1 | 2/2016 | Fister et al. |
| 2016/0098359 A1 | 4/2016 | Adkins et al. |
| 2016/0110535 A1 | 4/2016 | Booth et al. |
| 2016/0114590 A1 | 4/2016 | Arpin |
| 2016/0123836 A1 | 5/2016 | Zhu et al. |
| 2016/0279962 A1 | 9/2016 | Ishida et al. |
| 2016/0357691 A1 | 12/2016 | Ahne |
| 2016/0364305 A1 | 12/2016 | Pitigou-Aron |
| 2016/0368273 A1 | 12/2016 | Ishikawa |
| 2017/0032135 A1 | 2/2017 | Refstrup |
| 2017/0050383 A1 | 2/2017 | Bell et al. |
| 2017/0100941 A1 | 4/2017 | Kuribayashi |
| 2017/0144448 A1 | 5/2017 | Smith |
| 2017/0157929 A1 | 6/2017 | Yokoo et al. |
| 2017/0168976 A1 | 6/2017 | Yost et al. |
| 2017/0169623 A1 | 6/2017 | Chen et al. |
| 2017/0182786 A1 | 6/2017 | Angulo Navarro |
| 2017/0189011 A1 | 7/2017 | Stone et al. |
| 2017/0194913 A1 | 7/2017 | Wilson et al. |
| 2017/0230540 A1 | 8/2017 | Sasaki |
| 2017/0330449 A1 | 11/2017 | Lunardhi |
| 2018/0050537 A1 | 2/2018 | Bakker et al. |
| 2018/0100753 A1 | 4/2018 | Cumbie et al. |
| 2018/0143935 A1 | 5/2018 | Cox |
| 2018/0157943 A1 | 6/2018 | Fister et al. |
| 2018/0162137 A1 | 6/2018 | Van Brocklin et al. |
| 2018/0212593 A1 | 7/2018 | Usuda |
| 2018/0264808 A1 | 9/2018 | Bakker et al. |
| 2018/0281394 A1 | 10/2018 | Horade et al. |
| 2018/0281438 A1 | 10/2018 | Horade |
| 2018/0290457 A1 | 10/2018 | Ge et al. |
| 2018/0302110 A1 | 10/2018 | Solan |
| 2018/0304640 A1 | 10/2018 | Horne |
| 2018/0321100 A1 | 11/2018 | Cumbie et al. |
| 2019/0004991 A1 | 1/2019 | Foust |
| 2019/0011306 A1 | 1/2019 | Cumbie et al. |
| 2019/0012663 A1 | 1/2019 | Masters |
| 2019/0013731 A1 | 1/2019 | Gritti |
| 2019/0023020 A1 | 1/2019 | Anderson |
| 2019/0061347 A1 | 2/2019 | Bakker et al. |
| 2019/0064408 A1 | 2/2019 | Smit |
| 2019/0097785 A1 | 3/2019 | Elenes |
| 2019/0111694 A1 | 4/2019 | Cumbie et al. |
| 2019/0111695 A1 | 4/2019 | Anderson et al. |
| 2019/0111696 A1 | 4/2019 | Anderson et al. |
| 2019/0118527 A1 | 4/2019 | Anderson et al. |
| 2019/0126631 A1 | 5/2019 | Anderson et al. |
| 2019/0137316 A1 | 5/2019 | Anderson et al. |
| 2019/0138484 A1 | 5/2019 | De Santiago Dominguez et al. |
| 2019/0217628 A1 | 7/2019 | Horade et al. |
| 2019/0226930 A1 | 7/2019 | Cumbie et al. |
| 2019/0240985 A1 | 8/2019 | Ge et al. |
| 2020/0159689 A1 | 5/2020 | Koshisaka et al. |
| 2021/0334392 A1 | 10/2021 | Panshin et al. |

FOREIGN PATENT DOCUMENTS

| | | |
|---|---|---|
| CN | 1195821 A | 10/1998 |
| CN | 1259086 A | 7/2000 |
| CN | 2603934 Y | 2/2004 |
| CN | 1496477 A | 5/2004 |
| CN | 2734479 Y | 10/2005 |
| CN | 1744991 A | 3/2006 |
| CN | 1796137 A | 7/2006 |
| CN | 1906038 A | 1/2007 |
| CN | 201761148 U | 3/2011 |
| CN | 102152620 A | 8/2011 |
| CN | 102231054 A | 11/2011 |
| CN | 203651218 U | 6/2014 |
| CN | 102736627 B | 12/2014 |
| CN | 103879149 B | 6/2015 |
| CN | 105760318 A | 7/2016 |
| CN | 107209743 A | 9/2017 |
| CN | 108472954 A | 8/2018 |
| CN | 108819486 A | 11/2018 |
| CN | 209014461 U | 6/2019 |
| DE | 3712699 A1 | 11/1988 |
| EP | 0015954 B1 | 6/1984 |
| EP | 0720916 A2 | 7/1996 |
| EP | 0994779 A1 | 4/2000 |
| EP | 1164022 A2 | 12/2001 |
| EP | 1238811 A1 | 9/2002 |
| EP | 1285764 A1 | 2/2003 |
| EP | 1314565 A2 | 5/2003 |
| EP | 1389531 A | 2/2004 |
| EP | 1524120 A2 | 4/2005 |
| EP | 1800872 A1 | 6/2007 |
| EP | 1839872 A1 | 10/2007 |
| EP | 2237163 A1 | 10/2010 |
| EP | 2385468 A1 | 11/2011 |
| EP | 2854063 A1 | 4/2015 |
| EP | 3208736 A1 | 8/2017 |
| GB | 2519181 A | 4/2015 |
| JP | H04220353 A | 8/1992 |
| JP | 2001292133 A | 10/2001 |
| JP | 2002026471 A | 1/2002 |
| JP | 2003326726 A | 11/2003 |
| JP | 2005262458 A | 9/2005 |
| JP | 2009258604 A | 11/2009 |
| JP | 2010079199 A | 4/2010 |
| JP | 2011113336 A | 6/2011 |
| JP | 2012063770 A | 3/2012 |
| JP | 2013197677 A | 9/2013 |
| JP | 5644052 B2 | 12/2014 |
| JP | 2014534917 A | 12/2014 |
| JP | 2016185664 A | 10/2016 |
| JP | 2017196842 A | 11/2017 |
| JP | 2018049141 A | 3/2018 |
| JP | 2018136774 A | 8/2018 |
| JP | 2018161785 A | 10/2018 |
| JP | 2018531394 A | 10/2018 |
| KR | 20080003539 A | 1/2008 |
| KR | 101785051 B1 | 10/2017 |
| TW | 200707209 A | 2/2007 |
| TW | 201202948 A | 1/2012 |
| TW | 201546620 A | 12/2015 |
| WO | WO-2007107957 A1 | 9/2007 |
| WO | WO-2008117194 A1 | 10/2008 |

(56) References Cited

FOREIGN PATENT DOCUMENTS

| | | |
|---|---|---|
| WO | WO-2009145774 A1 | 12/2009 |
| WO | WO-2012020443 A8 | 2/2012 |
| WO | WO-2012054050 A1 | 4/2012 |
| WO | WO-2012057755 A1 | 5/2012 |
| WO | WO-2013048430 A1 | 4/2013 |
| WO | WO-2015116092 A1 | 8/2015 |
| WO | WO-2016061480 A2 | 4/2016 |
| WO | WO-2016114759 A1 | 7/2016 |
| WO | WO-2016130157 A1 | 8/2016 |
| WO | WO-2017074334 A1 | 5/2017 |
| WO | WO-2017074342 A1 | 5/2017 |
| WO | WO-2017174363 A1 | 10/2017 |
| WO | WO-2017184147 A1 | 10/2017 |
| WO | 2017/194913 A1 | 11/2017 |
| WO | WO-2017189009 A1 | 11/2017 |
| WO | WO-2017189010 A1 | 11/2017 |
| WO | WO-2017189011 A1 | 11/2017 |
| WO | WO-2017189013 A1 | 11/2017 |
| WO | WO-2018017066 A1 | 1/2018 |
| WO | WO-2018022038 A1 | 2/2018 |
| WO | WO-2018186847 A1 | 10/2018 |
| WO | WO-2018199886 A1 | 11/2018 |
| WO | WO-2018199891 A1 | 11/2018 |
| WO | WO-2018199895 A1 | 11/2018 |
| WO | WO-2018217185 A1 | 11/2018 |
| WO | WO-2019017963 A1 | 1/2019 |
| WO | WO-2019078834 A1 | 4/2019 |
| WO | WO-2019078835 A1 | 4/2019 |
| WO | WO-2019078839 A1 | 4/2019 |
| WO | WO-2019078840 A1 | 4/2019 |
| WO | WO-2019078843 A1 | 4/2019 |
| WO | WO-2019078844 A1 | 4/2019 |
| WO | WO-2019078845 A1 | 4/2019 |

OTHER PUBLICATIONS

Epson, "Epson Provides the Best Inks for the Job," https://www.epson.co.nz/microsite/excellence/inks_why.asp, retrieved Jul. 1, 2019, 3 pgs.
Platform Development Team, "Development of the HP DeskJet 1200C Print Cartridge Platform," Hewlett-Packard Journal, Feb. 1994, pp. 46-54.
International Searching Authority, "International Search Report and Written Opinion," issued in connection with PCT/US2019/026159, dated Aug. 13, 2019, 15 pgs.
International Searching Authority, "International Search Report and Written Opinion," issued in connection with PCT/US2018/063624, dated Aug. 23, 2019, 13 pgs.
International Searching Authority, "International Search Report and Written Opinion," issued in connection with PCT/US2018/063630, dated Aug. 22, 2019, 15 pgs.
International Searching Authority, "International Search Report and Written Opinion," issued in connection with PCT/US2018/063633, dated Jul. 23, 2019, 12 pgs.
International Searching Authority, "International Search Report and Written Opinion," issued in connection with PCT/US2018/063638, dated Aug. 26, 2019, 13 pgs.
International Searching Authority, "International Search Report and Written Opinion," issued in connection with PCT/US2018/063643, dated Aug. 20, 2019, 13 pgs.
International Searching Authority, "International Search Report and Written Opinion," issued in connection with PCT/US2019/017511, dated Jul. 25, 2019, 12 pgs.
International Searching Authority, "International Search Report and Written Opinion," issued in connection with PCT/US2019/026124, dated Aug. 26, 2019, 15 pgs.
International Searching Authority, "International Search Report and Written Opinion," issued in connection with PCT/US2019/026133, dated Aug. 26, 2019, 18 pgs.
International Searching Authority, "International Search Report and Written Opinion," issued in connection with PCT/US2019/026145, dated Sep. 5, 2019, 16 pgs.
International Searching Authority, "International Search Report and Written Opinion," issued in connection with PCT/US2019/026161, dated Aug. 26, 2019, 20 pgs.
International Searching Authority, "International Search Report and Written Opinion," issued in connection with PCT/US2018/063631, dated Aug. 23, 2019, 13 pgs.
Maxim Integrated Products, "1-to-8 I2C Bus Switches/Multiplexers with Bus Lock-Up Detection, Isolation, and Notification," Sep. 2008, 22 pgs.
NXP, "Introducing A10006 Secure Authenticator Tamper-Resistant Anti Counterfeit Solution", retreived Jul. 3, 2019, 29 pgs.
NXP B.V., "NXP 2-, 4-, and 8-Channel I2C/SMBus Muxes and Switches PCA954x," Jul. 2008, 4 pgs.
NXP Semiconductors N.V., "PCA9641: 2-Channel I2C-Bus Master Arbiter," Oct. 27, 2015, 55 pgs.
Laureto, John et al., "Open Source Multi-Head 3D Printer for Polymer-Metal Composite Component Manufacturing," Technologies, MDPI, 2017, 5 (2), pp. 36, 23 pgs.
NXP Semiconductors N.V., "PCA9547: 8-Channel I2C-Bus Multiplexer with Reset," Apr. 1, 2014, 34 pgs.
NXP Semiconductors N.V., "AN11593: How to Design in and Program the PCA9641 I2C Arbiter," Oct. 23, 2014, 22 pgs.
Reddit, "Use an Accelerometer to Measure Z wobble", retrieved Jul. 1, 2019, 3 pgs, https://www.reddit.com/r/Reprap/comments/6qsoyd/use_an_accelerometer_to_measure_z_wobble/.
Phillips Semiconductors, "The I2C-Bus Specification", Version 2.1, Jan. 2000, 46 pgs.
United States Patent and Trademark Office, "Non-Final Office Action," issued in connection with U.S. Appl. No. 16/502,479, dated Dec. 11, 2019, 13 pgs.
United States Patent and Trademark Office, "Non-Final Office Action," issued in connection with U.S. Appl. No. 16/460,016, dated Sep. 12, 2019, 12 pgs.
United States Patent and Trademark Office, "Non-Final Office Action," issued in connection with U.S. Appl. No. 16/505,090, dated Sep. 10, 2019, 20 pgs.
United States Patent and Trademark Office, "Notice of Allowance," issued in connection with U.S. Appl. No. 16/502,479, dated Apr. 9, 2020, 9 pgs.
United States Patent and Trademark Office, "Notice of Allowance," issued in connection with U.S. Appl. No. 16/460,016, dated Mar. 25, 2020, 10 pgs.
United States Patent and Trademark Office, "Notice of Allowance," issued in connection with U.S. Appl. No. 16/505,090, dated Feb. 12, 2020, 9 pgs.
United States Patent and Trademark Office, "Notice of Allowance," issued in connection with U.S. Appl. No. 16/505,090, dated Oct. 22, 2019, 5 pgs.
United States Patent and Trademark Office, "Notice of Allowance," issued in connection with U.S. Appl. No. 16/728,207, dated Feb. 19, 2020, 19 pgs.
United States Patent and Trademark Office, "Restriction Requirement," issued in connection with U.S. Appl. No. 16/502,479, dated Aug. 15, 2019, 7 pgs.

* cited by examiner

LOGIC CIRCUITRY PACKAGE

CROSS REFERENCE TO RELATED APPLICATIONS

This application is a U.S. National Stage Application of PCT Application No. PCT/US2019/057989, filed Oct. 25, 2019, entitled "LOGIC CIRCUITRY PACKAGE," which claims priority to PCT Application No. PCT/US2019/026133, filed Apr. 5, 2019, entitled "LOGIC CIRCUITRY"; PCT Application No. PCT/US2019/026152, filed Apr. 5, 2019, entitled "FLUID PROPERTY SENSOR"; PCT Application No. PCT/US2019/026161, filed Apr. 5, 2019, entitled "LOGIC CIRCUITRY"; and PCT Application No. PCT/US2018/063631, filed Dec. 3, 2018, entitled "LOGIC CIRCUITRY"; all of which are incorporated herein by reference.

BACKGROUND

Subcomponents of apparatus may communicate with one another in a number of ways. For example, Serial Peripheral Interface (SPI) protocol, Bluetooth Low Energy (BLE), Near Field Communications (NFC) or other types of digital or analog communications may be used.

Some two-dimensional (2D) and three-dimensional (3D) printing systems include one or more replaceable print apparatus components, such as print material containers (e.g., inkjet cartridges, toner cartridges, ink supplies, 3D printing agent supplies, build material supplies etc.), inkjet printhead assemblies, and the like. In some examples, logic circuitry associated with the replaceable print apparatus component(s) communicate with logic circuitry of the print apparatus in which they are installed, for example communicating information such as their identity, capabilities, status and the like. In further examples, print material containers may include circuitry to execute one or more monitoring functions such as print material level sensing.

DETAILED DESCRIPTION

Figure 1:
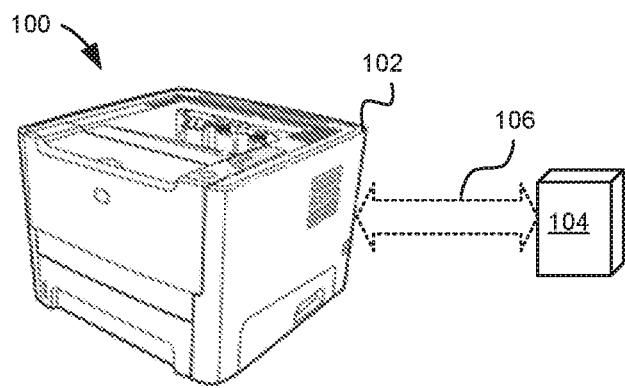
FIG. 1 illustrates one example of a printing system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Some examples of applications described herein are in the context of print apparatus. Not all the examples, however, are limited to such applications, and at least some of the principles set out herein may be used in other contexts. The contents of other applications and patents cited in this disclosure are incorporated by reference.

In certain examples, Inter-integrated Circuit ($I^2C$, or I2C, which notation is adopted herein) protocol allows at least one 'master' integrated circuit (IC) to communicate with at least one 'slave' IC, for example via a bus. I2C, and other communications protocols, communicate data according to a clock period. For example, a voltage signal may be generated, where the value of the voltage is associated with data. For example, a voltage value above X volts may indicate a logic "1" whereas a voltage value below X volts may indicate a logic "0", where X is a predetermined numerical value. By generating an appropriate voltage in each of a series of clock periods, data can be communicated via a bus or another communication link.

Certain example print material containers have slave logic that utilize I2C communications, although in other examples, other forms of digital or analog communications could also be used. In the example of I2C communication, a master IC may generally be provided as part of the print apparatus (which may be referred to as the 'host') and a replaceable print apparatus component would comprise a 'slave' IC, although this need not be the case in all examples. There may be a plurality of slave ICs connected to an I2C communication link or bus (for example, containers of different colors of print agent). The slave IC(s) may include a processor to perform data operations before responding to requests from logic circuitry of the print system.

Communications between print apparatus and replaceable print apparatus components installed in the apparatus (and/or the respective logic circuitry thereof) may facilitate various functions. Logic circuitry within a print apparatus may receive information from logic circuitry associated with a replaceable print apparatus component via a communications interface, and/or may send commands to the replaceable print apparatus component logic circuitry, which may include commands to write data to a memory associated therewith, or to read data therefrom.

For example, logic circuitry associated with a replaceable print apparatus component may include a sensor cell array. The sensor cell array may include an array of strain gauges arranged on a wall of a reservoir of the replaceable print apparatus component. At least a subset of the array of strain gauges may detect a deflection of the wall of the reservoir in response to a pressurization of the reservoir. Strain gauge readings during a pressurization of the reservoir may be used to verify that the pressurization of the reservoir was successful.

Alternative logic circuitry packages are also encompassed in this disclosure, which use a sensor different than strain gauges, and/or a single sensor cell instead of a cell array, to detect an air blow event coming from an air pen of the print apparatus. These alternative embodiments may digitally emulate the logic circuitry package output, in a way that is similar to the logic circuitry package including analog sensor cell arrays, so as to be validated by the print apparatus logic circuit, for example without needing relatively complex analog sensor hardware. One or a combination of digital look-up tables, virtual simulations, and algorithms may be used to generate the output so that the output is validated by print apparatus firmware that is designed to communicate with the earlier explained analog sensor cell arrays. The alternative embodiment may have different advantages over analog sensor cell arrays, such as, for example, being cheaper, more reliable and/or providing for an alternative device. The latter may be a benefit in itself. An alternative embodiment can facilitate flow of print material from the component to the host apparatus in a way that is cheaper, simpler or different, thereby facilitating the printing of media and/or products. Certain features described in this disclosure can be linked to both the digital alternative and the analog sensor cell array, not necessarily being applicable to one and not the other.

In at least some of the examples described below, a logic circuitry package is described. The logic circuitry package may be associated with a replaceable print apparatus component, for example being internally or externally affixed thereto, for example at least partially within the housing, and is adapted to communicate data with a print apparatus controller via a bus provided as part of the print apparatus.

A 'logic circuitry package' as the term is used herein refers to one logic circuit, or more logic circuits that may be interconnected or communicatively linked to each other. Where more than one logic circuit is provided, these may be encapsulated as a single unit, or may be separately encapsulated, or not encapsulated, or some combination thereof. The package may be arranged or provided on a single substrate or a plurality of substrates. In some examples, the package may be directly affixed to a cartridge wall. In some examples, the package may include an interface, for example including pads or pins. The package interface may be intended to connect to a communication interface of the print apparatus component that in turn connects to a print apparatus logic circuit, or the package interface may connect directly to the print apparatus logic circuit. Example packages may be configured to communicate via a serial bus interface. Where more than one logic circuit is provided, these logic circuits may be connected to each other or to the interface, to communicate through the same interface.

In some examples, each logic circuitry package is provided with at least one processor and memory. In one example, the logic circuitry package may be, or may function as, a microcontroller or secure microcontroller. In use, the logic circuitry package may be adhered to or integrated with the replaceable print apparatus component. A logic circuitry package may alternatively be referred to as a logic circuitry assembly, or simply as logic circuitry or processing circuitry.

In some examples, the logic circuitry package may respond to various types of requests (or commands) from a host (e.g., a print apparatus). A first type of request may include a request for data, for example identification and/or authentication information. A second type of request from a host may be a request to perform a physical action, such as performing at least one measurement. A third type of request may be a request for a data processing action. There may be additional types of requests. In this disclosure, a command is also a type of request.

In some examples, there may be more than one address associated with a particular logic circuitry package, which is used to address communications sent over a bus to identify the logic circuitry package which is the target of a communication (and therefore, in some examples, with a replaceable print apparatus component). In some examples, different requests are handled by different logic circuits of the package. In some examples, the different logic circuits may be associated with different addresses. For example, cryptographically authenticated communications may be associated with secure microcontroller functions and a first I2C address, while other communications may be associated with a sensor circuit and a second and/or reconfigured I2C address. In certain examples, these other communications via the second and/or reconfigured address can be scrambled or otherwise secured, not using the key used for the secure microcontroller functions.

In at least some examples, a plurality of such logic circuitry packages (each of which may be associated with a different replaceable print apparatus component) may be connected to an I2C bus. In some examples, at least one address of the logic circuitry package may be an I2C compatible address (herein after, an I2C address), for example in accordance with an I2C protocol, to facilitate directing communications between master to slaves in accordance with the I2C protocol. For example, a standard I2C communications address may be 7 or 10 bits in length. In other examples, other forms of digital and/or analog communication can be used.

FIG. 1 illustrates one example of a printing system 100. The printing system 100 includes a print apparatus 102 in communication with logic circuitry associated with a replaceable print apparatus component 104 via a communications link 106. In some examples, the communications link 106 may include an I2C capable or compatible bus (herein after, an I2C bus). Although for clarity, the replaceable print apparatus component 104 is shown as external to the print apparatus 102, in some examples, the replaceable print apparatus component 104 may be housed within the print apparatus.

The replaceable print apparatus component 104 may include, for example, a print material container or cartridge (which could be a build material container for 3D printing, a liquid or dry toner container for 2D printing, or an ink or liquid print agent container for 2D or 3D printing), which may in some examples include a print head or other dispensing or transfer component. The replaceable print apparatus component 104 may, for example, contain a consumable resource of the print apparatus 102, or a component which is likely to have a lifespan which is less (in some examples, considerably less) than that of the print apparatus 102. Moreover, while a single replaceable print apparatus component 104 is shown in this example, in other examples, there may be a plurality of replaceable print apparatus components, for example including print agent containers of different colors, print heads (which may be integral to the containers), or the like. In other examples, the print apparatus components 104 could include service components, for example to be replaced by service personnel, examples of which could include print heads, toner process cartridges, or logic circuit package by itself to adhere to corresponding print apparatus component and communicate to a compatible print apparatus logic circuit.

Figure 2:
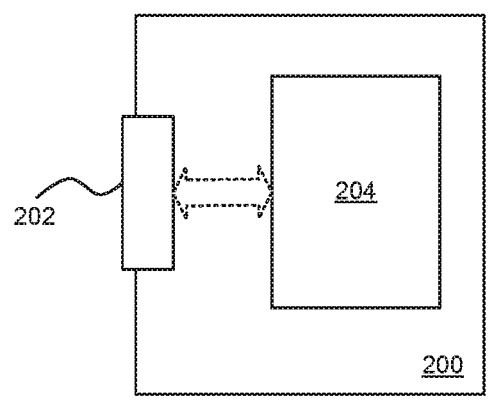
FIG. 2 illustrates one example of a replaceable print apparatus component.

FIG. 2 illustrates one example of a replaceable print apparatus component 200, which may provide the replaceable print apparatus component 104 of FIG. 1. The replaceable print apparatus component 200 includes a data interface 202 and a logic circuitry package 204. In use of the replaceable print apparatus component 200, the logic circuitry package 204 decodes data received via the data interface 202. The logic circuitry may perform other functions as set out below. The data interface 202 may include an I2C or other interface. In certain examples, the data interface 202 may be part of the same package as the logic circuitry package 204.

In some examples, the logic circuitry package 204 may be further configured to encode data for transmission via the data interface 202. In some examples, there may be more than one data interface 202 provided. In some examples, the logic circuitry package 204 may be arranged to act as a 'slave' in I2C communications.

Figure 3:
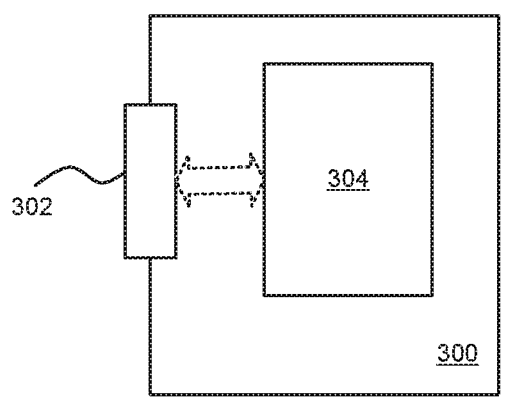
FIG. 3 illustrates one example of a print apparatus.

FIG. 3 illustrates one example of a print apparatus 300. The print apparatus 300 may provide the print apparatus 102 of FIG. 1. The print apparatus 300 may serve as a host for replaceable components. The print apparatus 300 includes an interface 302 for communicating with a replaceable print apparatus component and a controller 304. The controller 304 includes logic circuitry. In some examples, the interface 302 is an I2C interface.

In some examples, controller 304 may be configured to act as a host, or a master, in I2C communications. The controller 304 may generate and send commands to at least one replaceable print apparatus component 200, and may receive and decode responses received therefrom. In other examples the controller 304 may communicate with the logic circuitry package 204 using any form of digital or analog communication.

The print apparatus 102, 300 and replaceable print apparatus component 104, 200, and/or the logic circuitry thereof, may be manufactured and/or sold separately. In an example, a user may acquire a print apparatus 102, 300 and retain the apparatus 102, 300 for a number of years, whereas a plurality of replaceable print apparatus components 104, 200 may be purchased in those years, for example as print agent is used in creating a printed output. Therefore, there may be at least a degree of forwards and/or backwards compatibility between print apparatus 102, 300 and replaceable print apparatus components 104, 200. In many cases, this compatibility may be provided by the print apparatus 102, 300 as the replaceable print apparatus components 104, 200 may be relatively resource constrained in terms of their processing and/or memory capacity.

Figure 4A:
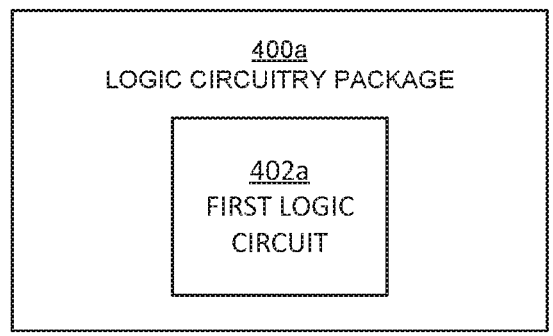
FIGS. 4A-4E illustrate examples of logic circuitry packages and processing circuitry.

FIG. 4A illustrates one example of a logic circuitry package 400a, which may for example provide the logic circuitry package 204 described in relation to FIG. 2. The logic circuitry package 400a may be associated with, or in some examples affixed to and/or be incorporated at least partially within, a replaceable print apparatus component 200.

In some examples, the logic circuitry package 400a is addressable via a first address and includes a first logic circuit 402a, wherein the first address is an I2C address for the first logic circuit 402a. In some examples, the first address may be configurable. In other examples, the first address is a fixed address (e.g., "hard-wired") intended to remain the same address during the lifetime of the first logic circuit 402a. The first address may be associated with the logic circuitry package 400a at and during the connection with the print apparatus logic circuit, outside of the time periods that are associated with a second address, as will be set out below. In example systems where a plurality of replaceable print apparatus components are to be connected to a single print apparatus, there may be a corresponding plurality of different first addresses. In certain examples, the first addresses can be considered standard I2C addresses for logic circuitry packages 400a or replaceable print components.

In some examples, the logic circuitry package 400a is also addressable via a second address. For example, the second address may be associated with different logic functions or, at least partially, with different data than the first address. In some examples, the second address may be associated with a different hardware logic circuit or a different virtual device than the first address. The hardware logic circuit can include analog sensor functions. In some examples, the logic circuitry package 400a may include a memory to store the second address (in some examples in a volatile manner). In some examples, the memory may include a programmable address memory register for this purpose. The second address may have a default second address while the second address (memory) field may be reconfigurable to a different address. For example, the second address may be reconfigurable to a temporary address by a second address command, whereby it is set (back) to the default second address after or at each time period command to enable the second address. For example, the second address may be set to its default address in an out-of-reset state whereby, after each reset, it is reconfigurable to the temporary (i.e., reconfigured) address.

In some examples, the package 400a is configured such that, in response to a first command indicative of a first time period sent to the first address (and in some examples a task), the package 400a may respond in various ways. In some examples, the package 400a is configured such that it is accessible via at least one second address for the duration of the time period. Alternatively or additionally, in some examples, the package may perform a task, which may be the task specified in the first command. In other examples, the package may perform a different task. The first command may, for example, be sent by a host such as a print apparatus in which the logic circuitry package 400a (or an associated replaceable print apparatus component) is installed. As set out in greater detail below, the task may include obtaining a sensor reading.

Further communication may be directed to memory addresses to be used to request information associated with these memory addresses. The memory addresses may have a different configuration than the first and second address of the logic circuitry package 400a. For example, a host apparatus may request that a particular memory register is read out onto the bus by including the memory address in a read command. In other words, a host apparatus may have a knowledge and/or control of the arrangement of a memory. For example, there may be a plurality of memory registers and corresponding memory addresses associated with the second address. A particular register may be associated with a value, which may be static or reconfigurable. The host apparatus may request that the register be read out onto the bus by identifying that register using the memory address. In some examples, the registers may include any or any combination of address register(s), parameter register(s) (for example to store gain and/or offset parameters), sensor identification register(s) (which may store an indication of a type of sensor), sensor reading register(s) (which may store values read or determined using a sensor), sensor number register(s) (which may store a number or count of sensors), version identity register(s), memory register(s) to store a count of clock cycles, memory register(s) to store a value indicative of a read/write history of the logic circuitry, or other registers.

Figure 4B:
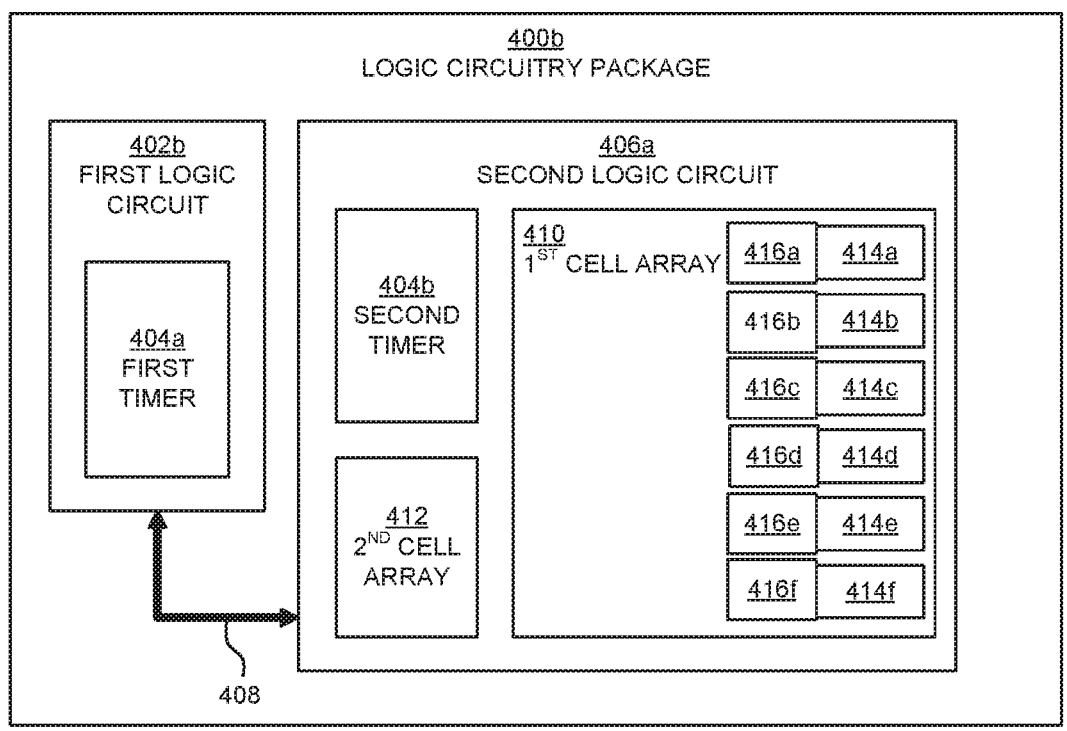

FIG. 4B illustrates another example of a logic circuitry package 400b. In this example, the package 400b includes a first logic circuit 402b, in this example, including a first timer 404a, and a second logic circuit 406a, in this example, including a second timer 404b. While in this example, each of the first and second logic circuits 402b, 406a include its own timer 404a, 404b, in other examples, they may share a timer or reference at least one external timer. In a further example, the first logic circuit 402b and the second logic circuit 406a are linked by a dedicated signal path 408. In other examples, that are not the topic of FIG. 4B, a single integrated logic circuit may simulate the functions of the second logic circuit.

Back to FIG. 4B, in one example, the logic circuitry package 400b may receive a first command including two data fields. A first data field is a one byte data field setting a requested mode of operation. For example, there may be a plurality of predefined modes, such as a first mode, in which the logic circuitry package 400b is to ignore data traffic sent to the first address (for example, while performing a task), and a second mode in which the logic circuitry package 400b is to ignore data traffic sent to the first address and to transmit an enable signal to the second logic circuit 406a, as is further set out below. The first command may include additional fields, such as an address field and/or a request for acknowledgement.

The logic circuitry package 400b is configured to process the first command. If the first command cannot be complied with (for example, a command parameter is of an invalid length or value, or it is not possible to enable the second logic circuit 406a), the logic circuitry package 400b may generate an error code and output this to a communication link to be returned to host logic circuitry, for example in the print apparatus.

If, however, the first command is validly received and can be complied with, the logic circuitry package 400b measures the duration of the time period included in the first command, for example utilizing the timer 404a. In some examples, the timer 404a may include a digital "clock tree". In other examples, the timer 404a may include an RC circuit, a ring oscillator, or some other form of oscillator or timer. In yet other examples, the timer may include a plurality of delay circuits each of which is set to expire after a certain time period, whereby depending on the timer period indicated in a first command, the delay circuit is chosen.

In this example, in response to receiving a valid first command, the first logic circuit 402b enables the second logic circuit 406a and effectively disables the first address, for example by tasking the first logic circuit 402b with a processing task. In some examples, enabling the second logic circuit 406a includes sending, by the first logic circuit 402b, an activation signal to the second logic circuit 406a. In other words, in this example, the logic circuitry package 400b is configured such that the second logic circuit 406a is selectively enabled by the first logic circuit 402b. The first logic circuit 402b is configured to use the first timer 404a to determine the duration of the enablement, that is, to set the time period of the enablement.

In this example, the second logic circuit 406a is enabled by the first logic circuit 402b sending a signal via a signal path 408, which may or may not be a dedicated signal path 408, that is, dedicated to enable the second logic circuit 406a. In one example, the first logic circuit 402b may have a dedicated contact pin or pad connected to the signal path 408, which links the first logic circuit 402b and the second logic circuit 406a. In a particular example, the dedicated contact pin or pad may be a General Purpose Input/Output (a GPIO) pin of the first logic circuit 402b. The contact pin/pad may serve as an enablement contact of the second logic circuit 406a.

In this example, the second logic circuit 406a is addressable via at least one second address. In some examples, when the second logic circuit 406a is activated or enabled, it may have an initial, or default, second address, which may be an I2C address or have some other address format. The second logic circuit 406a may receive instructions from a master or host logic circuitry to reconfigure the initial second address to a temporary second address. In some examples, the temporary second address may be an address which is selected by the master or host logic circuitry. This may allow the second logic circuit 406a to be provided in one of a plurality of packages 400 on the same I2C bus which, at least initially, share the same initial second address. This shared, default, address may later be set to a specific temporary address by the print apparatus logic circuit, thereby allowing the plurality of packages to have different second addresses during their temporary use, facilitating communications to each individual package. At the same time, providing the same initial second address may have manufacturing or testing advantages.

In some examples, the second logic circuit 406a may include a memory. The memory may include a programmable address register to store the initial and/or temporary second address (in some examples in a volatile manner). In some examples, the second address may be set following, and/or by executing, an I2C write command. In some examples, the second address may be settable when the enablement signal is present or high, but not when it is absent or low. The second address may be set to a default address when an enablement signal is removed and/or on restoration of enablement of the second logic circuit 406a. For example, each time the enable signal over the signal path 408 is low, the second logic circuit 406a, or the relevant part(s) thereof, may be reset. The default address may be set when the second logic circuit 406a, or the relevant part(s) thereof, is switched out-of-reset. In some examples, the default address is a 7-bit or 10-bit identification value. In some examples, the default address and the temporary second address may be written in turn to a single, common, address register. For example, while the first address of the first logic circuit is different for each different associated print material (e.g., different color inks have different first addresses), the second logic circuits can be the same for the different print materials and have the same initial second address.

In the example illustrated in FIG. 4B, the second logic circuit 406a includes a first array 410 of cells and at least one second cell 412 or second array of second cells of a different type than the cells of the first array 410. In some examples, the second logic circuit 406a may include additional sensor cells of a different type than the cells of the first array 410 and the at least one second cell 412. Each of the plurality of sensor types may be identifiable by a different sensor ID, while each cell in a cell array of the same type may also be identifiable by sensor ID. The sensor ID may include both the sensor type ID to select the array or type and the sensor cell ID to select the cell in the selected type or array, whereby the latter may also be called "sub-"ID. The sensor IDs (including the sub-IDs) may include a combination of addresses and values, for example register addresses and values. The addresses of the sensor cell array ID and the sensor cell ID may be different. For example, an address selects a register that has a function to select a particular sensor or cell, and in the same transaction, the value selects the sensor or cell, respectively. Hence, the second logic circuit may include registers and multiplex circuitry to select sensor cells in response to sensor IDs. In examples where there is only one cell of a certain sensor type, one sensor ID may be sufficient to select that cell. At the same time, for that single sensor cell, different sensor "sub-"IDs will not affect the sensor cell selection because there is only one sensor cell. In this disclosure, sensor ID parameters are described. A sensor ID parameter may include a sensor ID. A sensor ID parameter may include a sensor type ID or a sensor cell ID. The same sensor ID (e.g., to select a sensor type) and different sensor sub-IDs (e.g., to select a sensor cell) may be used to select different sensor cells. The sensor ID parameters can include only the sensor sub-ID, for example where the sensor type has been previously set so that only the sensor cell needs to be selected.

The first cells 416a-416f, 414a-414f and the at least one second cell 412 can include resistors. The first cells 416a-416f, 414a-414f and the at least one second cell 412 can include sensors. In one example, the first cell array 410 includes a print material level sensor and the at least one second cell 412 includes another sensor and/or another sensor array, such as an array of strain sensing cells. Further sensor types may include temperature sensors, resistors, diodes, crack sensors (e.g., crack sense resistors), etc. In this disclosure, different sensor types may also be referred to as different sensor classes. As mentioned, earlier, this disclosure encompasses alternative examples (e.g., mentioned with reference to FIGS. 6, 25, and 26) of logic circuitry packages without the described analog sensor cell arrays, whereby responses may be generated based on class parameters (i.e., sensor ID parameters) without using a physical sensor cell for generating the output.

In this example, the first cell array 410 includes a sensor configured to detect a print material level of a print supply, which may in some examples be a solid but in examples described herein is a liquid, for example, an ink or other liquid print agent. The first cell array 410 may include a series of temperature sensors (e.g., cells 414a-414f) and a series of heating elements (e.g., cells 416a-416f), for example similar in structure and function as compared to the level sensor arrays described in WO2017/074342, WO2017/184147, and WO2018/022038. In this example, the resistance of a resistor cell 414 is linked to its temperature. The heater cells 416 may be used to heat the sensor cells 414 directly or indirectly using a medium. The subsequent behavior of the sensor cells 414 depends on the medium in which they are submerged, for example whether they are in liquid (or in some examples, encased in a solid medium) or in air. Those which are submerged in liquid/encased may generally lose heat quicker than those which are in air because the liquid or solid may conduct heat away from the resistor cells 414 better than air. Therefore, a liquid level may be determined based on which of the resistor cells 414 are exposed to the air, and this may be determined based on a reading of their resistance following (at least the start of) a heat pulse provided by the associated heater cell 416.

In some examples, each sensor cell 414 and heater cell 416 are stacked with one being directly on top of the other. The heat generated by each heater cell 416 may be substantially spatially contained within the heater element layout perimeter, so that heat delivery is substantially confined to the sensor cell 414 stacked directly above the heater cell 416. In some examples, each sensor cell 414 may be arranged between an associated heater cell 416 and the fluid/air interface.

In this example, the second cell array 412 includes a plurality of different cells that may have a different function such as different sensing function(s). For example, the first and second cell array 410, 412 may include different resistor types. Different cells arrays 410, 412 for different functions may be provided in the second logic circuit 406a. More than two different sensor types may be provided, for example three, four, five or more sensor types, may be provided, wherein each sensor type may be represented by one or more sensor cells. Certain cells or cell arrays may function as stimulators (e.g., heaters) or reference cells, rather than as sensors.

Figure 4C:
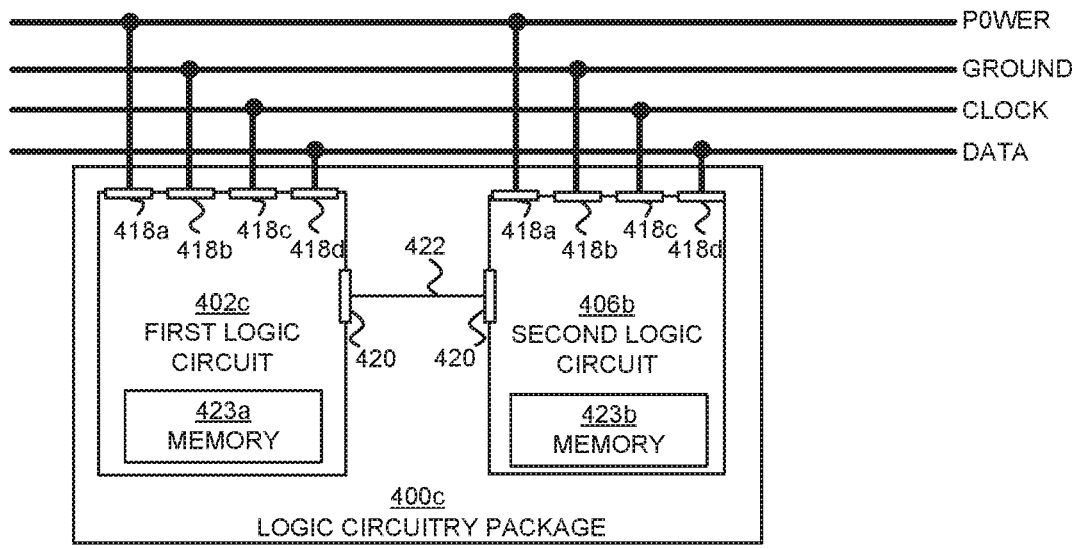

FIG. 4C illustrates an example of how a first logic circuit 402c and a second logic circuit 406b of a logic circuitry package 400c, which may have any of the attributes of the circuits/packages described above, may connect to an I2C bus and to each other. As is shown in the Figure, each of the circuits 402c, 406b has four pads (or pins) 418a-418d connecting to the Power, Ground, Clock, and Data lines of an I2C bus. In another example, four common connection pads are used to connect both logic circuits 402c, 406b to four corresponding connection pads of the print apparatus controller interface. It is noted that in some examples, instead of four connection pads, there may be fewer connection pads. For example, power may be harvested from the clock pad; an internal clock may be provided; or the package could be grounded through another ground circuit; so that, one or more of the pads may be omitted or made redundant. Hence, in different examples, the package could use only two or three interface pads and/or could include "dummy" pads.

Each of the circuits 402c, 406b has a contact pin 420, which are connected by a common signal line 422. The contact pin 420 of the second circuit serves as an enablement contact thereof.

In this example, each of the first logic circuit 402c and the second logic circuit 406b include a memory 423a, 423b. The memory 423a of the first logic circuit 402c stores information including cryptographic values (for example, a cryptographic key and/or a seed value from which a key may be derived) and identification data and/or status data of the associated replaceable print apparatus component. In some examples, the memory 423a may store data representing characteristics of the print material, for example, any part, or any combination of its type, color, color map, recipe, batch number, age, etc. The first logic circuit 402c may be, or function as, a microcontroller or secure microcontroller.

In this example, memory 423b of the second logic circuit 406b includes a programmable address register to contain an initial address of the second logic circuit 406b when the second logic circuit 406b is first enabled and to subsequently contain a new (temporary) second address (in some examples in a volatile manner) after that new second address has been communicated by the print apparatus. The new, e.g., temporary, second address may be programmed into the second address register after the second logic circuit 406b is enabled, and may be effectively erased or replaced at the end of an enablement period. In some examples, the memory 423b may further include programmable registers to store any, or any combination of a read/write history data, cell (e.g., resistor or sensor) count data, Analog to Digital converter data (ADC and/or DAC), and a clock count, in a volatile or non-volatile manner. The memory 423b may also receive and/or store calibration parameters, such as offset and gain parameters. Use of such data is described in greater detail below. Certain characteristics, such as cell count or ADC or DAC characteristics, could be derivable from the second logic circuit instead of being stored as separate data in the memory.

In one example, the memory 423b of the second logic circuit 406b stores any or any combination of an address, for example the second I2C address; an identification in the form of a revision ID; and the index number of the last cell (which may be the number of cells less one, as indices may start from 0), for example for each of different cell arrays or for multiple different cell arrays if they have the same number of cells.

In use of the second logic circuit 406b, in some operational states, the memory 423b of the second logic circuit 406 may store any or any combination of timer control data, which may enable a timer of the second circuit, and/or enable frequency dithering therein in the case of some timers such as ring oscillators; a dither control data value (to indicate a dither direction and/or value); and a timer sample test trigger value (to trigger a test of the timer by sampling the timer relative to clock cycles measureable by the second logic circuit 406b).

While the memories 423a, 423b are shown as separate memories here, they could be combined as a shared memory resource, or divided in some other way. The memories 423a, 423b may include a single or multiple memory devices, and may include any or any combination of volatile memory (e.g., DRAM, SRAM, registers, etc.) and non-volatile memory (e.g., ROM, EEPROM, Flash, EPROM, memristor, etc.).

While one package 400c is shown in FIG. 4C, there may be a plurality of packages with a similar or a different configuration attached to the bus.

Figure 4D:
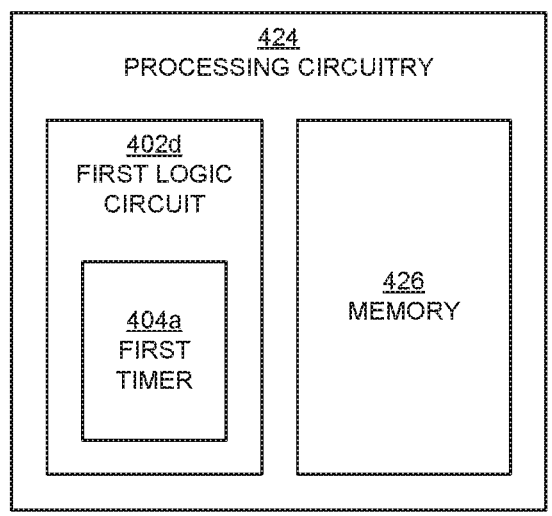

FIG. 4D illustrates an example of processing circuitry 424 which is for use with a print material container. For example, the processing circuitry 424 may be affixed or integral thereto. As already mentioned, the processing circuitry 424 may include any of the features of, or be the same as, any other logic circuitry package of this disclosure.

In this example, the processing circuitry 424 includes a memory 426 and a first logic circuit 402d which enables a read operation from memory 426. The processing circuitry 424 is accessible via an interface bus of a print apparatus in which the print material container is installed and is associated with a first address and at least one second address. The bus may be an I2C bus. The first address may be an I2C address of the first logic circuit 402d. The first logic circuit 402d may have any of the attributes of the other examples circuits/packages described in this disclosure.

The first logic circuit 402d is adapted to participate in authentication of the print materials container by a print apparatus in which the container is installed. For example, this may include a cryptographic process such as any kind of cryptographically authenticated communication or message exchange, for example based on a key stored in the memory 426, and which can be used in conjunction with information stored in the printer. In some examples, a printer may store a version of a key which is compatible with a number of different print material containers to provide the basis of a 'shared secret'. In some examples, authentication of a print material container may be carried out based on such a shared secret. In some examples, the first logic circuit 402d may participate in a message to derive a session key with the print apparatus and messages may be signed using a message authentication code based on such a session key. Examples of logic circuits configured to cryptographically authenticate messages in accordance with this paragraph are described in US patent publication No. 9619663.

In some examples, the memory 426 may store data including: identification data and read/write history data. In some examples, the memory 426 further includes cell count data (e.g., sensor count data) and clock count data. Clock count data may indicate a clock speed of a first and/or second timer 404a, 404b (i.e., a timer associated with the first logic circuit or the second logic circuit). In some examples, at least a portion of the memory 426 is associated with functions of a second logic circuit, such as a second logic circuit 406a as described in relation to FIG. 4B above. In some examples, at least a portion of the data stored in the memory 426 is to be communicated in response to commands received via the second address, for example the earlier mentioned initial or reconfigured/temporary second address. In some examples, the memory 426 includes a programmable address register or memory field to store a second address of the processing circuitry (in some examples in a volatile manner). The first logic circuit 402d may enable read operation from the memory 426 and/or may perform processing tasks.

The memory 426 may, for example, include data representing characteristics of the print material, for example any or any combination of its type, color, batch number, age, etc. The memory 426 may, for example, include data to be communicated in response to commands received via the first address. The processing circuitry may include a first logic circuit to enable read operations from the memory and perform processing tasks.

In some examples, the processing circuitry 424 is configured such that, following receipt of the first command indicative of a task and a first time period sent to the first logic circuit 402d via the first address, the processing circuitry 424 is accessible by at least one second address for a duration of the first time period. Alternatively or additionally, the processing circuitry 424 may be configured such that in response to a first command indicative of a task and a first time period sent to the first logic circuit 402d addressed using the first address, the processing circuitry 424 is to disregard (e.g., 'ignore' or 'not respond to') I2C traffic sent to the first address for substantially the duration of the time period as measured by a timer of the processing circuitry 424 (for example a timer 404a, 404b as described above). In some examples, the processing circuitry may additionally perform a task, which may be the task specified in the first command. The term 'disregard' or 'ignore' as used herein with respect to data sent on the bus may include any or any combination of not receiving (in some examples, not reading the data into a memory), not acting upon (for example, not following a command or instruction) and/or not responding (i.e., not providing an acknowledgement, and/or not responding with requested data).

The processing circuitry 424 may have any of the attributes of the logic circuitry packages 400 described herein. In particular, the processing circuitry 424 may further include a second logic circuit wherein the second logic circuit is accessible via the second address. In some examples, the second logic circuit may include at least one sensor which is readable by a print apparatus in which the print material container is installed via the second address. In some examples, such a sensor may include a print materials level sensor. In an alternative example, the processing circuitry 424 may include a single, integral logic circuit, and one or more sensors of one or more types.

Figure 4E:
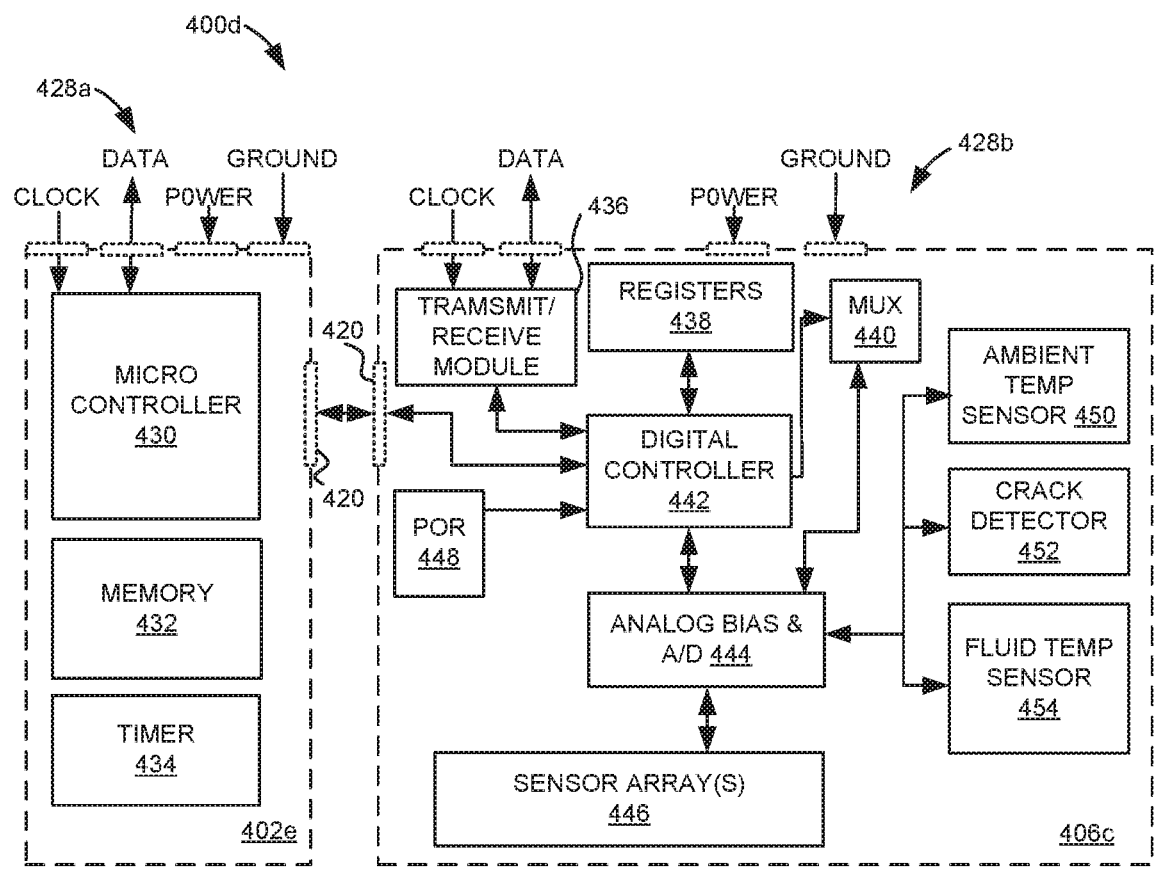

FIG. 4E illustrates another example of a first logic circuit 402e and second logic circuit 406c of a logic circuitry package 400d, which may have any of the attributes of the circuits/packages of the same names described herein, which may connect to an I2C bus via respective interfaces 428a, 428b and to each other. In one example the respective interfaces 428a, 428b are connected to the same contact pad array, with only one data pad for both logic circuits 402e, 406c, connected to the same serial I2C bus. In other words, in some examples, communications addressed to the first and the second address are received via the same data pad.

In this example, the first logic circuit 402e includes a microcontroller 430, a memory 432, and a timer 434. The microcontroller 430 may be a secure microcontroller or customized integrated circuitry adapted to function as a microcontroller, secure or non-secure.

In this example, the second logic circuit 406c includes a transmit/receive module 436, which receives a clock signal and a data signal from a bus to which the package 400d is connected, data registers 438, a multiplexer 440, a digital controller 442, an analog bias and analog to digital converter 444, at least one sensor or cell array 446 (which may in some examples include a level sensor with one or multiple arrays of resistor elements), and a power-on reset (POR) device 448. The POR device 448 may be used to allow operation of the second logic circuit 406c without use of a contact pin 420.

The analog bias and analog to digital converter 444 receives readings from the sensor array(s) 446 and from additional sensors 450, 452, 454. For example, a current may be provided to a sensing resistor and the resultant voltage may be converted to a digital value. That digital value may be stored in a register and read out (i.e., transmitted as serial data bits, or as a 'bitstream') over the I2C bus. The analog to digital converter 444 may utilize parameters, for example, gain and/or offset parameters, which may be stored in registers.

In this example, there are different additional single sensors, including for example at least one of an ambient temperature sensor 450, a crack detector 452, and/or a fluid temperature sensor 454. These may sense, respectively, an ambient temperature, a structural integrity of a die on which the logic circuitry is provided, and a fluid temperature.

Figure 5A:
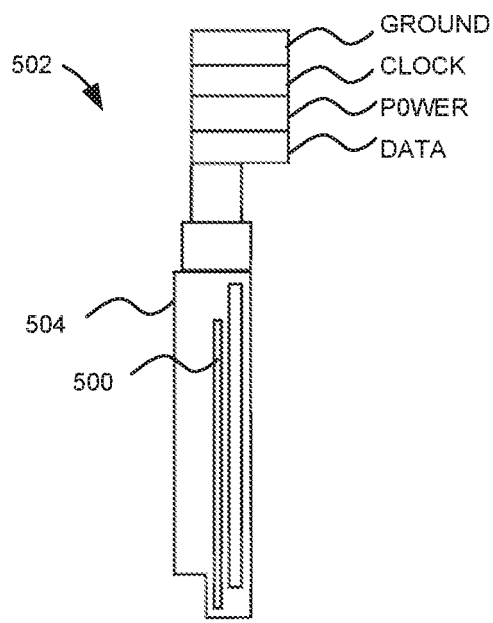
FIG. 5A illustrates one example arrangement of a fluid level sensor.

FIG. 5A illustrates an example of a possible practical arrangement of a second logic circuit embodied by a sensor assembly 500 in association with a circuitry package 502. The sensor assembly 500 may include a thin film stack and include at least one sensor array such as a fluid level sensor array. The arrangement has a high length to width aspect ratio (e.g., as measured along a substrate surface), for example being around 0.2 mm in width, for example less than 1 mm, 0.5 mm, or 0.3 mm, and around 20 mm in length, for example more than 10 mm, leading to length to width aspect ratios equal to or above approximately 20:1, 40:1, 60:1, 80:1, or 100:1. In an installed condition the length may be measured along the height. The logic circuit in this example may have a thickness of less than 1 mm, less than 0.5 mm, or less than 0.3 mm, as measured between the bottom of the (e.g., silicon) substrate and the opposite outer surface. These dimensions mean that the individual cells or sensors are small. The sensor assembly 500 may be provided on a relatively rigid carrier 504, which in this example also carries Ground, Clock, Power and Data I2C bus contacts.

Figure 5B:
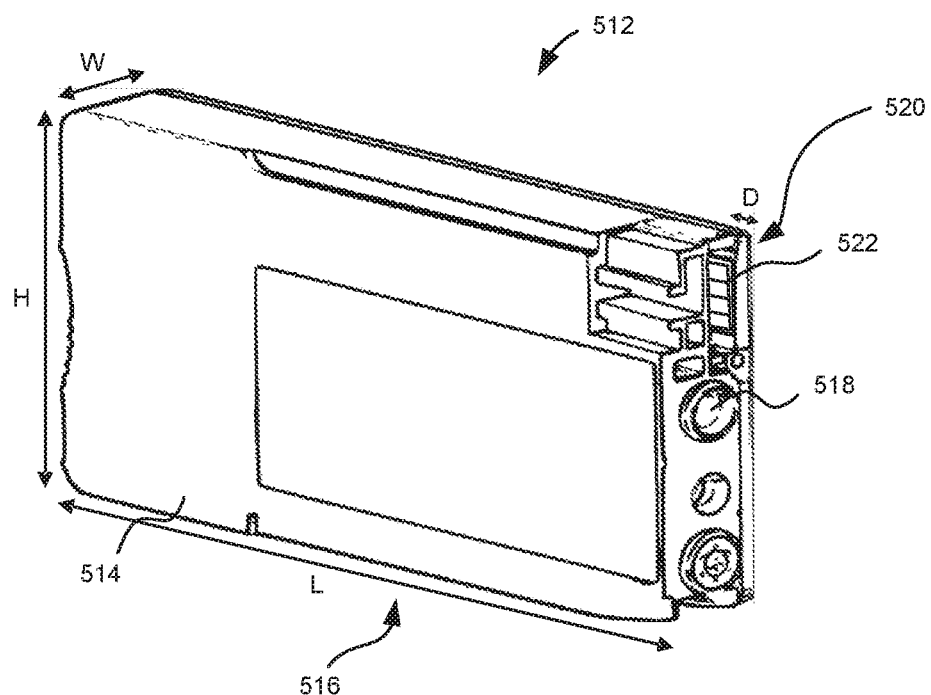
FIG. 5B illustrates a perspective view of one example of a print cartridge.

FIG. 5B illustrates a perspective view of a print cartridge 512 including a logic circuitry package of any of the examples of this disclosure. The print cartridge 512 has a housing 514 that has a width W less than its height H and that has a length L or depth that is greater than the height H. A print liquid output 516 (in this example, a print agent outlet provided on the underside of the cartridge 512), an air input 518 and a recess 520 are provided in a front face of the cartridge 512. The recess 520 extends across the top of the cartridge 512 and I2C bus contacts (i.e., pads) 522 of a logic circuitry package 502 (for example, a logic circuitry package 400a-400d as described above) are provided at a side of the recess 520 against the inner wall of the side wall of the housing 514 adjacent the top and front of the housing 514. In this example, the data contact is the lowest of the contacts 522. In this example, the logic circuitry package 502 is provided against the inner side of the side wall. In some examples, the logic circuitry package 502 includes a sensor assembly as shown in FIG. 5A.

In other examples, a replaceable print apparatus component includes a logic circuitry package of any of the examples described herein, wherein the component further includes a volume of liquid. The component may have a height H that is greater than a width W and a length L that is greater than the height, the width extending between two sides. Interface pads of the package may be provided at the inner side of one of the sides facing a cut-out for a data interconnect to be inserted, the interface pads extending along a height direction near the top and front of the component, and the data pad being the bottom-most of the interface pads, the liquid and air interface of the component being provided at the front on the same vertical reference axis parallel to the height H direction wherein the vertical axis is parallel to and distanced from the axis that intersects the interface pads (i.e., the pads are partially inset from the edge by a distance D). The rest of the logic circuitry package may also be provided against the inner side.

It will be appreciated that placing logic circuitry within a print material cartridge may create challenges for the reliability of the cartridge due to the risks that electrical shorts or damage can occur to the logic circuitry during shipping and user handling, or over the life of the product.

A damaged sensor may provide inaccurate measurements, and result in inappropriate decisions by a print apparatus when evaluating the measurements. Therefore, a method may be used to verify that communications with the logic circuitry based on a specific communication sequence provide expected results. This may validate the operational health of the logic circuitry.

Figure 6:
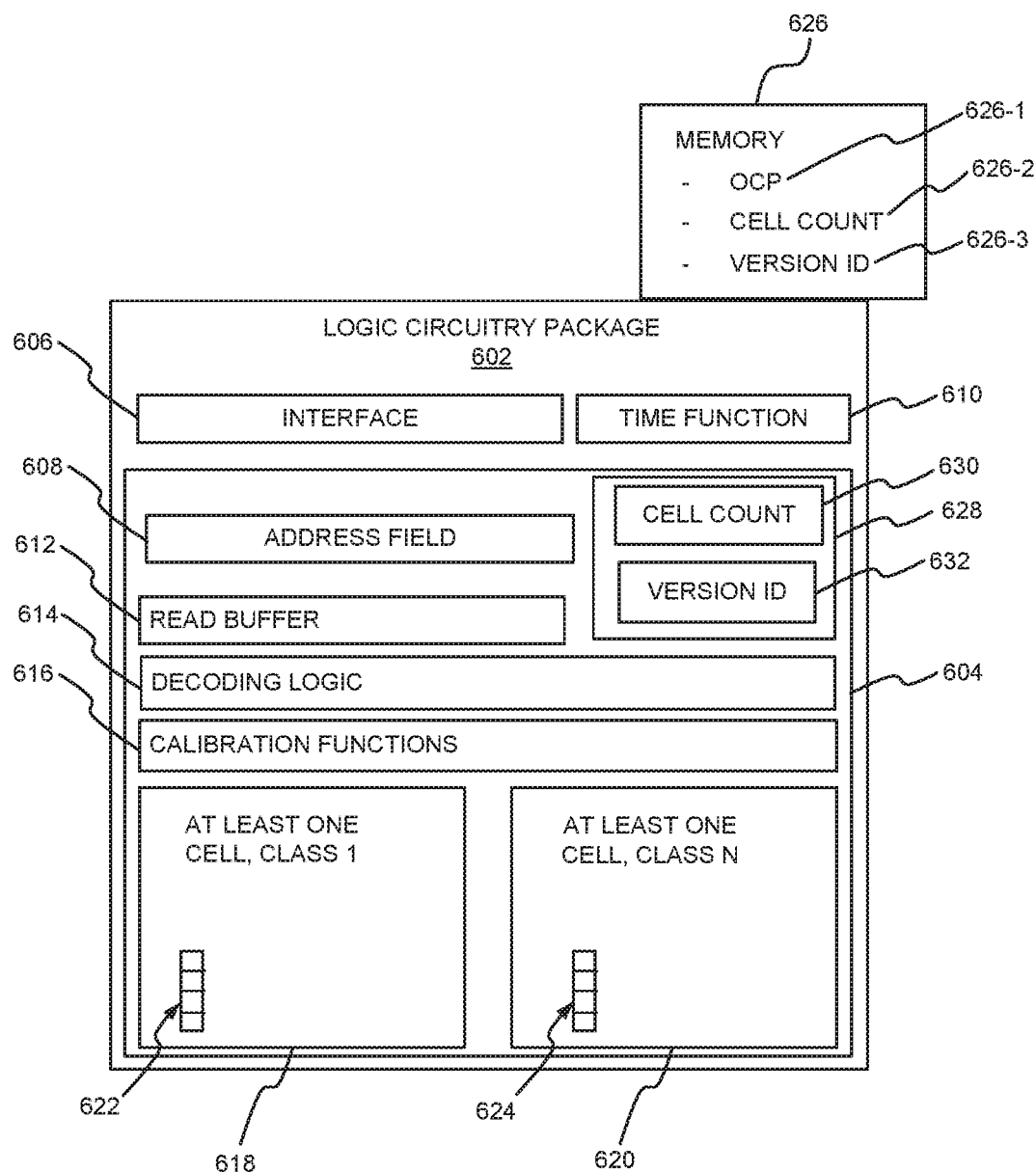
FIG. 6 illustrates another example of a logic circuitry package.

FIG. 6 illustrates another example of a logic circuitry package 602 for a replaceable print component in accordance with different examples of this disclosure. The logic circuitry package 602 may be an intermediate product, configured to be part of a replaceable print component such as a 2D or 3D print cartridge including a reservoir for print material. The print material may be a print liquid (e.g., ink) or print powder (e.g., toner, 3D build powder) or any other agent to print in two-dimensional or three-dimensional print processes.

The logic circuitry package 602 includes at least one logic circuit 604, for example a plurality of interconnected logic circuits, physically integrated in a single support structure or physically separated using different support structures. The package may include a molded compound and/or the print material container as a support structure, whereby sub-circuits or (sensor) cells of the package may be physically electrically connected or wirelessly connected. Where there are different logic circuits, these may be interconnected, at least through the interface 606 and/or through other wiring or wireless interfaces. In one example, the logic circuitry package 602 includes a first logic circuit that is a microcontroller or has the properties of a microcontroller. In a further example, the package 602 includes a logic circuit 604 that responds to commands directed to a different address than a default I2C communication address of the first logic circuit. The logic circuit 604 can be the second logic circuit described above and/or a sensor circuit. The first and second logic circuit addressed previously may be connected to the same interface 606, and may be, but need not be, packaged together in this package 602. In another example, the logic circuitry package 602 has only a single integrated logic circuit with integrated functions, for example in a single compact package.

The logic circuitry package 602 may include a communication interface 606 to communicate with a print apparatus logic circuit through an interface bus, such as an I2C serial communication bus, for example connecting power, data, clock and/or ground, as explained earlier (certain examples may use fewer contacts and harvest power from the clock or data signal). In other examples, the interface 606 may facilitate digital communications that are not in accordance with an I2C communication protocol. In yet other examples, the interface 606 may facilitate analog communications.

In accordance with earlier mentioned principles in this disclosure, the logic circuit 604 may include an address field 608. The address field 608 facilitates that the logic circuit 604 transmits command portions received from the print apparatus logic circuit and directed to the address of the address field 608 to the different functions of the logic circuit 604. The address field 608 may have a default second address (e.g., after reset) and may be adapted to facilitate reconfiguration of its set address to any (e.g., random) new second address. The logic circuit 604 may further include a time function 610 such as a timer or delay circuit that may be monitored or may be set to expire at the end of a specified time period, so that after the time period the logic circuitry package 602 again processes communications over the first address different than the address of the address field 608. The time function 610 is referred to as timer in previous examples of this disclosure.

The timer may include an integral timer, internal to the logic circuitry, for example including a Resistance-Capacitor (RC) circuit configured to act as a timer, logic gates configured with a counter, a crystal or a ring oscillator, a phase lock loop (also known as a phase-locked loop) or the like, or any timer which may logically form part of a logic circuitry package 602. The timer may provide an internal clock signal which is provided even in the absence of a clock signal on the serial data bus. The timer may count and thus allow for determination of the duration of the timer period specified in the first command. In one example, a delay circuit may be provided for the time function which may be at least partly the same as the timer, only that it can be set to expire in accordance with the specified time period, and hence, it does not require monitoring by a controller function of the logic circuitry package 602. The delay circuit may include a plurality of selectable delay circuits, each expiring after a different duration. The delay circuit may include a plurality of delay line switches, each set to expire after a characteristic duration. An example of a delay line switch includes a transistor with a leaking floating gate, or an R-C circuit and a comparator, for example similar to aspects of the timer. In one example, the delay function is configured to, upon receipt of the first command, select the delay line switch that corresponds with the specified time period and enable it.

The package 602 includes a read buffer 612 to be read by the print apparatus logic circuit, for example, through the serial bus interface 606. In one example, the logic circuit 604 is to load a value to the buffer 612 in response to a read request, which value has been generated based on certain previously set or communicated parameters. In other examples, the logic circuit 604 may be configured to output analog signals.

The package 602 further includes decoding logic 614 to identify calibration, class and/or sub-class parameters in an input command stream, which parameters condition the output of the logic circuit 604. The class and sub-class parameters are referred to as sensor ID parameters in other portions of this disclosure. For example the class and sub-class parameters correspond to the sensor ID and the sub-ID, whereby the sensor ID parameters may encompass both the class and sub-class parameters.

The package 602 includes calibration logic including one or more calibration functions 616 to calibrate the output based on the calibration parameters received from the print apparatus logic circuit. The calibration logic may be common calibration logic to calibrate inputs and/or outputs (calibrating an input may affect the output and may in this disclosure be included in calibrating the output) for a plurality of classes.

As will be explained below, each parameter may specify a function (e.g., to indicate which function to address like a certain calibration function, class selection function, or sub-class selection function) and a value (e.g., to set the ID or magnitude of the selected function, for example, to identify which sensor or cell to select). The decoding logic 614 may be configured to identify these parameters and select or set a corresponding logic function (e.g., set a calibration function based on the calibration value; select a sensor based on the class ID; select a sensor cell based on the sub-class ID). The logic circuit 604 may be configured to respond to each read request with an output (e.g., count value) based on the parameters that were last communicated by the print apparatus logic circuit, or, where for certain logic functions no parameters were communicated, based on certain default-parameters-after-reset. In this disclosure logic functions may include a variety of different calibration functions, class selection functions (e.g., sensor select functions) and sub-class select functions (e.g., sensor cell select functions), whereby respective logic functions may be set or selected in accordance with the received parameters. For example, a plurality of logic functions may be selected/set based on a single command stream such as selecting a sensor based on a class parameter, selecting a cell of that sensor based on a sub-class parameter, and, applying certain calibration settings based on certain calibration parameters.

The logic circuit 604 may include at least two cell classes, for example a first and second cell class, each associated with a cell array of nominally the same cells in the same array, yet nominally different between the arrays/classes. The logic circuit 604 may include further cell classes, for example a third and fourth class, each of which is defined by not more than one cell that provides a respective single cell output. In different examples, at least two, three, four, five, six or more different cell classes may be provided, wherein each cell of each class is nominally different than each cell of other classes. For the purpose of illustration, FIG. 6 shows only a limited amount of cell classes 618, 620 and cells 622, 624. In other examples, there could be greater numbers of cell arrays and cells. Cell arrays 618, 620 including sensor cells 622, 624 may also be referred to as sensors, wherein cells of different classes have different sense functions.

In this example, different sensor types may be denominated by class, and cells of the same type may be denominated by sub-class. The example logic circuitry package 602 includes different cell arrays 618, 620 of different classes. Each cell class may be associated with a particular type of cell 622, 624. For example, each cell may be an electrical component and each cell class may refer to an array of electrical components having the same electrical properties. The same properties may refer to the same nominal electrical properties, for example defined by material, physical design, etc. There may be marginal differences between cells of the same array having the same nominal properties due to tolerances or imperfections in fabrication and materials. The cells may have at least approximately the same electrical properties within certain manufacturing tolerances, for example including sensitivity, resistance, impedance, capacitance, conductivity, etc.

Each cell may provide a respective output value or signal in response to being selected and when under charge, whereby the output or signal may be representative of a state of the cell, for example an electrical property state. Print apparatus commands may be received by a logic circuit 604, and class and sub-class parameters may be identified, to facilitate selecting a respective sensor type and sensor cell, respectively, of the logic circuit 604.

The logic circuitry packages 602 may be provided with at least three or four different cell classes. One or two of those classes may include at least 10, 20, 40, 60, 80, 100, or 126 sub-classes, for example, cells of the same nominal characteristics yet associated with different IDs such as different cell numbers. Cells of sensor cell arrays may be selected by associated class and sub-class parameters using the decoding logic 614, to facilitate reading each selected sensor cell by the print apparatus logic circuit. Furthermore, the logic circuitry package 602 may include at least one individual single-cell sensor in which case class parameters may be sufficient to select the cell and sub-class parameters are redundant.

The logic circuit 604 may be configured so that cells 622, 624 of different cell arrays 618, 620 are selected by the same parameter values, for example, after being selected by different class parameters. For example, cells of different classes use the same series of IDs, wherein the IDs can be embodied by binary numbers. This may facilitate sharing of circuitry such as certain decoding logic functions. For example, all or some of the cells of different arrays 618, 620 may be associated with the same cell numbers. For example, the first and further cells of the first cell array are denominated 1, 2, 3 . . . n and the first and further cells of the second cell array are also denominated 1, 2, 3 . . . n. These numbers may be encoded in binary fashion. In other words, a cell of a first class and a cell of a second class, which are nominally different, may be selected using the same sub-class parameters, but preceded by different cell class selections parameters in the command stream.

In other, alternative, virtual embodiments, classes and other parameters are associated with respective portions of a look-up table (LUT), in addition to, or instead of, the physical cells. In, again, other alternative examples algorithms may be used to output certain values based on identified class and other parameters, whereby the classes and/or sub-classes may be difficult to detect. The example of FIG. 6 illustrates different physical cell classes 618, 620 and different physical cell sub-classes 622, 624 whereas alternative, virtual logic functions are discussed elsewhere in this disclosure, such as with reference to FIGS. 25 and 26.

The physical cells may include electrical components including resistors, strain gauges, diodes, different types of sensors, but also "dummy"-cells, test cells or reference cells, for a variety of purposes. In one example, the cells are sensor cells.

Calibration functions 616 may include calibration logic such as one or a combination of offset circuits, gain amplifiers, different AD and DA converter circuits, heater arrays, or virtual (programmed) calibration functions. A virtual calibration function may use offset or amplifier functions similar to hardwired calibration logic circuits. Different calibration functions may be combined in a single calibration logic circuit.

The logic circuitry package 602 may include a memory 626 to store certain characteristics of the logic circuit 604. The memory 626 may be part of the logic circuit 604 or may be separate from the logic circuit 604.

In one example, a second memory 628 is part of the logic circuit and stores a cell count 630 indicative of a number of cells associated with at least one class or with a plurality of classes with the same number of cells. In one example, the cell count 630 is a last cell number (which may be the total number of cells minus one as the first cell may be represented by a 0). For example, the cell count corresponds to a maximum number of cells of one, two, three or more predetermined classes. For example, a logic circuit may have a certain number of temperature sensor cells 624 and the same number of strain sensing cells 622. In another example, a first memory 626, associated with a first address, and the second memory 628, associated with a second address, each store the cell counts 626-2, 630, respectively in a differently encoded fashion. In another example, a value associated with a version/revision ID 632 of the logic circuit 604 is stored in the second memory 628. In one example, the second memory 628 is embodied by a series of memory fields such as registers, addressable by memory addresses.

The cell count and/or version/revision ID can be stored as part of digitally signed data. The count and ID associated with the first (626-2, 626-3) versus second address (630, 632) may match, that is, contain the same yet differently encoded value, in a way that is to be validated by the print apparatus. The data associated with the first versus the second (default or new) communications address, for example stored in the first versus second memory, may be encoded differently, for example, signed and/or encrypted where it is associated with the first address versus not signed and/or not encrypted, respectively, where it is associated with the second address. While the example of FIG. 6 illustrates two separate memories 626, 628, in an alternative example, the logic circuit 604 includes a single memory with the same data, and wherein the logic circuit 604 may be configured to encode the data depending on whether the print apparatus command is directed to the first versus the second address.

The decoding logic 614 is configured to identify, from a command stream received from the print apparatus, class parameters to select respective cell classes 618, 620 based on the parameters. The logic circuit 604 is configured to respond with output values or signals representing the selected cell class. As explained, the cell class may be associated with a cell array 618, 620 or a single cell (e.g., see the example of FIG. 4E). Similarly, the decoding logic 614 is further configured to identify, from the command stream, cell sub-class parameters, to select a cell 622, 624 of a previously selected cell array 618, 620.

The decoding logic 614 may be configured to load the parameters specified in commands and select the corresponding sensors and cells, or set the corresponding calibration functions. For example, the decoding logic 614 includes a memory field arrangement to store parameters for respective logic functions, the logic functions including the calibration function 616 as well as the sensor classes 618, 620, and sensor cells 622, 624. Each memory field may be adapted to store a parameter for a connected logic function, for example to store a cell class number, a cell number, a calibration parameter, etc. The memory field arrangement may include shift registers as explained in earlier examples. The decoding logic 614 may further include multiplex logic to set the logic functions in accordance with the parameters stored in the memory fields, for example connecting these memory fields with the logic functions. The multiplex logic may include a series of flip-flops, latches, and/or switches. In one example, upon receiving commands specifying the second (default or new) communication address, the decoding logic 614 loads the respective parameters and shifts the bit values to set or select the respective logic function.

In one example, communicated parameters identify each function by a register address. The decoding logic 614 may include 8-bit input registers whereby each register is associated with a particular function, such as the sensor selection, cell selection and (a particular type of) calibration, for example through the multiplex logic. Alternative examples that are discussed elsewhere in this disclosure may use virtual decoding logic functions, embodied by instructions to be executed by a processor, to identify the parameters in the command stream and set or select respective (virtual) logic functions to provide outputs that the print apparatus logic circuit may validate.

The logic circuit 604 is configured to, when the sensor cells are charged, and a respective cell is selected, output a value representing a reading of the selected cell, whereby the output is calibrated in accordance with the (received or default) calibration parameters. A cell reading inside the logic circuit 604 may include a voltage or other analog reading, while an output after conversion may be a digital value such as an output count value. The logic circuit 604 is configured to, in response to a read request, output a respective value or signal associated with the (last) selected cell, applying the last received calibration parameters. The output, be it digital or analog, may represent a state of a selected cell, such as temperature, stress, resistance, voltage state, etc.

The "parameters" in the commands condition the output by the logic circuit 604. The parameters may select a particular cell of a particular sensor in an array, or a particular calibration setting. Another parameter that conditions the output is the time period during which the package 602 responds to commands directed to a second and/or new address different from the first address, although it may condition the output duration and input address rather than individual output count values.

"Identifying" a parameter in a command stream, such as a class, sub-class or calibration parameter, includes distinguishing the respective parameters from other bits in a bitstream (like other not-related commands, start bits, end bits, acknowledge bits, communication address bits, etc.), to be able to process and/or act upon these parameters to appropriately condition responses. This decoding ability (i.e., decoding function) may be hardwired or programmed or both. For example, by identifying a class or sub-class parameter, the decoding logic 614 may use the associated class or sub-class for generating the output, either through physical electrical measurements and/or through a LUT or calculation, or in a hybrid fashion that combines physical cell readings with virtual data to generate a digital output. Various hardwired examples with analog sensor arrays have been described in this disclosure as well as alternative "virtual" examples that are designed to emulate the output in accordance with their hardwired/analog counterparts.

In one example, at least one calibration function 616 of the logic circuit 604 is to condition the output based on the input calibration parameters. In this disclosure, it may be understood that conditioning an input (e.g., DA conversion, offsetting and/or amplifying an input to cells before conversion by the cells) also conditions the output. Hence any signal calibration between command and response may be considered as conditioning the output. Calibration parameters may be adjusted by the print apparatus logic circuit based on returned output values. After reading an output of the logic circuit 604, based on certain previous calibration parameters, the print apparatus logic circuit may send new calibration parameters in response to which the logic circuit 604 may output new outputs.

Certain operational calibration parameters may be used to set a cell output to a suitable value within an operational or readable output range to facilitate determining a suitable range of different states of a respective cell. Furthermore, certain operational calibration parameters may be determined for returning states of multiple cells within the suitable range. Operational calibration parameters for one class may be different than operational calibration parameters for another class. Different nominal electrical properties between different classes may result in different outputs between these classes, even where the applied charge and calibration parameters are the same. That said, it may be that specific operational calibration parameters can be made to work for one and the other class. Such specific calibration parameters could include a relatively low amplifier parameter. For low amplifier parameters, however, a variation between outputs of different cells may be relatively small, for example too small to be able to correctly determine different cell states. In examples of this disclosure, certain more optimal operational calibration parameters tend to be different for different classes, and there may be different sets or ranges of operational calibration parameters between classes. Also, calibration parameters related to a heater function may be used to influence output of a temperature sensor cell array while such heater function may not suitably influence output of a strain sensing cell array.

The calibration functions 616 may be integral to the logic circuit 604. Calibration functions 616 may include offset functions, amplifier functions, and conversion functions. These functions could be hardwired and defined by offset circuits, gain amplifiers and AD (Analog to Digital) or DA (Digital to Analog) conversion circuits, respectively, separately or in combination. For example, an offset and DA conversion may be combined in a single logic (e.g., VDAC) function, for example, where the offset function is provided by the DA converter, that, besides converting, is also configured to offset (i.e., set) an input power or voltage or a reference voltage, with respect to a power and ground of the I2C interface 606.

Further calibration functions 616 may include heat cell (i.e., heater) selections, heat power settings, heat timing, for example, for association with a temperature sensor array 620 to sense print material level. Alternative example calibration functions are embodied by programmed instructions, for example configured to offset or amplify certain input values on the basis of received calibration parameter values for example using a LUT or calculation.

In one example, each memory field of the decoding logic 614 is associated with a predetermined calibration function 616. The decoding logic 614 identifies received calibration parameters to store parameter values in associated memory fields, for usage as input parameter for the selected calibration function 616. In a non-operational, e.g., on-the-shelf and/or after-reset state, the calibration function 616 may be pre-set to default values. The calibration function 616 may be configured to switch to default values at or after each second/new address-enablement between time periods. Default or previously written calibration values apply to each of the calibration functions until a command is provided with new calibration values which replace (e.g., overwrite) the previous calibration values.

In one example, the same calibration functions 616 may commonly apply to a plurality of classes 618, 620. For example, the amplifier and/or offset functions are configured to calibrate outputs of cells of both first and second cell arrays, or of all cell classes. Hence, where certain calibration parameters are applied to cells of a first array, they can be repeated for a second array if no new calibration parameters have been set, at least during the same time period where the second/new address is enabled. In certain instances, however, a print apparatus logic circuit may choose to apply different calibration parameter values to different classes, for example to use more optimal operational calibration parameters for a respective class. Therefore, when the logic circuit 604 receives a new class parameter to select a new class, previously used operational calibration parameters with which in-range output values were generated for a previous class, may now generate outputs outside of the range or at the ends of the range, i.e., not-operational calibration parameters, so that new (operational) calibration parameters are applied for the new class.

In a further example, a heating element array or heater cell array may be provided, which in one example is considered one of the calibration functions 616, for example part of the calibration logic. Such heater cell array may extend along a corresponding temperature sensor cell array (for example, see also FIG. 4B and international patent application publication WO2017/074342). Correspondingly, certain input heat parameters such as heater cell selection, heat time and heat power may be considered calibration parameters. Changing the heat parameters may in fact influence the state of the temperature sensor cells, different than certain other calibration parameters (offset, amplify) that only calibrate the output value without directly influencing a cell state.

Figure 7:
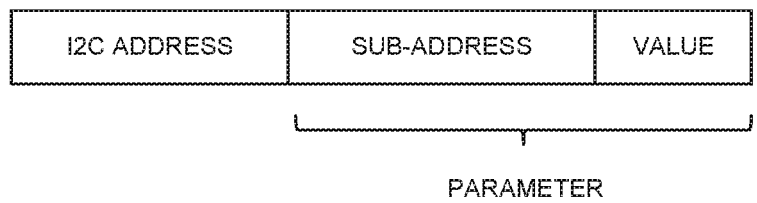
FIG. 7 illustrates an example of a command including a parameter.

As illustrated in FIG. 7, each command may be defined by a series of data frames including a parameter, wherein the command is configured for processing by the logic circuit 604 of various examples of this disclosure. The command of FIG. 7 illustrates three data frames. One data frame has encoded therein the I2C communication address, another data frame has encoded therein parameter function (here embodied by a sub-address such as a memory or register address) and another data frame has encoded therein the parameter value, whereby the function and value define the parameter. Acknowledge bits may be provided between data frames, for example for the logic circuit to identify the different data frames.

Each parameter may specify one or more functions and one or more corresponding values. In this example, the parameter function is defined by a sub-address (called "sub-address" to distinguish from the second and/or reconfigurable address of the logic circuit) such as a memory field address, for example a register address, for example to select an 8-bit memory field or register for writing the parameter value. The parameter function determines which logic function (class, sub-class, calibration) to address. The data frame of the function may consist of 8 bits. The data frame of the parameter value may consist of 8 bits, to write to the memory field. The sub-address of the parameter is called function in this disclosure because the sub-address determines the memory field and, in turn, the memory field selects a respective logic function (e.g., calibration function, sensor class selection function, sensor cell sub-class selection function) to be set to its stored parameter value. To illustrate this, a class parameter can include a class selection register address and a value to select the class that is identified by that value. Similarly, a sub-class selection parameter can include a sub-class selection register address and a sub-class number, for example to select the cell associated with the number. Aspects of registers and register addresses are also described with reference to FIG. 4A.

For example, a first command to the logic circuit specifies a new (e.g., reconfigured/temporary second) I2C communications address, a first calibration parameter function, and a calibration parameter value; a second command specifies a new I2C communications address, a second calibration parameter function, and a calibration parameter value; a third command specifies the new I2C communications address, a class parameter function, and a class parameter value; and a fourth command specifies the new I2C communications address, a sub-class parameter function, and a sub-class parameter value. This facilitates the logic circuit to select the appropriate class and sub-class and appropriately set the selected calibration functions. Note that the sequence of these commands may vary. In one example, any sequence may be applied because the corresponding logic functions will only be activated in response to a certain calibration parameter (e.g., offset and/or DA conversion) and/or a read request.

In one example, the parameter value data frame may include a set of used (or: to-be-used) bits and a set of not-used (or: not-to-be-used) bits, whereby the set of used bits define the parameter value. The set of used bits may include the least significant bit. The not-used bits in the same data frame are not used by the respective logic function and may include the most significant bit. For example, a class can be selected based on bit-combinations of only three first bits including the least significant bit, ignoring five remainder bits in the data frame including the most significant bit. A sub-class can be selected based on bit-combinations of only seven bits including the least significant bit, ignoring the most significant bit in the data frame.

A memory field of a single address may drive several logic functions. Correspondingly, different bits of the parameter value data frame may drive different logic functions. In such example, the parameter function and parameter value of a single command transaction may actually encompass several parameter functions and several parameter values, respectively.

Certain bits typically included in the command, such as start bits, stop bits, acknowledge bits and/or other bits, are omitted from FIG. 7. The command structure may follow an I2C communication protocol. A single complete transaction or command may include an I2C address (e.g., the second default or new address) and the parameter.

The logic circuit 604 may be adapted to identify each of these fields (I2C address, register address, value) and respond (or not) accordingly. For example, a stream of different commands, wherein each command includes a separate parameter, may be illustrated by a repetitive sequence of the command illustrated in FIG. 7. Each command, also called transaction, may include a start bit, an I2C address, a register address, a value, and a stop bit. Also, other (not named) bits may be included such as acknowledge bits and certain not-used bits.

It is again noted that in one example the logic circuit is configured to select sensors using the class, and where necessary, sub-class, parameters. In such example, the class and sub-class parameters are the sensor ID parameters. In an alternative example that uses fewer or no sensor cells, the sensor ID (class/sub-class) parameters are used to select or at least drive the responses, to satisfy the print apparatus logic circuit.

Figure 8:
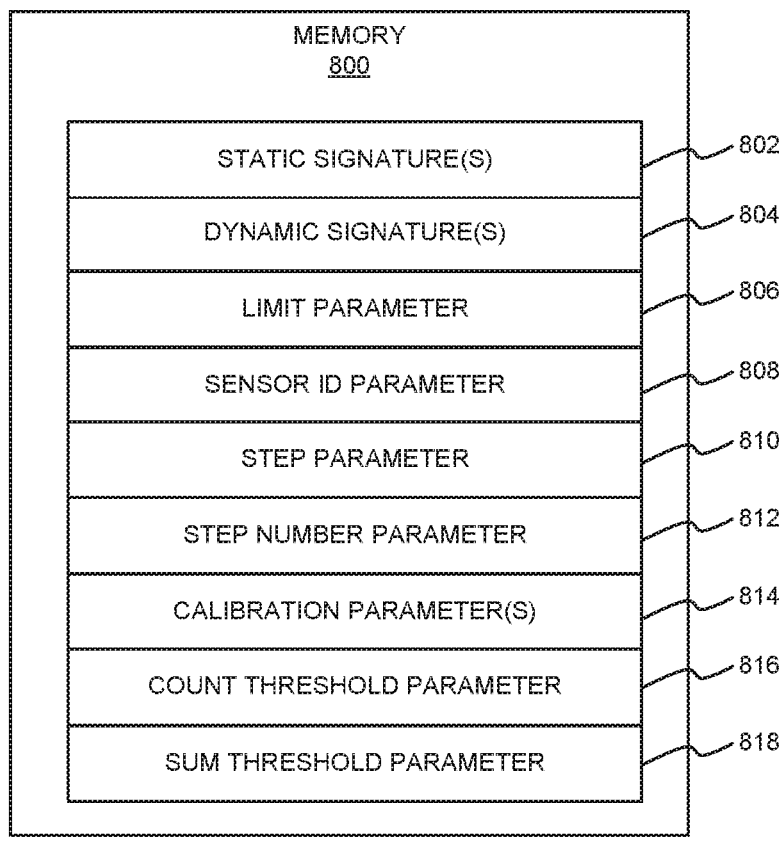
FIG. 8 illustrates one example of a memory of a logic circuitry package.
Figure 25:
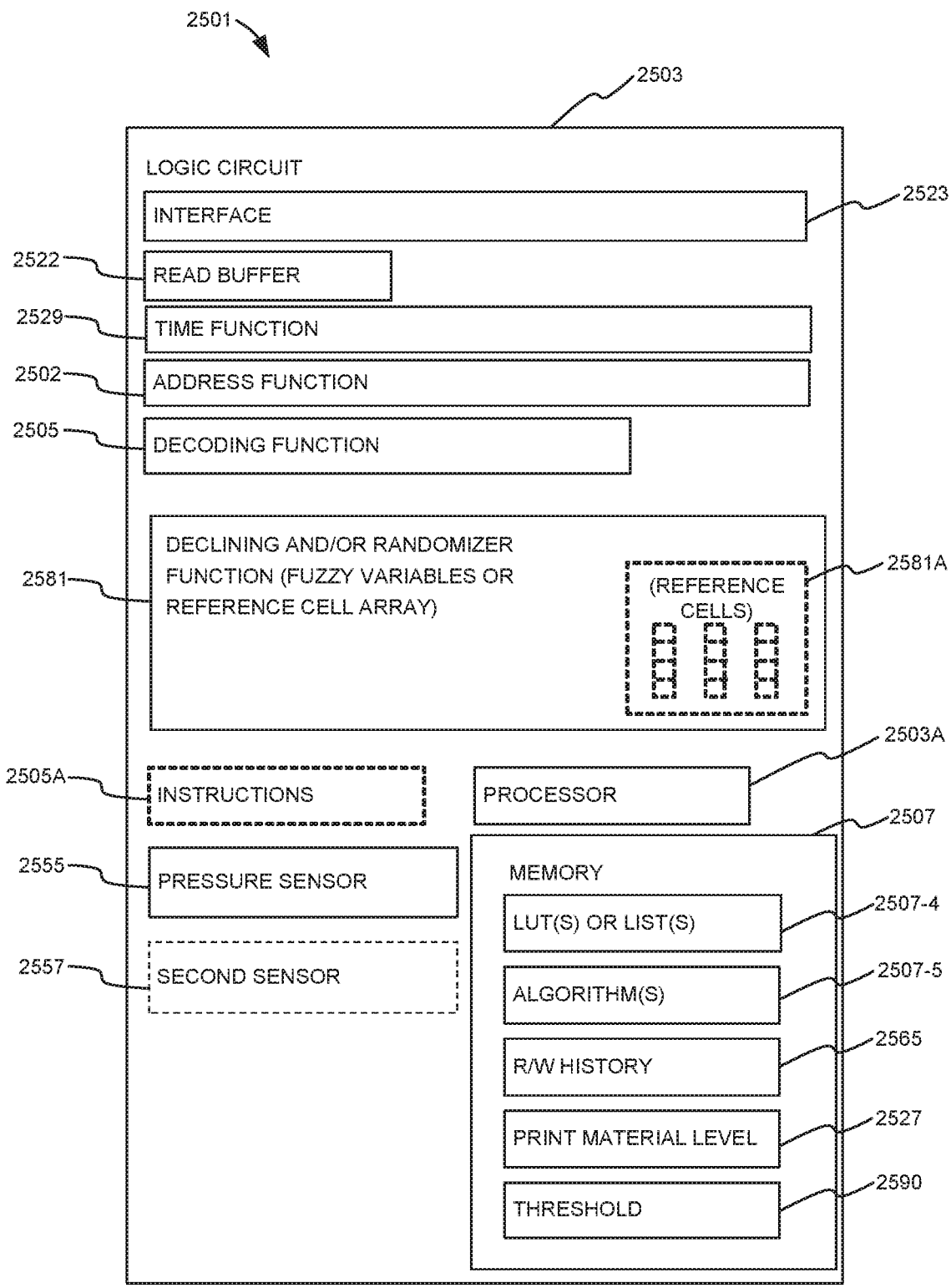
FIG. 25 illustrates another example of a logic circuitry package.
Figure 26:
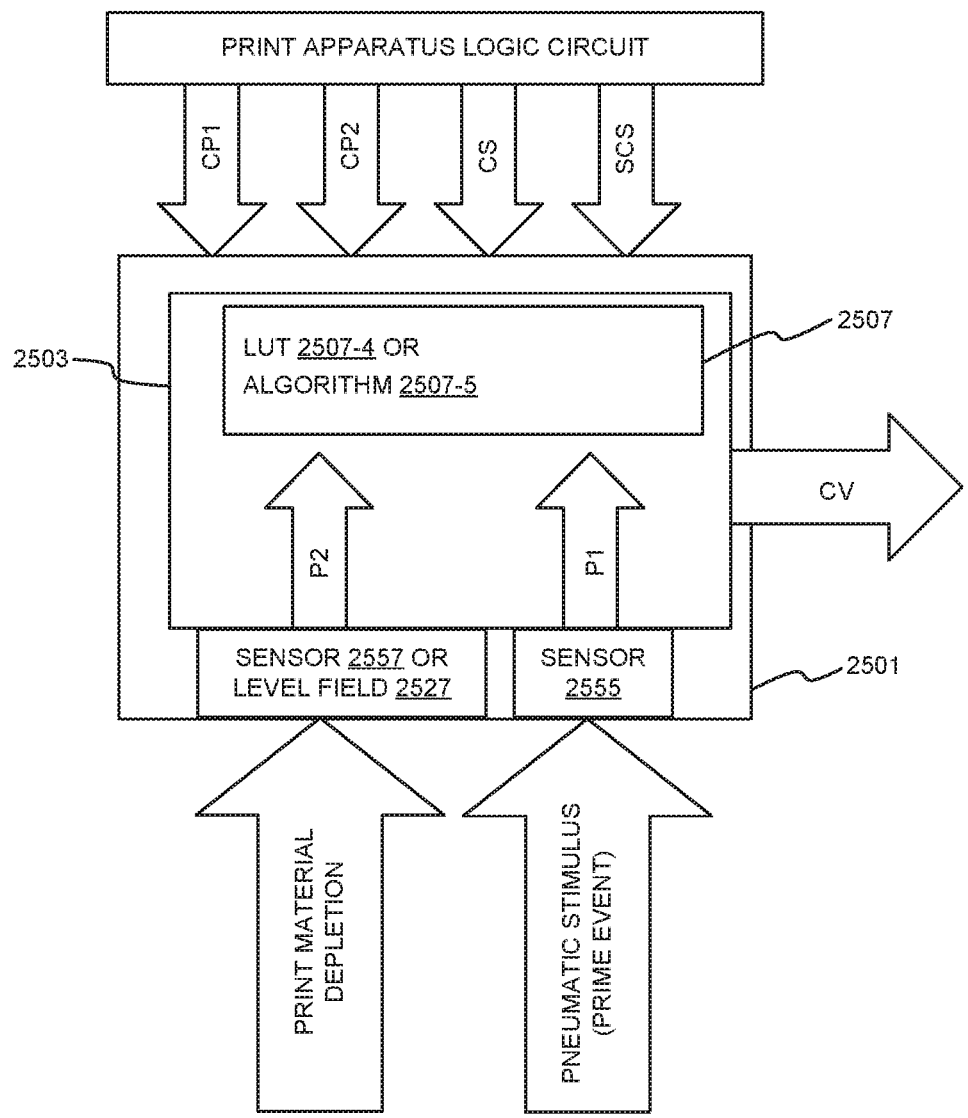
FIG. 26 illustrates example aspects of the logic circuitry package of FIG. 25.

FIG. 8 illustrates one example of a memory 800 of a logic circuitry package, which may provide a part of memory 423a of logic circuitry package 400c (FIG. 4C), memory 426 of processing circuitry 424 (FIG. 4D), memory 432 of logic circuitry package 400d (FIG. 4E), memory 626 of logic circuitry package 602 (FIG. 6), or a memory 2507 (FIG. 25 or 26). Memory 800 may store, in addition to other values previously described, static signature(s) 802, dynamic signature(s) 804, a limit parameter 806, a sensor ID parameter 808 (e.g., including at least one of a sensor type ID, or class, and a sensor cell ID, or sub-class), a step parameter 810, a step number parameter 812, calibration parameter(s) 814, a count threshold parameter 816, a sum threshold parameter 818, and/or other suitable parameters for operating a logic circuitry package. In some examples, each of these values or a subset of these values stored in memory 800 may be digitally signed. In one example, these values are representative of certain physical (i.e., mechanical) properties of the component and/or logic circuitry package while in another, alternative, example the values may be stored to satisfy the print apparatus logic circuit. In the latter example, the values do not need to correspond to the actual physical properties of the component or logic circuitry package, which can be an advantage.

As will be described in more detail below, in one example, the stored static signature(s) 802 correspond to mechanical properties (e.g., strain) of a replaceable print apparatus component, either when the component is in a resting state where the component is not being pneumatically actuated and/or when the component is in an actuated state where the component is pressurized to a predetermined pressure. In one example, the stored static signature(s) 802 may include expected static signature(s) for comparison to measured static signature(s) of a component. The stored static signature(s) 802 may also include a minimum range and a maximum range for the expected static signature(s) to compare to the measured static signature(s). The static signature(s) of a component may be measured by a plurality of electrical cells of a logic circuitry package of the component, for example strain sensing cells.

The stored dynamic signature(s) 804 may correspond to a mechanical properties (e.g., strain) of the replaceable print apparatus component when the component is being pneumatically actuated. In one example, the stored dynamic signature(s) 804 may include expected dynamic signature(s) for comparison to measured dynamic signature(s) of a component. The stored dynamic signature(s) 804 may also include a minimum range and a maximum range for the expected dynamic signature(s) to compare to the measured dynamic signature(s). The dynamic signature(s) of a component may be measured by a plurality of electrical cells of a logic circuitry package of the component, for example strain sensing cells.

The stored limit parameter 806 may be a minimum value used to compare to a measured value to determine whether the measured value is valid. In one example, the stored limit parameter 806 is a noise limit parameter used to validate strain sensing cell readings. The stored sensor ID parameter 808 may indicate a sensor class and/or sub-class for an initial sensor cell to be used in a series of sensor cell readings. In one example, the stored sensor ID parameter 808 identifies a strain sensing cell. The stored step parameter 810 may indicate the step size for selecting sensor cells in a series of sensor cell readings. In one example, the stored step parameter 810 indicates a step size for a series of strain sensor cell readings. The stored step number parameter 812 may indicate the number of steps in a series of sensor cell readings. In one example, the stored step number parameter 812 indicates the number of steps in a series of strain sensor cell readings. The stored calibration parameter(s) 814 may include operational offset and/or gain parameters as previously described, for example, for the strain sensing cells and corresponding to some or all of the other parameters 802, 804, 806, 808, 810, 812. The stored count threshold parameter 816 may include a count threshold to compare to a measured count for determining whether a pneumatic actuation event was completed successfully. The stored sum threshold parameter 818 may include a sum threshold to compare to a measured sum for determining whether a pneumatic actuation event was completed successfully. The values of the parameters and the types of parameters of FIG. 8 were chosen to facilitate a leak detection system while preventing inhibiting occurrences of failures or false rejects.

It is again noted that in certain alternative examples, the parameters of FIG. 8 are also stored in a corresponding memory 800. Such parameters may not directly correspond, at least not necessarily, to the mechanical properties of the component or package. These parameters may be used as part of a digital signature which the print apparatus logic circuit may request per standard procedure. The logic circuit of the alternative package may be configured to generate the output of the logic circuitry package, partly based on, or compliant to, some of these respective parameters, for the print apparatus logic circuit to validate the output. With respect to hardwired sensor arrays, alternative emulating logic circuitries storing said parameters may be more robust against failures or false rejects just to facilitate printing, for example at the cost of reliable leak detection.

Figure 9:
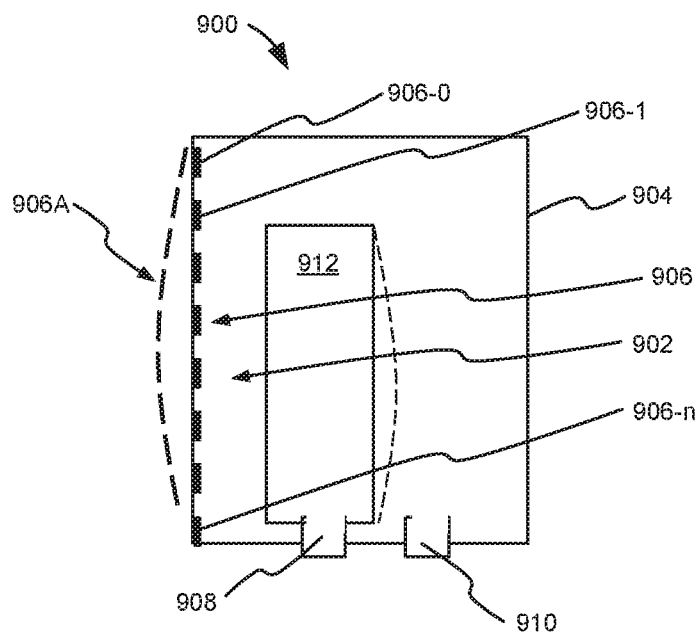
FIG. 9 illustrates an example of a replaceable print component with a first sensor cell array.

FIG. 9 illustrates an example of a replaceable print component 900 with a sensor cell array 902. The sensor cell array 902 can be used in any of the logic circuitry packages disclosed in this disclosure. Sensor cell array 902 may detect a pneumatic stimulus. The sensor cell array 902 can be mounted to the replaceable print apparatus component 900 including a reservoir 904, for example a wall that defines a side of the reservoir 904. In this example, the sensor cell array 902 includes strain sensing cells (e.g., strain gauges) 906-0, 906-1, . . . 906-n, arranged over the surface of a print material reservoir 904, for example mounted to an inside of a wall of the reservoir 904. For example, the sensor cell array 902 may include over 10, over 20, over 40, over 60, over 80, over 100, or over 120 cells; in one example, 126 cells. The strain sensing cells 906 may include piezo-resistive cells (for example, thin film elements), the resistance of which may change when strain is applied. An example of an earlier publication disclosing the implementation of strain gauges in a printhead die is international patent application publication No. WO2018/199891A.

In one example, the print material reservoir 904 includes an air interface 908, through which pressurized air may be introduced, and a print material outlet 910. The air interface 908 may be an air input for example including a socket with elastomer seal. When the print material reservoir 904 is pressurized through the air interface 908, the surface of the wall to which the cells 906 are mounted deforms, for example bulges outwards, and the strain sensor cells 906 may be placed under strain, illustrated in FIG. 9 by line 906A. In one example, an increasing resistance as a result of the increasing strain, may decrease a voltage output of the cells 906A. In other examples, the sensor circuit could be placed so that a cell resistance could decrease as a result of the pressurization and/or deformation, and a returned voltage could increase. The analog output (e.g., voltage) may be converted to a digital output (e.g., ADC count value), which digital output may vary in accordance with the analog output.

A pneumatic stimulus or pressurization may be applied by a print apparatus to the print apparatus component 900. In one example, the pneumatic stimulus and/or pressurization is applied by an external pump of the print apparatus that applies pressurized air through an air input (e.g., 518 of FIG. 5B) of the component.

The pneumatic stimuli (or "events") for the example components of FIG. 9 may include a supply pressurization, hyperventilation and/or push-priming whereby air is blown into a replaceable print apparatus component, for example to pressurize the component and push print material out through its output. Certain pneumatic events may include (i) a start-up prime, when a print apparatus is started for the first time; (ii) a print apparatus component change prime which may occur when a replaceable print apparatus component has just been installed; and (iii) a printhead recovery "squish" prime to push liquid through the printhead; whereby in some examples each prime (i, ii, iii) can be associated with a different pressure. In one example, a prime event is associated with a series of repetitive subsequent air pressure pulses by the print apparatus, in some examples each pulse being of the same force, whereby with each pulse a pressure in the reservoir accumulates. In another example, repetitive pulses are associated with, for each pulse, a pressure increase and subsequent decrease in the print material reservoir without accumulating the pressure in the reservoir based on the subsequent pulses.

In this disclosure a pneumatic stimulus or pressurization includes at least a single prime pulse, up to a complete series of pulses and/or longer continuous pressurization, for example, induced by pressurized air through air interfaces of the print apparatus components. While each prime or hyper-inflation pulse may be very short, e.g., around one or two seconds, a complete prime cycle, from the print apparatus' perspective, can take longer, for example between 10-60 seconds. From the print apparatus' perspective, such prime cycle could include certain set up routines, including calculations, a series of hyperinflation pulses as addressed already above, and further associated service routines such as spitting and wiping. The sensor of this disclosure may detect a pneumatic stimulus in less than a second, for example based on a single pulse, and/or may function during a complete prime cycle. For example, in a print platform where the operational reservoir pressure is below 0 kPA gauge pressure, a single pulse could increase pressure above 0 kPA, for example depending on the chosen prime settings, to a point above 7, 14, 20 or 23 kPa, whereby the extent of time that the component is externally pressurized above 0 kPa may be between 0.5 and 3 seconds, for example less than approximately 3 seconds, including a ramp-up and a ramp-down of the pressure as it builds and dies out in the reservoir.

In any event, a pneumatic stimulus (or series of stimuli) applied to the replaceable print apparatus component may be associated with a pressure event. As will be explained in various examples, the sensor 902 can be used to detect and/or verify and/or control prime pressures, print material leakage and/or air leakage, or for other purposes such as print apparatus compatibility. Throughout the rest of this disclosure, the sensor 902 to detect the pneumatic stimulus may also be referred to as a first sensor and/or may be associated with a first class and first class parameter.

A negative gauge pressure, also referred to as a backpressure, is present when a pressure in the reservoir 904 is approximately at or slightly below atmospheric pressure (for example between 0 and −3 kPA gauge pressure). Such negative gauge pressure or backpressure may prevent drooling of print liquid out of a print liquid outlet 910. The backpressure should be negative enough to prevent drooling but not too negative to not resist too much against print material extraction by the print apparatus. The backpressure in the reservoir 904 may be facilitated by a pressure structure 912 such as a variable volume (e.g., expandable/collapsible) air chamber in the reservoir 904. Certain variable volume chambers may resist expansion, like, for example, a spring biased (e.g., flaccid) bag; an elastic balloon; a molded air chamber having at least one biased (e.g., spring biased or elastic) flexible wall; or by other example pressure structures. FIG. 9 diagrammatically illustrates an expansion of such variable volume chamber with an added, convex dotted line along pressure structure 912. In the field, such pressure structure may sometimes be referred to as a regulator. Further channels, valves and springs may, but need not be, applied for further internal liquid and air pressure control.

The pressure structure 912 may be connected to the air interface 908, so that the approximately 0 or negative pressure may be uplifted by a pneumatic stimulus as will be further explained below. As said, in one example, the pneumatic stimulus is caused by pressurizing the air interface 908, which may result in a higher positive reservoir pressure that stimulates print material flowing out through the print material output 910. Examples of pressure structures are described in earlier publications including US patent publication Nos. 7862138, 8919935, 9056479, and 8998393.

In one example, the sensor cells 906 are mounted to a reservoir wall of plastics, of about 1-2 mm wall thickness. A wall may be locally thinned for better strain sensing. For example, a lowest or nearly lowest cell may extend relatively close to a bottom of the reservoir 904 and a respective wall portion may deflect only for a small amount or almost nothing, in response to the pneumatic stimulus. Even in a state where no external pressure is applied to the reservoir 904 or air interface 908, different cells 906 may experience different strains.

In certain examples, the gauge pressure applied to the reservoir 904 by the print apparatus may be at least approximately 7 kPA, at least approximately 14 kPA, or at least approximately 20 kPa, for example approximately 23 kPA at a peak of air pressure as applied by a print apparatus pump to the air interface 908 as measured inside the reservoir 904. The print apparatus may send a read request at a point in time near an expected pressure peak, for example during a pump instruction by the print apparatus. Hence, the sensor cell array 902 may be configured to respond to a pressure change of at least approximately 7 kPA, at least approximately 14 kPA, or at least approximately 20 kPa. The logic circuitry package is configured to respond with different count values when there is a normal operating gauge pressure inside the reservoir of, for example, between approximately −3 and approximately 0 kPa as compared to when the gauge pressure in the reservoir is higher than 7 kPA, higher than 14 kPA, or higher than 20 kPA.

In some examples, where output count values may vary in a range of 0 to 255 (due to the ADC output), calibration may occur to a pre-selected sensor cell 906, for example a lowest cell, so as to provide an output count of at least approximately 150, at least approximately 200, or at least approximately 225, and below 245, for example in the absence of a pneumatic pulse. This gives some margin for deviations above the highest count and even more margin for the lower counts associated with other cells and pneumatic stimuli, while inhibiting signal clipping at 0 and 255.

In some examples, the calibration may be carried out on a single cell to aim for a target count value of above approximately 150, or above approximately 200, for example between 150 and 245. In one example, a sensor cell which is expected to be under the least strain (or at least under a relatively low strain) during pressurization may be selected for calibration, such as a lowest cell, for example during a time when no effect of a pneumatic stimulus is expected, whereby the sensor cell may be expected to output a highest count value HC. In these examples, the target highest count value HC may set above 200, for example between 225 and 245, and an offset parameter may be adjusted until this value is achieved. Other sensor cells may be expected to render lower count values during the pneumatic stimulus, whereby in one example the difference between the cell with the highest count value HC and other cells may be calibrated using the amplifier parameter. The calibration parameters may be determined to be operational calibration parameters, and may be stored in a print apparatus logic circuit at the end of a calibration cycle and then used for subsequent read cycles. In certain examples, one or more calibration parameters may be used that are prestored in a memory (e.g., memory 800 of FIG. 8). In other examples, wall thicknesses and strains between reservoirs and first sensors 902 of the same nominal properties may vary unpredictably so that calibration is to occur at customer installation.

In some examples, a reading may take place during a pneumatic event, for example associated with an internal pressure of the reservoir 904 of at least approximately 7 kPa. In such examples, it may be expected that an output count value of a chosen cell is in a range which is below a threshold value (for example, below approximately 180, or below 150, or below 100). In one example, the sensor cell 906 which is expected to be under a relatively high amount of strain may be selected for reading, for example a sensor 906 outputting a relatively low output count value such as the lowest count value LC. In some examples, if, after calibration, a pneumatic stimulus is applied, and an expected behavior for one or more chosen sensors is/are not detected (e.g., there are no readings below the threshold), this may indicate that the pressurization event is not functioning properly, for example, because of a leakage in the reservoir or air chamber.

In one example, the logic circuit with the sensor cell array 902 is configured to detect a potential leakage of the reservoir 904, for example during a prime cycle. For example, the effect of the pneumatic stimulus may be associated with a relatively high internal reservoir pressure above atmospheric pressure, or above 7 kPA, above 14 kPA, above 20 kPA, or above 23 kPA gauge pressure, for example at a point in time just after the pump stopped pressure build-up. If a returned count value is above an expected threshold, say above 200 counts, then there may be a leakage of liquid or air in the reservoir 904 that caused the pressure to be under that threshold.

In one example, the sensor cell array 902 is mounted to a wall of the reservoir 904. Accordingly, the sensor cell array 902 can be provided in the inside of the reservoir 904, against an inner wall of the reservoir 904, for example near a front and up to a bottom of the reservoir 904, at least, in an operational orientation of the reservoir 904, for example on the same substrate as the print material level detection sensors as described in other portions of this disclosure. In another example, the first sensor cell array 902 can be mounted to the exterior of the reservoir 904 where it can still sense wall deflection and correspondingly, the pneumatic stimulus and/or its pressure characteristics. In a further example, the sensor cell array 902 has an elongate shape wherein the length is at least five times, ten times, or twenty times greater than a width and/or thickness. The array 902 may include cells 906 that are nominally the same having at least 20, 30, 40, 50, 80, 100, or 120 cells, for example 126 cells. The sensor cell array 902 can be part of a thin film stack that connects to the interface of the logic circuitry package. The sensor cell array 902 may be configured to output a plurality of different signals associated with the same pneumatic/pressure event.

In one example scenario, at installation, the printer apparatus may send a command stream to a logic circuitry package to select cells of the first sensor cell array 902, the command stream including calibration parameters, a class parameter including a first sensor class selection, and sub-class parameter(s) including sub-class selections associated with the cells 906. Again, the class and sub-class parameters correspond to the sensor ID parameters explained elsewhere in this disclosure. In response, the logic circuit may identify the parameters, and select the pneumatic sensor cell array, and the respective pneumatic sensor cell(s) 906, and output, for example in a read field of the logic circuit 604 in response to a read request, the count value corresponding to the state of the cell(s).

When a sensor cell is consulted for the first time at installation, for example during a prime or hyperinflation event, the logic circuit may output a clipped, too high or too low count value. In repetitive calibration cycles, the calibration parameters may be adjusted until count values are returned that are within the output count value range or sub-range and at a distance from the too high and too low count value.

For example, in addition to the parameters of FIG. 8, at least one of a heat, offset, gain/amplifier, AD and DA parameter may be stored in the memory 626 for a certain class. For example, a plurality of operational calibration parameters ("OCP") 626-1 or a plurality of sets of operational calibration parameters may be stored in the memory 626 of the package 602, wherein each operational calibration parameter or set thereof is to be associated with a respective cell class. For example, the logic circuitry package 602 is configured to, using the stored at least one operational calibration parameter 626-1, output count values between the lowest and highest output count value of the output count value range. Note that the print apparatus logic circuit may use the stored operational calibration parameters 626-1 to start a further calibration cycle to determine better calibration parameters for usage during reading, for example calibration parameters that generate count values within a smaller sub-range at a certain distance from the highest or lowest output count values of the output range. In a further example, the memory 626 may store calibration parameters just to decrease a number of calibration cycles.

Figure 10:
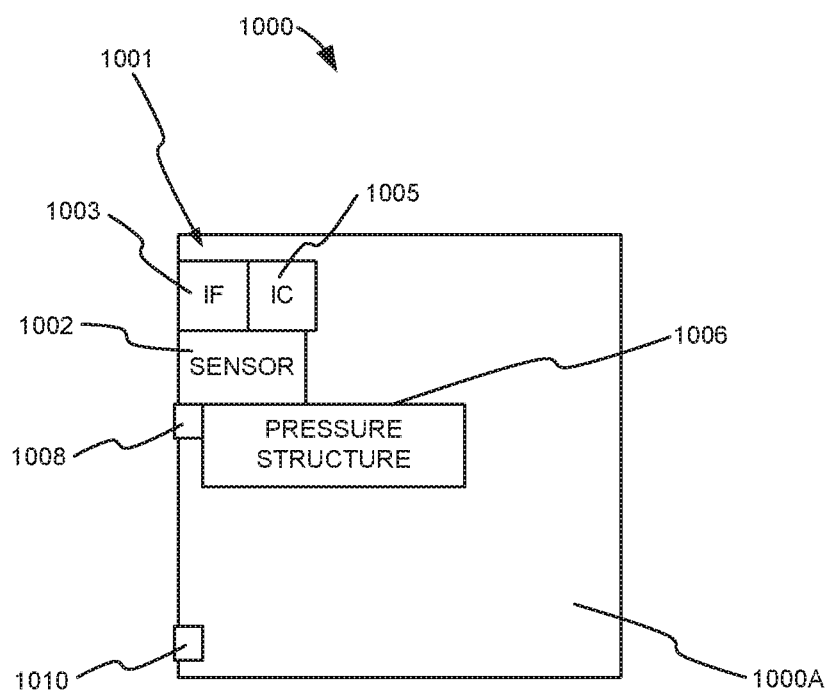
FIG. 10 illustrates an example of a replaceable print component.

FIG. 10 illustrates an example of a replaceable print component 1000 and sensor circuit or sensor circuit package 1001, which is another example of a logic circuitry package of this disclosure. The sensor circuit package 1001 includes at least one sensor 1002, configured to detect the effect of a pneumatic event and/or a pressurization, and an interface 1003 to communicate with a print apparatus logic circuit. A pneumatic event, or pneumatic stimulus may include air being supplied by a print apparatus air interface to an air interface 1008 of the component 1000.

The sensor circuit package 1001 may include integrated circuitry 1005 such as a first logic circuit 402*a*, 402*b*, 402*c*, 402*d* and/or second logic circuit 406*a*, 406*b*, 604. In the example of FIG. 10, the sensor circuit package 1001 is mounted to print apparatus component 1000. In one example, the sensor circuit package 1001 is mounted to an exterior of the component 1000 or is mountable and dismountable without needing to open or disassemble the print component reservoir 1000A. The sensor 1002 may include a single sensor cell or a sensor cell array of a plurality of cells. The sensor 1002 may be connected to the integrated circuit 1005 through a wired or wireless connection. The integrated circuit 1005 may in itself include both hardwired routings and/or wireless connections.

In different examples, the sensor 1002 may include an array of strain sensing cells (e.g., strain gauges) such as described with reference to FIG. 9, or one or more sensors other than strain sensing cells, that are adapted to detect an effect of a pneumatic event such as through air pressure changes, liquid pressure changes, material strains/stresses, moving parts of the component such as the walls, pressure structure 1006, etc. Multiple examples of first sensors 1002 will be further addressed below.

Typically, a pneumatic event, initiated by the print apparatus, results in air displacement through the air interface 1008 and an increase in pressure in the print apparatus component reservoir 1000A, for example using a suitable pressure structure 1006 such as an internal pressure chamber or bag connected to the interface 1008 through an air channel.

In certain examples, the sensor 1002 may be configured to detect any change in pressure of at least approximately 7 kPa, at least approximately 14 kPa, at least approximately 20 kPa, or at least approximately 23 kPa. For example, the change may reflect a difference between a normal operating pressure of just below 0 kPA gauge pressure, for example between 0 and −3 kPa gauge pressure, and a pressurized state inside the reservoir 1000A of at least approximately 7 kPa, at least approximately 14 kPa, at least approximately 20 kPA, or at least approximately 23 kPa.

In an alternative embodiment, the first sensor 1002 can be configured to detect the pneumatic stimulus applied by the print apparatus but may not be suitable to detect pressure differences in the reservoir 1000A, which may be sufficient to provide for a valid output to the print apparatus. For example, sensors 1002 may detect air movement or liquid movement associated with pneumatic stimuli, for example adjacent the respective air or liquid interface 1008, 1010, respectively, but without detecting an effect of an internal pressurization or a level of pressurization inside the reservoir 1000A. In certain examples, a clearance is provided instead of an air interface 1008, to clear a print apparatus air pen, whereby the first sensor 1002 is positioned to detect the pneumatic stimuli provided by the print apparatus air pen. In such example, the first sensor 1002 may be mounted to an exterior of the component 1000 or directly to the IC 1005.

Examples of sensor circuits 1001 may detect pneumatic stimuli and confirm the occurrence thereof, for example for validation by the print apparatus logic circuit, without being able to detect that a pressure is above a certain threshold during the pneumatic stimulus. The effect of an air pulse may include a rapidly increasing pressure during the pulse and, for example, a slowly decreasing pressure in the reservoir 1000A after the pulse has completed. In certain examples, the effect of the pneumatic event may still be detectable until the pressure has decreased to a lower point for example even until slightly above 0 kPA but not necessarily above 7 kPA gauge pressure, which may be detected by the first sensor 1002 to provide a valid output.

The air interface 1008 may include an air input to which an air output, such as an air pen of the print apparatus, may connect, to pressurize the reservoir 1000A. The reservoir 1000A may include a pressure structure 1006 connected to the air interface 1008. The reservoir 1000A may include an air channel. For example, the pressure structure may include a partly flexible air chamber connected to an air socket through the air channel. In use, air in the air interface 1008, air channel and air chamber may be isolated from liquid in the reservoir 1000A. The air chamber can be collapsible/expandable to increase pressure in the reservoir 1000A by blowing air through the air interface 1008. For example, the pressure structure 1006 may be adapted to pressurize the reservoir when pressurized air is supplied to the air interface 1008. When no external pressure is applied, in a normal operation, the pressure structure 1006 may be adapted to provide for a backpressure. In other examples, the air interface 1008 may connect directly to the reservoir 1000A, without using a separate air chamber, so that air being blown into the reservoir 1000A may directly pressurize the reservoir 1000A.

As explained in earlier sections of this disclosure, a prime event may pressurize the reservoir 1000A and the sensor

1002 may sense the pneumatic event directly such as by sensing moving air or reservoir pressure, or indirectly through a strain or deflection of certain replaceable component parts such as a reservoir wall or pressure structure.

Different configurations of first sensors 1002 may be suitable to detect the effect of the pneumatic stimulus. In different examples, the pneumatic sensor 1002 may be a pressure sensor; a strain gauge; a strain gauge supported by a wall of the reservoir; a strain gauge supported by a reservoir; a metal slug (e.g., with return spring) inside of an inductor; a manometer, for example using a conductive liquid and electrical contacts that are wetted when air pressure is applied, for example located at the air interface 1008; a manometer with (e.g., optical) sensors to measure the location of the air to liquid interface; an accelerometer; a diaphragm or slug connected to a reed (or other) switch which can detect displacement of the diaphragm; a mechanically actuated switch actuated by air displacement, a thermally actuated switch, or another suitable sensing cell. Furthermore, the output from said sensor(s) could be conditioned by a logic device algorithmically or through use of a Look Up Table (LUT) prior to being returned to a host. Hence, in different examples, a pressure or air blow event is not directly measured but the print apparatus infers the event from signals received from the sensor. For example, the effect of the pneumatic event may include an increased stress of walls of the reservoir 1000A, displaced air in or around the air interface 1008 and the pressure structure 1006, temporarily increased print material output flow, etc. For example, the sensor may be placed in the reservoir; against an internal or external side of a wall of the component; at, in or near the air input port; at the print material output port; or at any suitable location of the component. For example, when a component is pressurized, a wall of that component may expand, and the pressurization may be sensed at multiple locations including on the outside or at the print material output 1010. Some of these example sensors may be suitable to detect that an internal reservoir pressure is above a certain threshold to thereby be able to control a prime operation or to detect a reservoir or pressure chamber leakage. Other example sensor circuits may not be suitable to detect leakage, but may be relatively cost efficient, easier to manufacture, more robust, or may simply provide for an alternative, just to facilitate validation by the print apparatus logic circuit.

Figure 11:
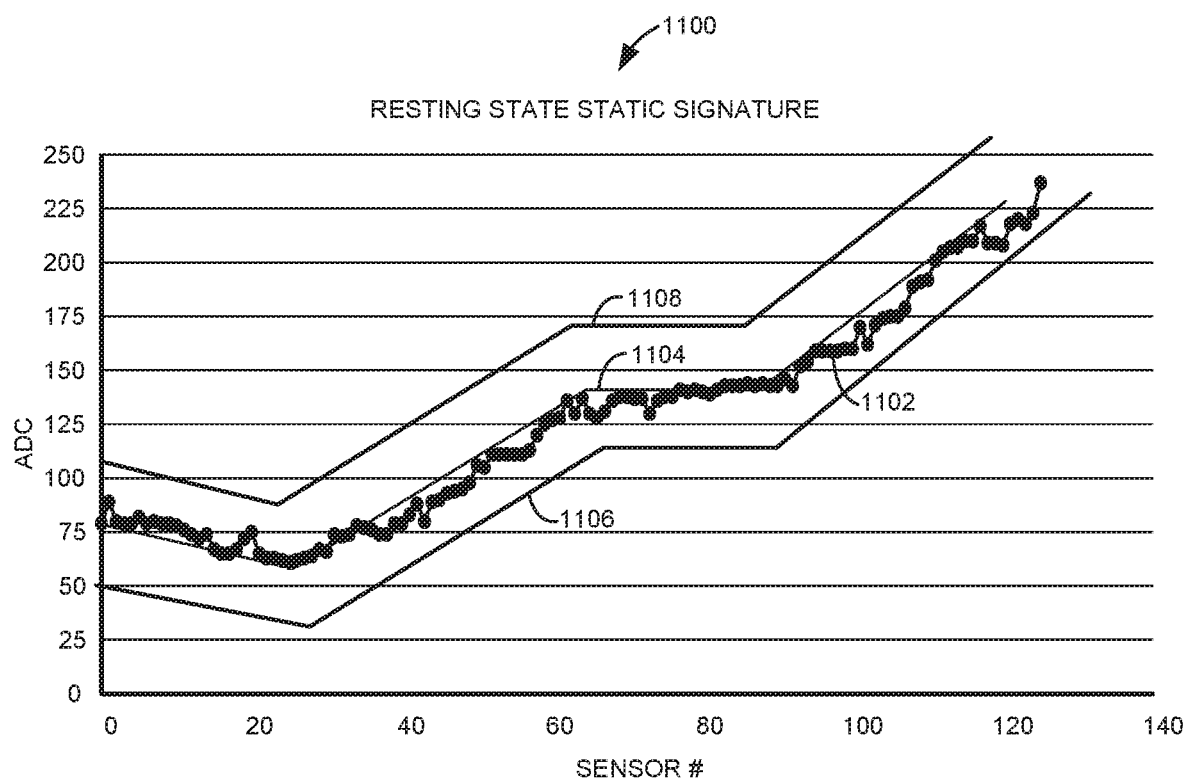
FIG. 11 is a chart illustrating one example of a resting state static signature for a sensor cell array.

FIG. 11 is a chart 1100 illustrating one example of a resting state static signature for a sensor cell array, such as sensor cell array 902 (FIG. 9). Chart 1100 includes ADC output count values (indicated on the y-axis) for 126 strain sensing cells (indicated on the x-axis) of a sensor cell array in a resting state when no pneumatic stimulus is being applied to the replaceable print apparatus component. While this example includes 126 strain sensing cells, in other examples a different number of strain sensing cells or a subset of strain sensing cells of a sensor cell array may be used. Each strain sensing cell corresponds to a different sensor ID, indicated by sensor # in the figure. In other examples of this disclosure, this sensor ID may be referred to as sensor cell ID, sub-ID or sub-class ID.

In this example, the offset and gain calibration parameters are set such that the output counts are between 0 and 255 based on readings of the strain sensing cells after analog to digital conversion. The distinct output counts for the different strain sensing cells indicates a built-in or inherent strain at each sensor cell due to the mechanical properties (e.g., strains) of the component. For example, an affixation of the sensor cells to a wall of the component, via one or more substrates, at different locations along that wall may influence a strain in each cell. This built-in or inherent strain profile of the strain sensing cells is referred to as a resting state static signature.

The sensor readings (i.e., counts) for the sensor array when no pneumatic stimulus is being applied to the component are indicated at 1102. Expected counts corresponding to the expected resting state static signature (e.g., as may be stored in memory 800) are indicated at 1104. A minimum range of expected counts is indicated at 1106, and a maximum range of expected counts is indicated at 1108. In this example, the sensor counts at 1102 are within the range of expected counts, thus indicating that the measured resting state static signature of the component matches the expected resting state static signature of the component. A comparison of the measured resting state static signature to the expected resting state static signature may be used to ensure the component is operating as expected (i.e., the component is not defective), to validate the component, or for other suitable purposes.

Figure 12:
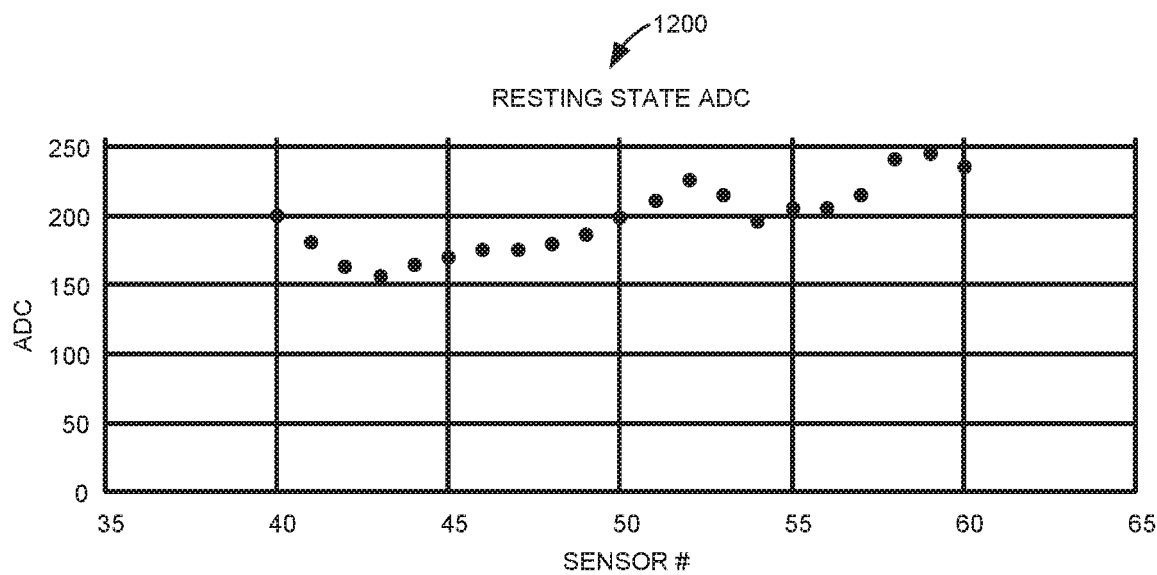
FIG. 12 is a chart illustrating one example of resting state ADC count values for a plurality of sensor cells.

FIG. 12 is a chart 1200 illustrating one example of resting state ADC count values for a plurality of sensor cells. Chart 1200 includes ADC output count values (indicated on the y-axis) for a subset (e.g., 21 cells) of strain sensing cells (indicated on the x-axis) of a sensor cell array in a resting state when no pneumatic stimulus is being applied to the replaceable print apparatus component. While this example includes 21 strain sensing cells between sensor cells 40 and 60 of an array of strain sensing cells including at least 65 sensing cells, in other examples a different number of strain sensing cells or a different subset of strain sensing cells of a sensor cell array may be used.

In this example, the offset and gain calibration parameters are set such that the output counts are between 0 and 255 based on readings of the selected strain sensing cells after analog to digital conversion. The offset and gain calibration parameters used for FIG. 12 may vary from the offset and gain calibration parameters used for FIG. 11. The distinct output counts for the different strain sensing cells indicates a built-in or inherent strain at each sensor cell due to the mechanical properties (e.g., strain) of the component. In this example, this built-in or inherent strain at each sensor cell corresponds to a resting state count. The resting state count for each selected strain sensing cell may be stored in a memory (e.g., a memory of a print apparatus logic circuit), such that subsequent readings of the selected strain sensing cells may be normalized based on their corresponding resting state counts. The subsequent readings of the selected strain sensing cells may be normalized by subtracting the stored resting state count from each subsequent corresponding read count to provide a corresponding delta ADC count for each selected strain sensing cell. The delta ADC counts may be used for operating the print apparatus and/or the replaceable print apparatus component.

Figure 13:
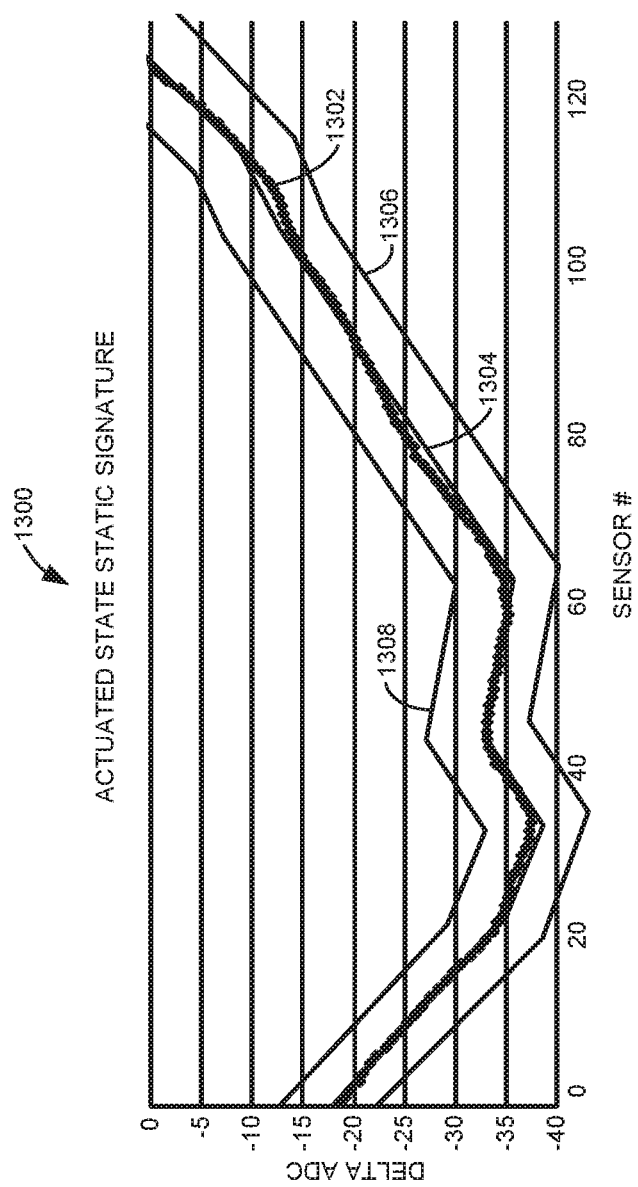
FIG. 13 is a chart illustrating one example of an actuated state static signature for a sensor cell array.

FIG. 13 is a chart 1300 illustrating one example of an actuated state static signature for a sensor cell array. Chart 1300 includes delta ADC count values (indicated on the y-axis) for 126 strain sensing cells (indicated on the x-axis) of a sensor cell array in an actuated state when a pneumatic stimulus is being applied to the replaceable print apparatus component such that the print material reservoir of the component is at a known pressurized state (e.g., such as a peak pressure). While this example includes 126 strain sensing cells, in other examples a different number of strain sensing cells or a subset of strain sensing cells of a sensor cell array may be used.

In this example, resting states counts for the 126 strain sensing cells were previously obtained and stored in a memory. The offset and gain calibration parameters for FIG. 13 are equal to the offset and gain calibration parameters used to obtain the resting state counts for the 126 strain sensing cells. The distinct delta ADC counts for the different strain sensing cells indicates a built-in or inherent strain at each sensor cell in the pressurized state due to the mechanical properties (e.g., strain) of the component. This built-in or inherent strain at each sensor cell at a known pressurized state is referred to as an actuated state static signature.

The measured delta ADC counts for the sensor array when a pneumatic stimulus is being applied to the component are indicated at 1302. Expected delta ADC counts corresponding to the expected actuated state static signature (e.g., as stored in memory 800) are indicated at 1304. A minimum range of expected delta ADC counts is indicated at 1306, and a maximum range of expected delta ADC counts is indicated at 1308. In this example, the measured delta ADC counts at 1302 are within the range of expected delta ADC counts, thus indicating that the measured actuated state static signature of the component matches the expected actuated state static signature of the component. A comparison of the measured actuated state static signature to the expected actuated state static signature may be used to ensure the component is operating as expected (i.e., the component is not defective), to validate the component, or for other suitable purposes.

In an example, a static signature 802, representing the signatures of any of FIG. 11, 12, or 13, can be encoded in the memory 800, as illustrated in FIG. 8.

Figure 14:
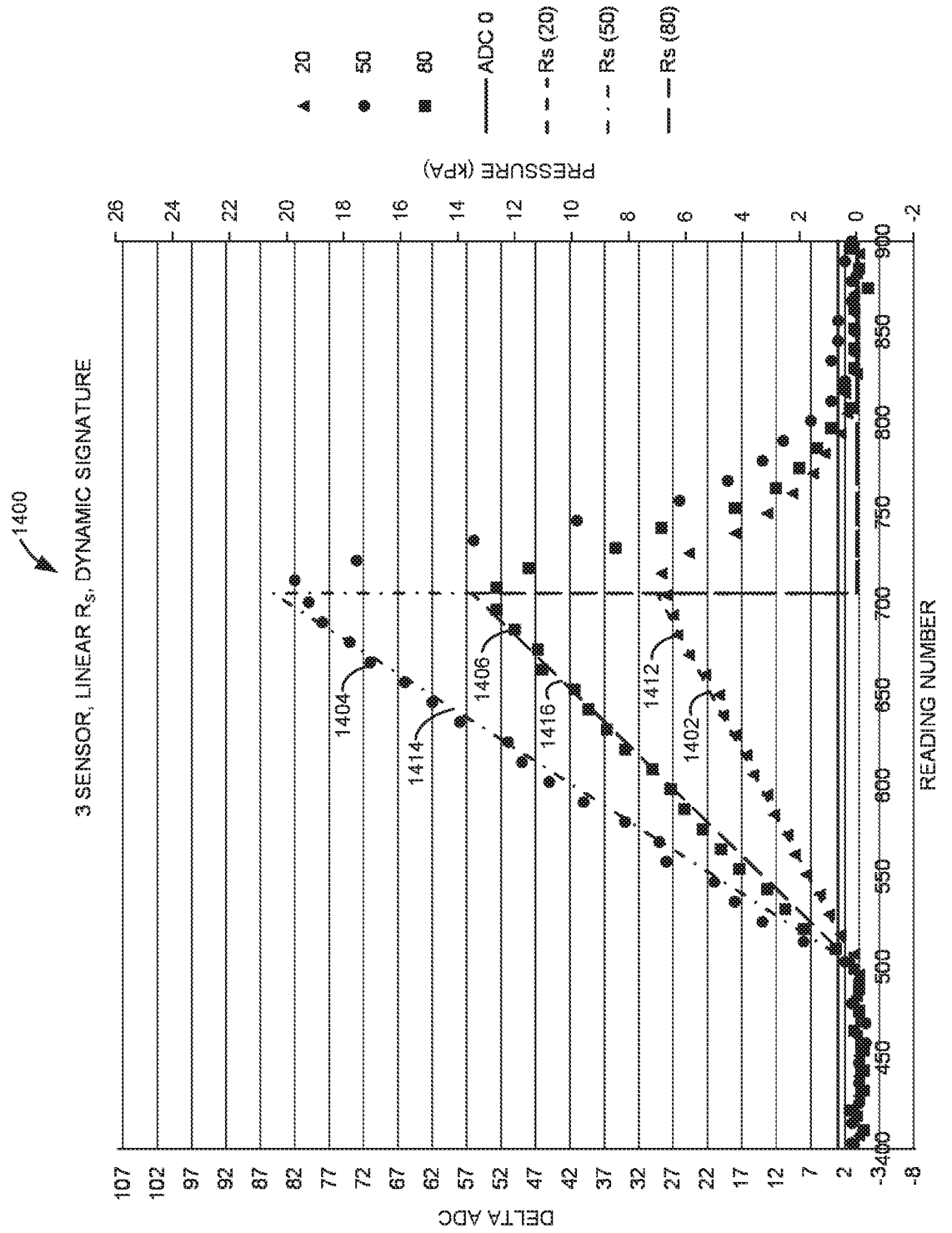
FIG. 14 is a chart illustrating one example of a dynamic signature for a subset of sensor cells.

In an alternative emulating embodiment of a logic circuitry package, the static signature 802 can be stored in the memory, and the logic circuit is configured to generate output values within the ranges 1106, 1108, 1306, 1308 illustrated in FIGS. 11 and 13, or at least similar to the outputs illustrated in FIGS. 11, 12, and 13, in response to receiving corresponding sensor ID parameters, in order to comply to the stored static signature 802 and to facilitate validation by the print apparatus logic circuit FIG. 14 is a chart 1400 illustrating one example of a dynamic signature for a subset of sensor cells. Chart 1400 includes delta ADC counts (indicated on the left side) and pressure in kilopascals (kPa) (indicated on the right side) for a plurality of readings (indicated on the x-axis) of 3 strain sensing cells (20, 50, and 80) of a sensor cell array when a pneumatic stimulus is being applied to the replaceable print apparatus component. While this example includes 3 strain sensing cells, in other examples a different number of strain sensing cells may be used.

In this example, resting state counts for the 3 strain sensing cells (20, 50, and 80) were previously obtained and stored in a memory. The offset and gain calibration parameters for FIG. 14 are equal to the offset and gain calibration parameters used to obtain the resting state counts for the 3 strain sensing cells. The measured delta ADC counts for strain sensing cell 20 are indicated at 1402, the measured delta ADC counts for strain sensing cell 50 are indicated at 1404, and the measured delta ADC counts for strain sensing cell 80 are indicated at 1406. The response of each strain sensing cell during a pneumatic stimulus is referred to as a dynamic signature of the component. Each strain sensing cell 20, 50, and 80 has an expected response function $R_s$, collectively referred to as an expected dynamic signature (e.g., as may be stored in memory 800). The expected response function $R_{s1}$ for strain sensing cell 20 is indicated at 1412, the expected response function $R_{s2}$ for strain sensing cell 50 is indicated at 1414, and the expected response function $R_{s3}$ for strain sensing cell 80 is indicated at 1416 and defined by the following equations:

$$R_{s1} : Y_c = \left(\frac{0.33 \text{ counts}}{1 \text{ in H2O}}\right) * X_P$$

$$R_{s2} : Y_c = \left(\frac{1 \text{ counts}}{1 \text{ in H2O}}\right) * X_P$$

$$R_{s3} : Y_c = \left(\frac{0.66 \text{ counts}}{1 \text{ in H2O}}\right) * X_P$$

where:
$Y_c$ is the delta ADC count; and
$X_p$ is the pressure.

While in this example, the expected response functions are linear, in other examples the expected response functions may be exponential, logarithmic, or other suitable functions. The measured delta ADC counts for strain sensing cell 20 may be compared to the expected response function $R_{s1}$ for strain sensing cell 20, the measured delta ADC counts for strain sensing cell 50 may be compared to the expected response function $R_{s2}$ for strain sensing cell 50, and the measured delta ADC counts for strain sensing cell 80 may be compared to the expected response function $R_{s3}$ for strain sensing cell 80. The comparisons determine whether the delta ADC counts for each strain sensing cell during the pneumatic stimulus are within expected ranges, thus indicating whether the measured dynamic signature of the component matches the expected dynamic signature of the component. A comparison of the measured dynamic signature to the expected dynamic signature may be used to ensure the component is operating as expected (i.e., the component is not defective), to validate the component, or for other suitable purposes.

In an example, a dynamic signature 802, representing the signature of FIG. 14, can be encoded in the memory 800, as illustrated in FIG. 8.

In an alternative emulating embodiment of a logic circuitry package, the dynamic signature 804 can be stored in the memory, and the logic circuit is configured to generate output values similar to what is illustrated in FIG. 14, in response to receiving corresponding sensor ID parameters, in order to comply to the stored digital signature 804 and to facilitate validation by the print apparatus logic circuit, using at least one of a single sensor, a sensor array, a LUT and an algorithm configured for the validation. Accordingly, in certain examples, a response to a request during a pneumatic actuation may be generated without using a sensor or by using only a single sensor in response to different sensor cell IDs.

Figure 15:
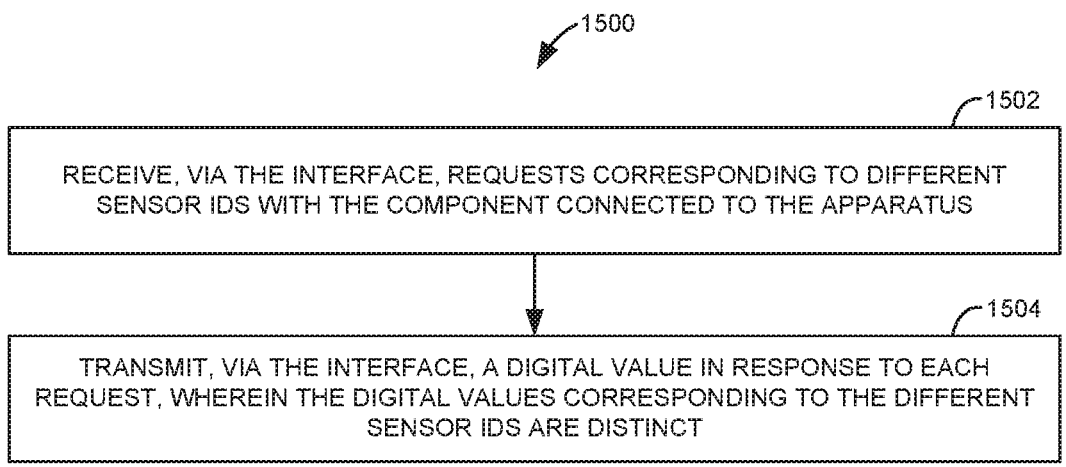
FIG. 15 is a flow diagram illustrating one example of a method that may be carried out by a logic circuitry package.

FIG. 15 is a flow diagram illustrating one example of a method 1500 that may be carried out by a logic circuitry package, such as logic circuitry package 400a-400d or 602 or processing circuitry 424. At 1502, the at least one logic circuit may receive, via the interface, requests corresponding to different sensor IDs with the component connected to the apparatus. In certain examples, the sensor IDs include different sensor cell IDs. The sensor IDs may include, first, a first sensor type ID to select a sensor to detect a pneumatic actuation, and, subsequently, different sensor cell IDs. At 1504, the at least one logic circuit may transmit, via the interface, a digital value (e.g., count) in response to each request. In this example, the digital values corresponding to the different sensor IDs are distinct. For example, the digital values may vary in accordance with a static signature, as explained with reference to FIG. 11 or 13 and/or as encoded in a memory 800 per reference number 802 of FIG. 8.

In one example, the at least one logic circuit may receive these requests in a resting state, with the apparatus not pneumatically actuating the component. In this case, the corresponding digital values include resting state digital values. The at least one logic circuit may, with the logic circuitry package mounted to the component and with the component connected to the apparatus and the apparatus not pneumatically actuating the component, output the digital values at an internal reservoir pressure of the component of approximately 0 kPa gauge pressure or less. In another example, the at least one logic circuit may receive the requests with the apparatus pneumatically actuating the component, for example having a higher internal gauge pressure such as higher than 3, 7, 10, 14, 17, 18, 20 or 23 kPa.

Figure 16:
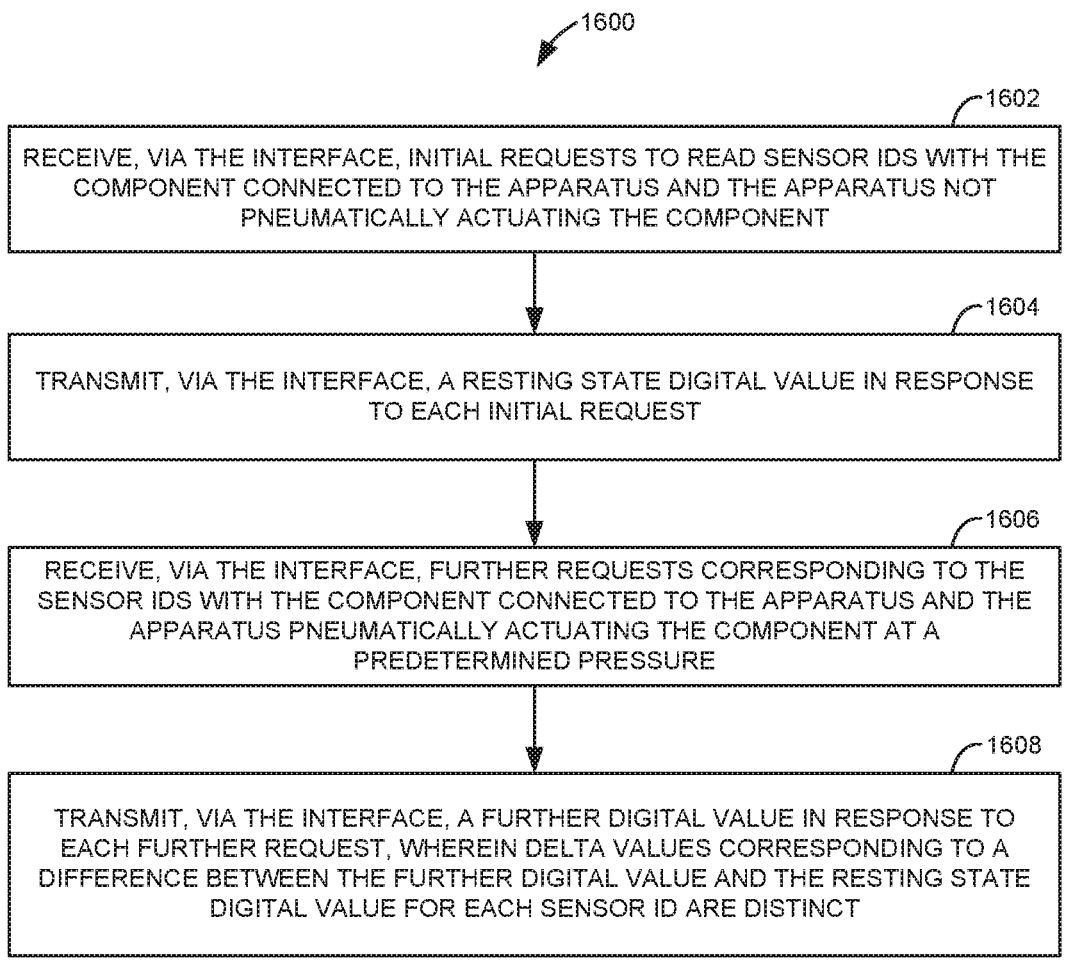
FIG. 16 is a flow diagram illustrating another example of a method that may be carried out by a logic circuitry package.

FIG. 16 is a flow diagram illustrating another example of a method 1600 that may be carried out by a logic circuitry package, such as logic circuitry package 400a-400d or 602 or processing circuitry 424. At 1602, the at least one logic circuit may receive, via the interface, initial requests to read sensor IDs with the component connected to the apparatus and the apparatus not pneumatically actuating the component. At 1604, the at least one logic circuit may transmit, via the interface, a resting state digital value (e.g., count) in response to each initial request. At 1606, the at least one logic circuit may receive, via the interface, further requests corresponding to the sensor IDs with the component connected to the apparatus and the apparatus pneumatically actuating the component at a predetermined pressure. At 1608, the at least one logic circuit may transmit, via the interface, a further digital value in response to each further request. Delta values corresponding to a difference between the further digital value and resting state digital value for each different sensor ID are distinct. For example, a different delta value may be associated with each different sensor ID. For example, the delta values may vary in accordance with a dynamic signature, as explained with reference to FIG. 14 and/or as encoded in a memory 800 per reference number 804 in FIG. 8.

In one example, the at least one logic circuit, with the logic circuitry package mounted to the component and with the component connected to the apparatus and the apparatus pneumatically actuating the component, output the further digital values at an internal reservoir pressure of the component of more than 3, 7, 10, 14, 17, 18, 20, or 23 kPa gauge pressure. As will be further explained below, digital values that are returned in response to sensor IDs, when the component is pneumatically actuated, may be different from the resting state digital values whereby the difference should be greater than the limit parameter 806. Hence, most delta values may be greater than the limit parameter 806.

Figure 17A:
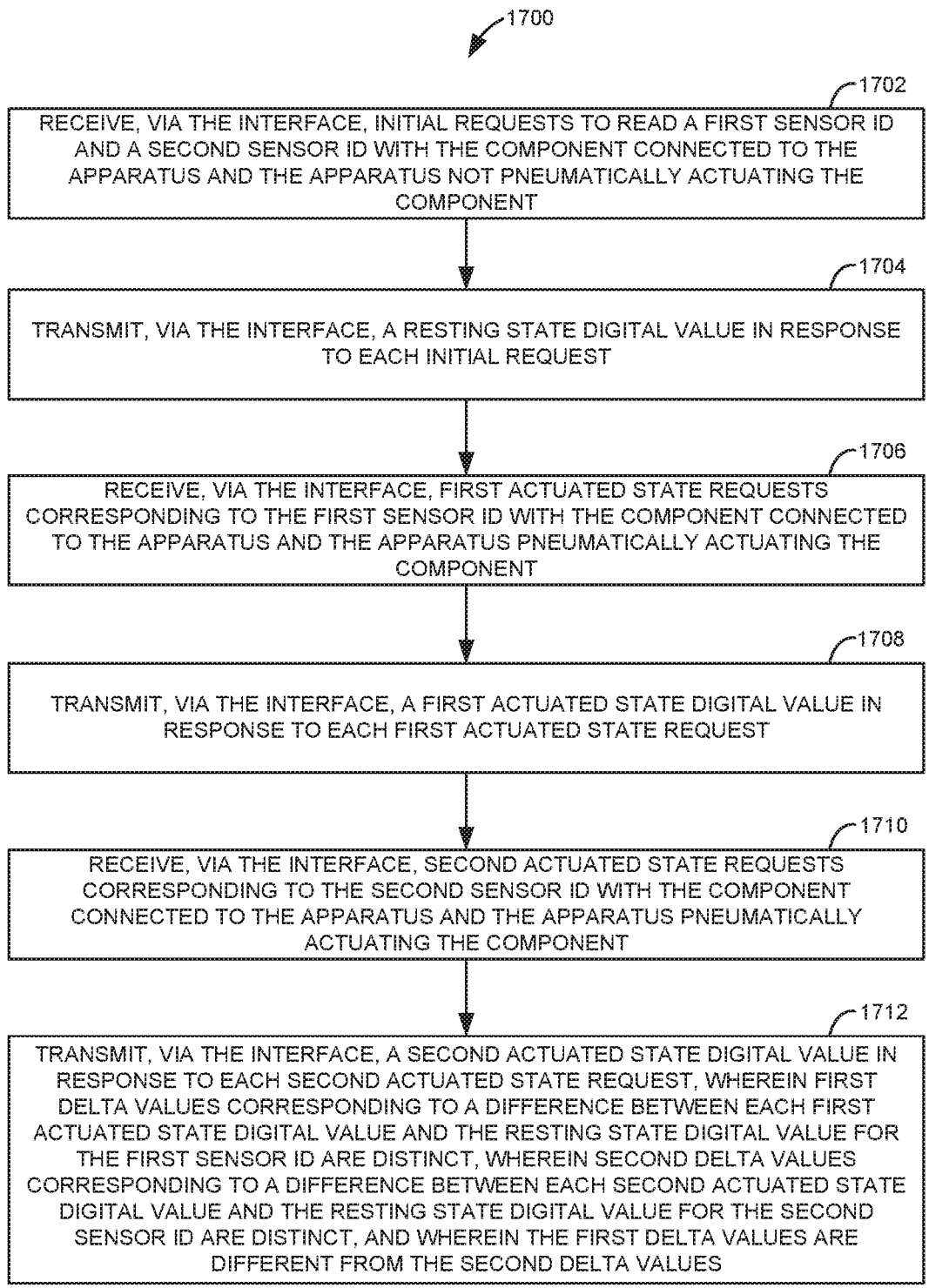
FIGS. 17A-17B are flow diagrams illustrating example methods that may be carried out by a logic circuitry package.
Figure 17B:
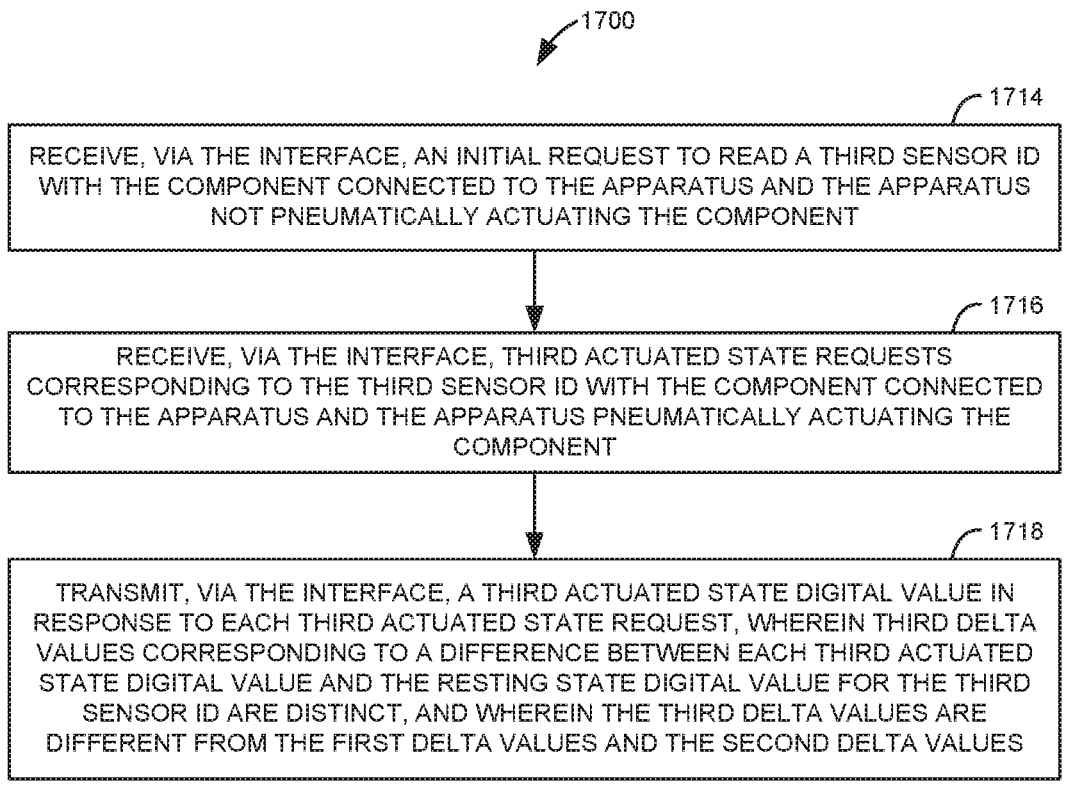

FIGS. 17A-17B are flow diagrams illustrating example methods 1700 that may be carried out by any example logic circuitry package encompassed by this disclosure, such as logic circuitry package 400a-400d or 602 or processing circuitry 424. The flow diagrams of FIGS. 17A and 17B may apply to any of the example components explained with reference to FIG. 5B, 9, or 10. As illustrated in FIG. 17A at 1702, the at least one logic circuit may receive, via the interface, initial requests to read a first sensor ID and a second sensor ID with the component connected to the apparatus and the apparatus not pneumatically actuating the component. At 1704, the at least one logic circuit may transmit, via the interface, a resting state digital value in response to each initial request. At 1706, the at least one logic circuit may receive, via the interface, first actuated state requests corresponding to the first sensor ID with the component connected to the apparatus and the apparatus pneumatically actuating the component. At 1708, the at least one logic circuit may transmit, via the interface, a first actuated state digital value in response to each first request. At 1710, the at least one logic circuit may receive, via the interface, second actuated state requests corresponding to the second sensor ID with the component connected to the apparatus and the apparatus pneumatically actuating the component. At 1712, the at least one logic circuit may transmit, via the interface, a second actuated state digital value in response to each second actuated state request. First delta values corresponding to a difference between each first actuated state digital value and the resting state digital value for the first sensor ID are distinct, for example because the first actuated state digital values correspond to different pressures. Second delta values corresponding to a difference between each second actuated state digital value and the resting state digital value for the second sensor ID are distinct, for example because the second digital values correspond to different pressures. The first delta values are different from the second delta values, for example because of different sensor cell characteristics and different dynamic signatures, as explained in FIG. 14.

As illustrated in FIG. 17B at 1714, the at least one logic circuit may further receive, via the interface, an initial request to read a third sensor ID with the component connected to the apparatus and the apparatus not pneumatically actuating the component. At 1716, the at least one logic circuit may further receive, via the interface, third actuated state requests corresponding to the third sensor ID with the component connected to the apparatus and the apparatus pneumatically actuating the component. At 1718, the at least one logic circuit may further transmit, via the interface, a third actuated state digital value in response to each third actuated state request. Third delta values corresponding to a difference between each third actuated state digital value and the resting state digital value for the third sensor ID are distinct. The third delta values are different from the first delta values and the second delta values.

It is noted that in an alternative example a pneumatic actuation may be sensed by sensing air being blown out of a print apparatus air pen irrespective of an internal reservoir pressure, whereby signatures may be emulated.

In one example, the at least one logic circuit may, with the logic circuitry package mounted to the component and with the component connected to the apparatus and the apparatus not pneumatically actuating the component, output the resting state digital values at an internal reservoir pressure of the component of approximately 0 kPa gauge pressure or less. The at least one logic circuit may also, with the logic circuitry package mounted to the component and with the component connected to the apparatus and the apparatus pneumatically actuating the component, output the first, second, and third actuated state digital values at an internal reservoir pressure of the component of more than 3, 10, 14, 17, 18, 20, or 23 kPa gauge pressure.

Figure 18:
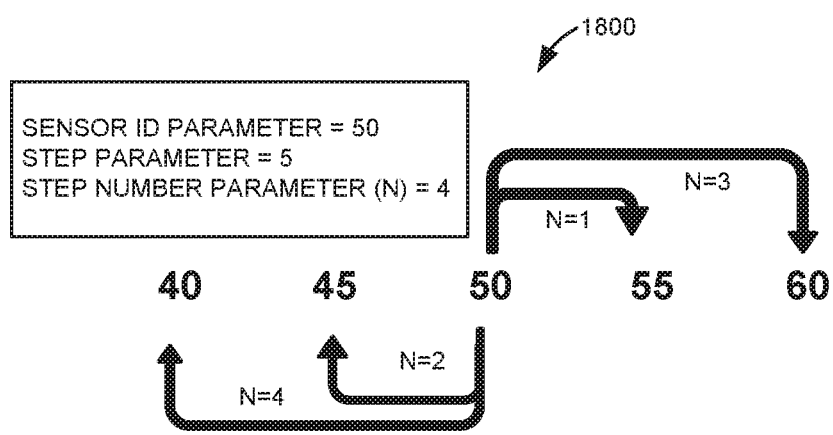
FIG. 18 illustrates one example of a sensor cell read order for a plurality of sensor cells.

FIG. 18 illustrates one example of a sensor cell read order 1800 for a plurality of sensor cells. The sensor cell read order 1800 may be used to read selected strain sensing cells during a pneumatic stimulus to verify whether the pneumatic stimulus was successfully implemented. In this example, the sensor ID parameter (e.g., 808 of FIG. 8) equals 50, the step parameter (e.g., 810 of FIG. 8) equals 10, and the step number parameter (N) (e.g., 812 of FIG. 8) equals 4, and a "middle-out" sequence may be used to minimize reading order bias. In other examples, the parameters may have other suitable values and other reading order sequences, such as ascending, descending, random, etc. may be used. Accordingly, in this example, these parameters and reading order sequence may be used to read a subset of sensor cells of a sensor cell array such that first, sensor ID 50 at N equals 0 is read, followed by sensor ID 55 at N equals 1, followed by sensor ID 45 at N equals 2, followed by sensor ID 60 at N equals 3, followed by sensor ID 40 at N equals 4. The sequence may then be repeated such that sensor ID 50 is again read.

FIGS. 19A-19H are flow diagrams illustrating example methods 1900 that may be carried out by a logic circuitry package, such as logic circuitry package 400a-400d, 602, 1001, or 2501, or processing circuitry 424. Each Figure of FIGS. 19A-19H may correspond to a function of an example logic circuitry package of this disclosure. The functions represented by FIGS. 19A-19H may be executed during the earlier mentioned time period in response to requests directed to the second and/or reconfigured address. A logic circuitry package of this disclosure may include at least one of the functions represented by FIGS. 19A-19H. While the functions of FIGS. 19A-19H may facilitate verifying an expected pressure in a reservoir during and/or outside of a pneumatic actuation, in alternative examples, digital values may be emulated for validation of these values by the print apparatus logic circuit irrespective of the actual reservoir pressures.

Figure 19A:
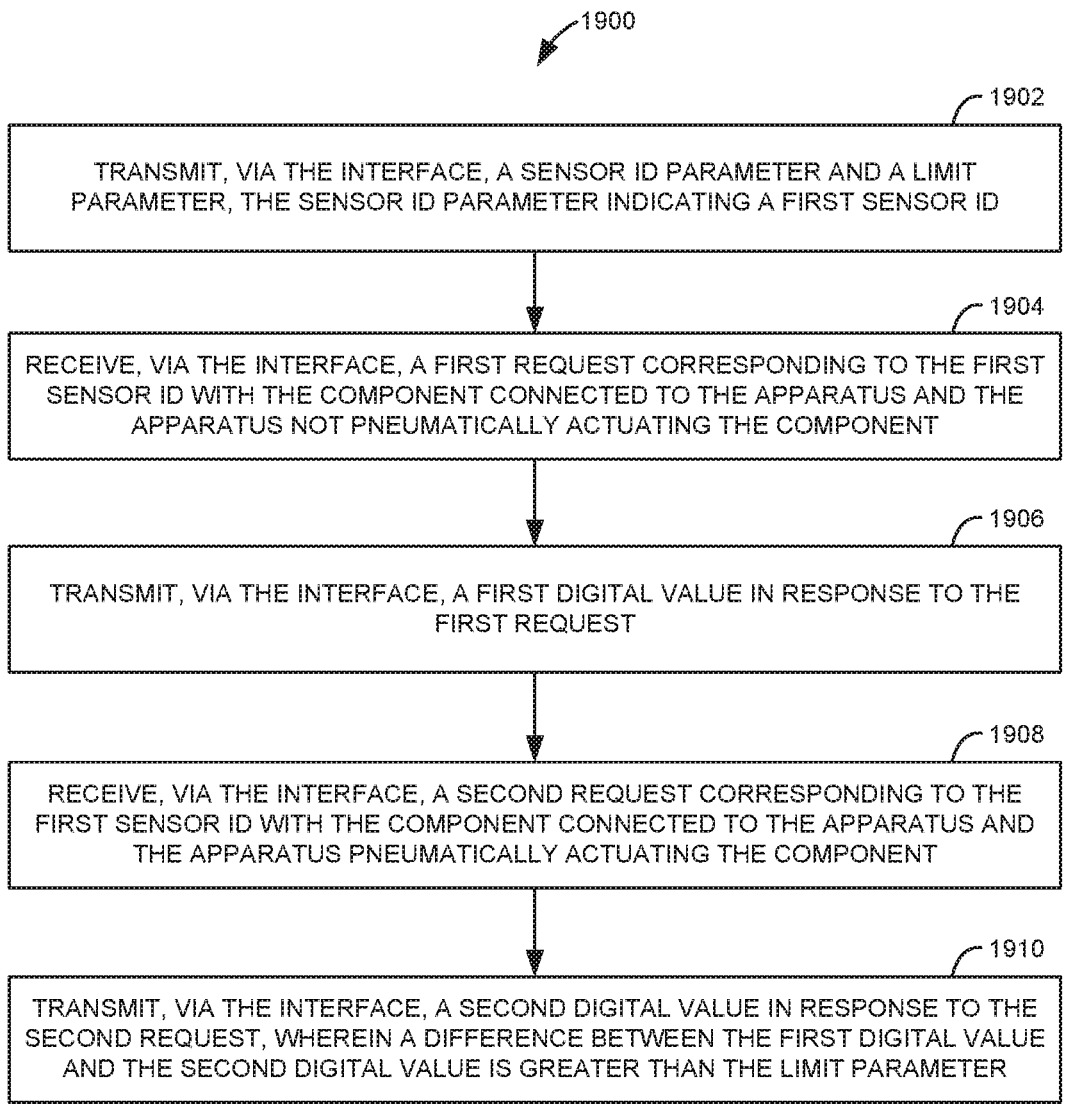
FIGS. 19A-19H are flow diagrams illustrating example methods that may be carried out by a logic circuitry package.

As illustrated in FIG. 19A, at 1902 the at least one logic circuit may transmit, via the interface, a sensor ID parameter and a limit parameter, the sensor ID parameter indicating a first sensor ID. At 1904, the at least one logic circuit may receive, via the interface, a first request corresponding to the first sensor ID with the component connected to the apparatus and the apparatus not pneumatically actuating the component. At 1906, the at least one logic circuit may transmit, via the interface, a first digital value (e.g., count) in response to the first request. At 1908, the at least one logic circuit may receive, via the interface, a second request corresponding to the first sensor ID with the component connected to the apparatus and the apparatus pneumatically actuating the component. At 1910, the at least one logic circuit may transmit, via the interface, a second digital value in response to the second request. A difference between the first digital value and the second digital value is greater than the limit parameter.

In one example, the at least one logic circuit may further receive, via the interface, a first calibration parameter. For example, the first calibration parameter may be determined by returning values in response to requests including a stored sensor ID parameter 808 (FIG. 8) using a different calibration parameter, whereby the first calibration parameter may be an operational calibration parameter used to return the digital value that is close or closest to a target value, whereby the target value may be stored on the print apparatus logic circuit or also in the memory 800. In another example, at least one calibration parameter 814 may be stored in the memory 800, whereby the at least one calibration parameter 814 may include or be part of the first calibration parameter. As previously described, the calibration parameter may include gain and/or offset (e.g., VDAC) settings. In any event, the logic circuit may be configured to, in response to receiving the first calibration parameter and the first request, transmit the first digital value in response to the first request and the second digital value in response to the second request. Accordingly, the at least one logic circuit may be configured to receive, via the interface, different calibration parameters including the first calibration parameter and transmit the first digital value in response to the first calibration parameter, and, transmit different digital values in response to the respective different calibration parameters. As previously described, the first digital value may be close to a certain target value while the different digital values may be at a further distance from that target value as compared to the first digital value. The different digital values may include the first digital value and at least one different digital value clipped at the end of a range defined by a natural number of bytes.

In one example, the at least one logic circuit may transmit the sensor ID parameter 808 and the limit parameter 806 in response to a request to a first default address of the logic circuitry package and may transmit the first and second digital values in response to the first and second requests to a second default address and/or a reconfigured address of the logic circuitry package. Any one or more of the other parameters of FIG. 8 may be transmitted in response to a request to the first address.

Figure 19B:
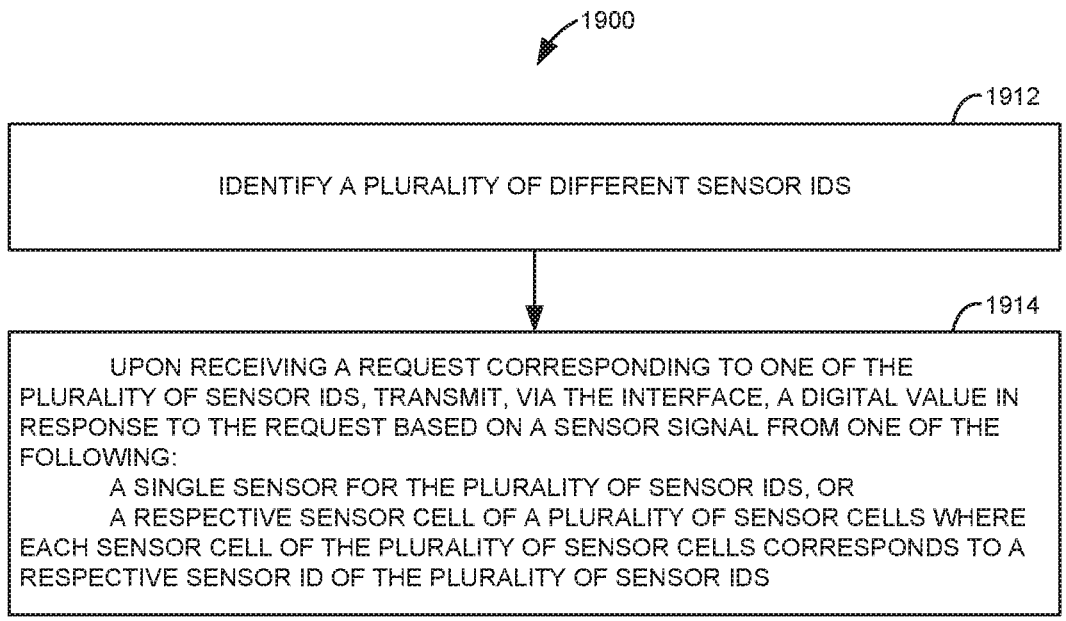

The first sensor ID may include one sensor ID of a plurality of sensor IDs. As illustrated in FIG. 19B, and also explained with reference to FIG. 10, at 1912 the at least one logic circuit may further identify a plurality of different sensor IDs, in this example a sensor cell ID, also referred to as sub-class ID or sub-class parameter elsewhere in this disclosure. At 1914, the at least one logic circuit may upon receiving a request corresponding to one of the plurality of sensor IDs, transmit, via the interface, a digital value in response to the request based on a sensor signal from one of the following: a single sensor for the plurality of sensor IDs, or a respective sensor cell of a plurality of sensor cells where each sensor cell of the plurality of sensor cells corresponds to a respective sensor ID of the plurality of sensor IDs. Using a single sensor to respond to different sub-class parameters is explained with respect to various alternative examples addressed elsewhere in this disclosure, whereby for example LUTs or algorithms may be used to output valid values in response to the corresponding parameters.

In one example, the at least one logic circuit may transmit at least 500 digital values in response to corresponding requests corresponding to sensor IDs in less than 1 second. In one example, this facilitates reading a plurality of sensor cells during different pressure states during a single pressure pulse. For example, the at least one logic circuit is configured to, with the logic circuitry package mounted to the component and with the component connected to the apparatus and the apparatus pneumatically actuating the component, output the second digital value of FIG. 19A at an internal reservoir pressure of the component of more than 3, 17, 18, 20, or 23 kPa gauge pressure.

Figure 19C:
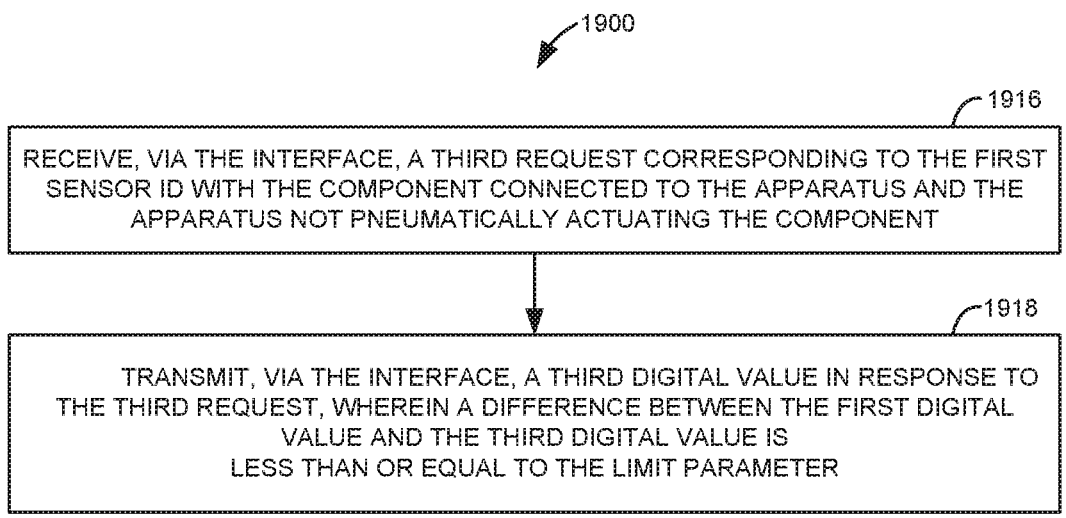

As illustrated in FIG. 19C, at 1916 the at least one logic circuit may further be configured to receive, via the interface, a third request corresponding to the first sensor ID with the component connected to the apparatus and the apparatus not pneumatically actuating the component. At 1918, the at least one logic circuit may further transmit, via the interface, a third digital value in response to the third request. A difference between the first digital value and the third digital value is less than or equal to the limit parameter. In one example, this confirms that the reservoir has returned to an appropriate resting or lower pressure state, for example of zero or negative gauge pressure, after a pressure pulse. Hence, the at least one logic circuit may, with the logic circuitry package mounted to the component and with the component connected to the apparatus and the apparatus not pneumatically actuating the component, output the third digital value at an internal reservoir pressure of the component of approximately 0 kPa gauge pressure or less.

Figure 19D:
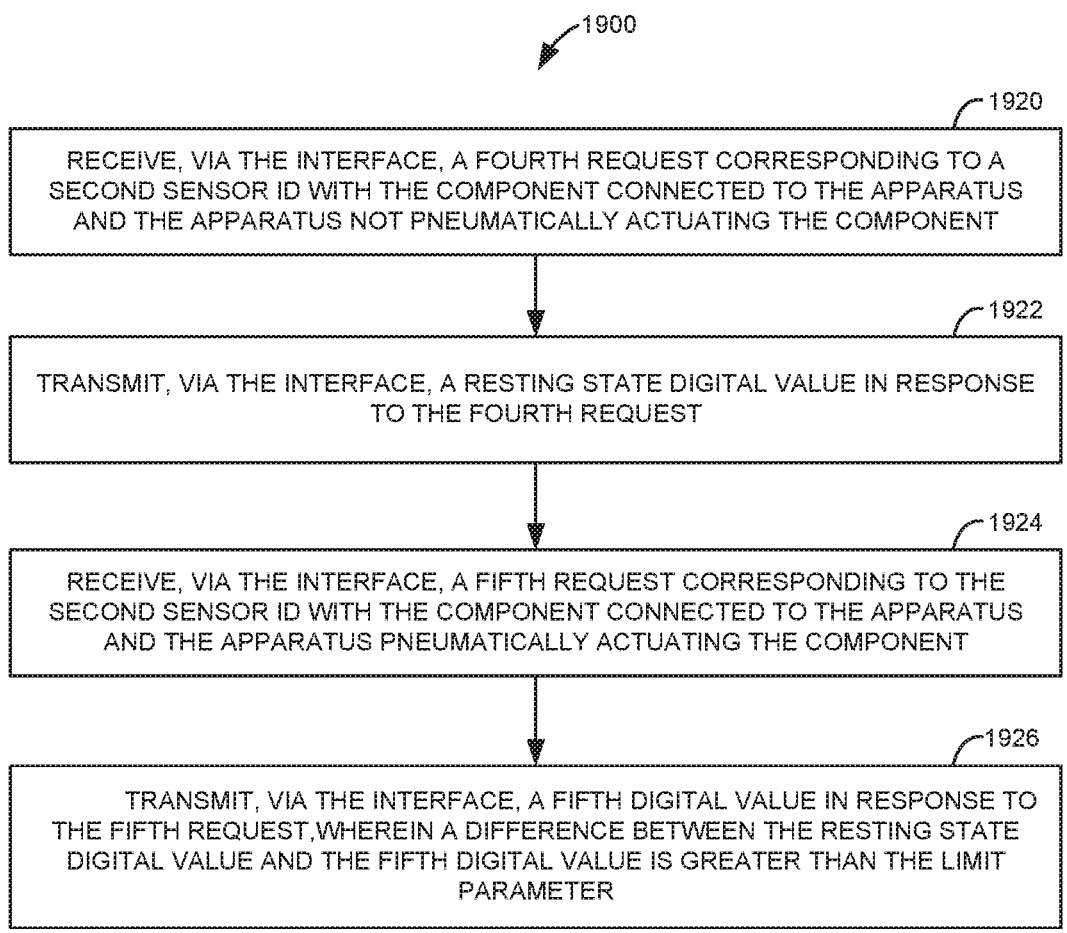

As illustrated in FIG. 19D, at 1920 the at least one logic circuit may receive, via the interface, a fourth request corresponding to a second sensor ID with the component connected to the apparatus and the apparatus not pneumatically actuating the component. At 1922, the at least one logic circuit may transmit, via the interface, a resting state digital value in response to the fourth request. At 1924, the at least one logic circuit may receive, via the interface, a fifth request corresponding to the second sensor ID with the component connected to the apparatus and the apparatus pneumatically actuating the component. At 1926, the at least one logic circuit may transmit, via the interface, a fifth digital value in response to the fifth request. A difference between the resting state digital value and the fifth digital value is greater than the limit parameter. For example, this may relate to reading a second sensor cell corresponding to the second sensor ID using the same operational calibration parameter. Hence, the at least one logic circuit may further be configured to receive, via the interface, the earlier mentioned first calibration parameter and transmit the resting state digital value in response to the fourth request and the fifth digital value in response to the fifth request. Hence, the first calibration parameter may have been determined for the first sensor ID and may be used again for the second sensor ID. The at least one logic circuit may include a memory storing the sensor ID parameter, a step parameter, and a step number parameter, which may be used to determine the second and further sensor IDs for further outputs. In certain examples, the sensor IDs are to address sensor cells so that their analog state may be converted to generate the output digital values. In alternative examples, a single sensor or no sensor could be used to generate values based on the sensor ID and limit parameter, for validation by the print apparatus logic circuit, without directly using an analog sensor cell signal, but rather, using a LUT, algorithm, simulation or the like.

Figure 19E:
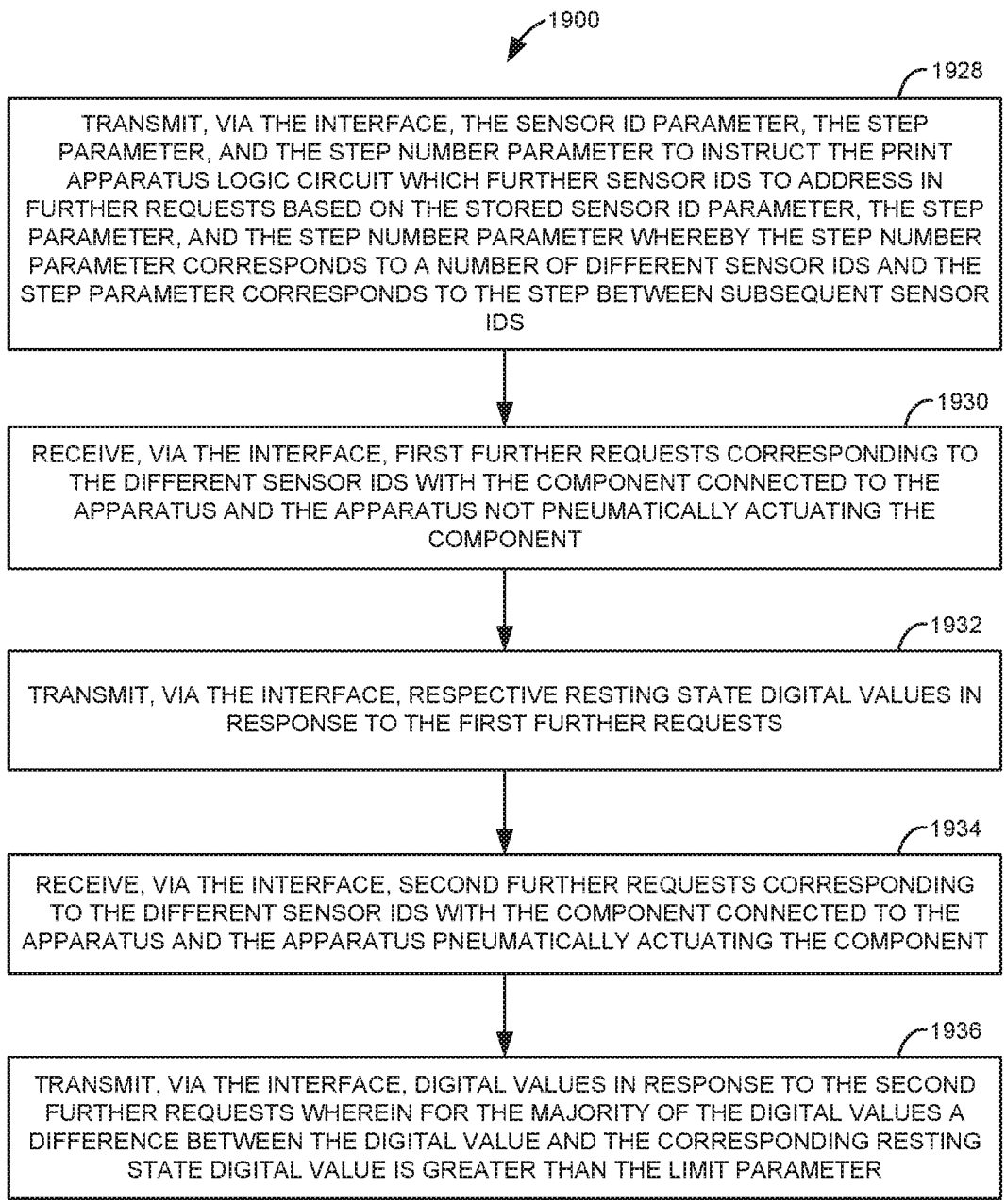

As illustrated in FIG. 19E, at 1928 the at least one logic circuit may further transmit, via the interface, the sensor ID parameter, the step parameter 810, and the step number parameter 812 to instruct the print apparatus logic circuit which further sensor IDs to address in further requests based on the stored sensor ID parameter, the step parameter, and the step number parameter. In one example, the step number parameter corresponds to a number of different sensor IDs to address and the step parameter corresponds to the step between subsequent sensor IDs. Hence, the stored sensor ID parameter, step parameter and step number parameter may define the number of different sensor IDs and which sensor IDs to address. The step parameter 810 and step number parameter 812 may be stored in a memory 800 of the logic circuitry package but may also be stored elsewhere. At 1930, the at least one logic circuit may further receive, via the interface, first further requests corresponding to the different sensor IDs with the component connected to the apparatus and the apparatus not pneumatically actuating the component. At 1932, the at least one logic circuit may further transmit, via the interface, respective resting state digital values in response to the first further requests.

Figure 21:
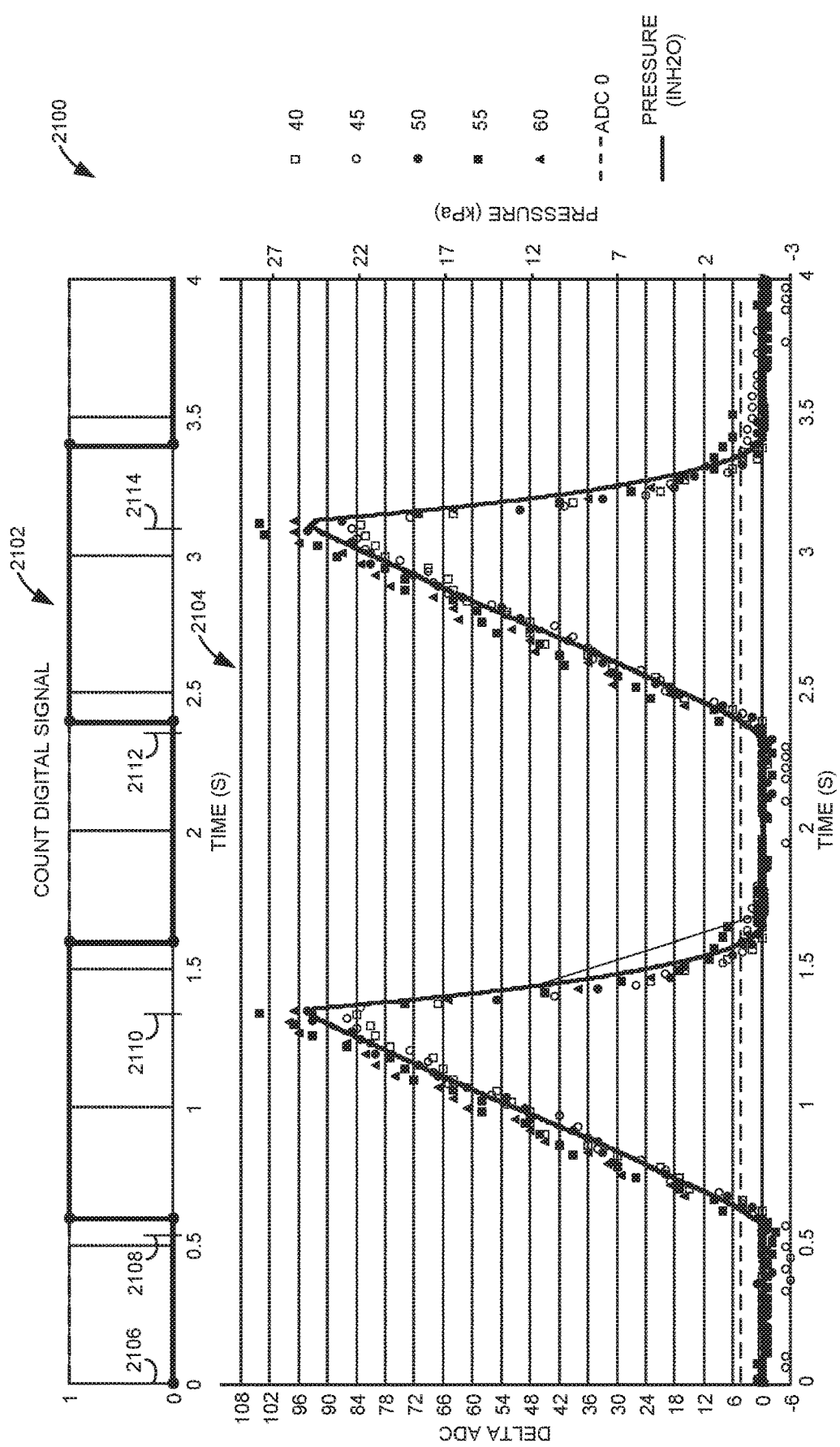
FIG. 21 is a chart illustrating one example of a plurality of sensor cell measurements during a pneumatic stimulus event.

At 1934, the at least one logic circuit may further receive, via the interface, second further requests corresponding to the different sensor IDs with the component connected to the apparatus and the apparatus pneumatically actuating the component. At 1936, the at least one logic circuit may further transmit, via the interface, digital values in response to the second further requests wherein for the majority of the digital values a difference between the digital value and the corresponding resting state digital value is greater than the limit parameter. In one example, to reach the majority of differences being greater than the limit parameter, the digital values are only transmitted during the pneumatic actuation. For example, the second further requests are only sent during the pneumatic actuation. In one example, these digital values are only transmitted during a portion of the pneumatic actuation where the internal pressure of the reservoir is (or should be) higher than, for example, 7 kPA, 10 kPA, 14 kPa, 17 kPA or higher than 20 kPa, for example during a pressure pulse or close to a peak of a pressure pulse (which could be a fraction of a second after a pressure pulse as indicated in FIG. 21).

Figure 19F:
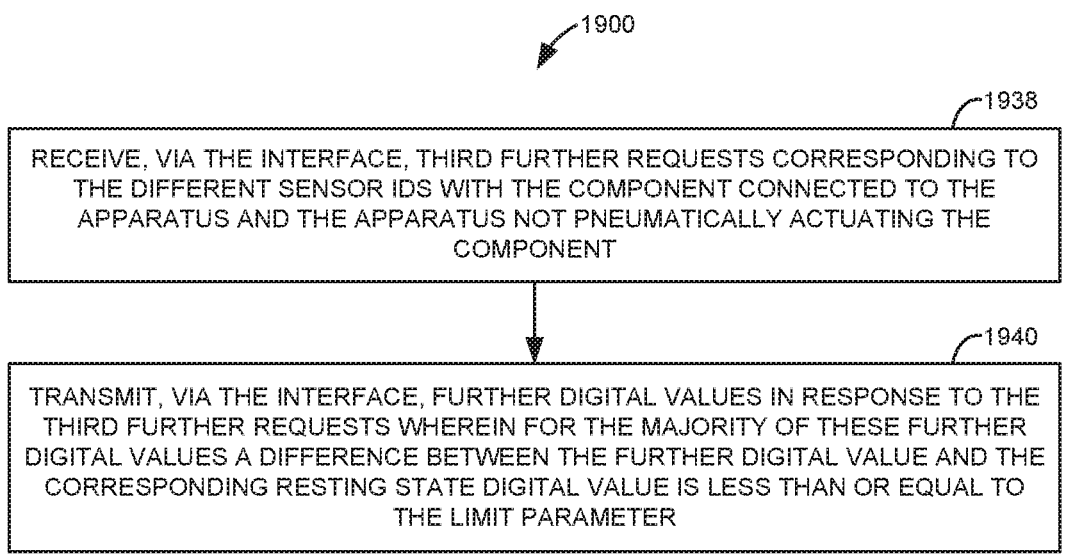

As illustrated in FIG. 19F, at 1938 the at least one logic circuit may further receive, via the interface, third further requests corresponding to the different sensor IDs with the component connected to the apparatus and the apparatus not pneumatically actuating the component. At 1940, the at least one logic circuit may further transmit, via the interface, further digital values in response to the third further requests wherein for the majority of these further digital values a difference between the further digital value and the corresponding resting state digital value is less than or equal to the limit parameter. In one example, this step validates a correct measurement of both pressure and non-pressure. In one example, the further digital values are transmitted when no pressure is exerted by the print apparatus air pen, for example before, after or between pressure pulses.

In one example, the at least one logic circuit may further receive, via the interface, the first calibration parameter and transmit the digital values and further digital values of FIGS. 19E and 19F, in response to the requests after receiving these first calibration parameters. The first calibration parameters may be operational calibration parameters for the corresponding sensor cell to detect the pneumatic event. In one example, the same calibration parameters are associated with the different sensor IDs. For example, first the first calibration parameters are determined based on the first sensor ID as stored in the memory 800 and once determined these same first calibration parameters are used for the other sensor IDs.

Figure 19G:
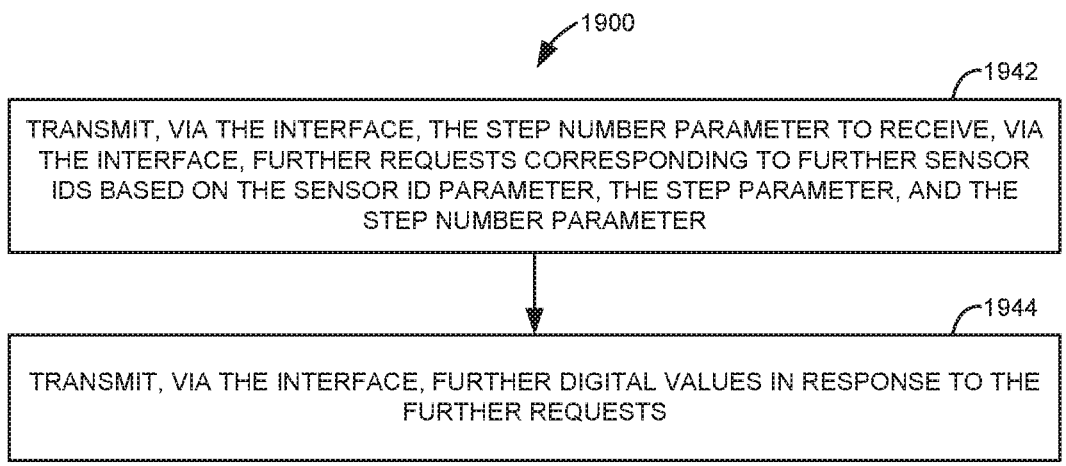

As illustrated in FIG. 19G, at 1942 the at least one logic circuit may further transmit, via the interface, the step number parameter to receive, via the interface, further requests corresponding to further sensor IDs based on the sensor ID parameter, the step parameter, and the step number parameter. At 1944, the at least one logic circuit may transmit, via the interface, further digital values in response to the further requests.

In one example, the at least one logic circuit may further repeat the following while further requests to read a sensor ID are received: receive, via the interface, a further request to read a sensor ID based on the sensor ID parameter and the step parameter; and transmit, via the interface, a further digital value in response to the further request.

Figure 19H:
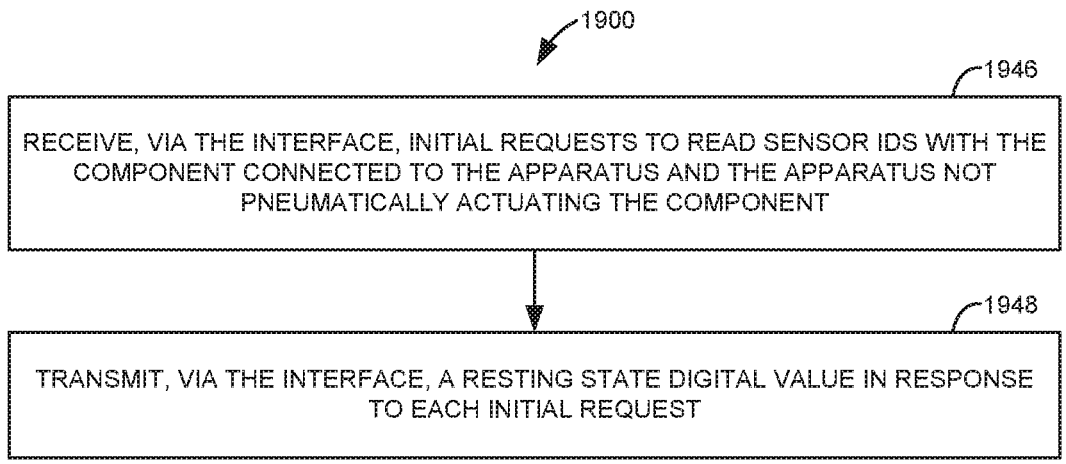

As illustrated in FIG. 19H, at 1946 the at least one logic circuit may further receive, via the interface, initial requests to read sensor IDs with the component connected to the apparatus and the apparatus not pneumatically actuating the component. At 1948, the at least one logic circuit may further transmit, via the interface, a resting state digital value in response to each initial request.

Figure 20:
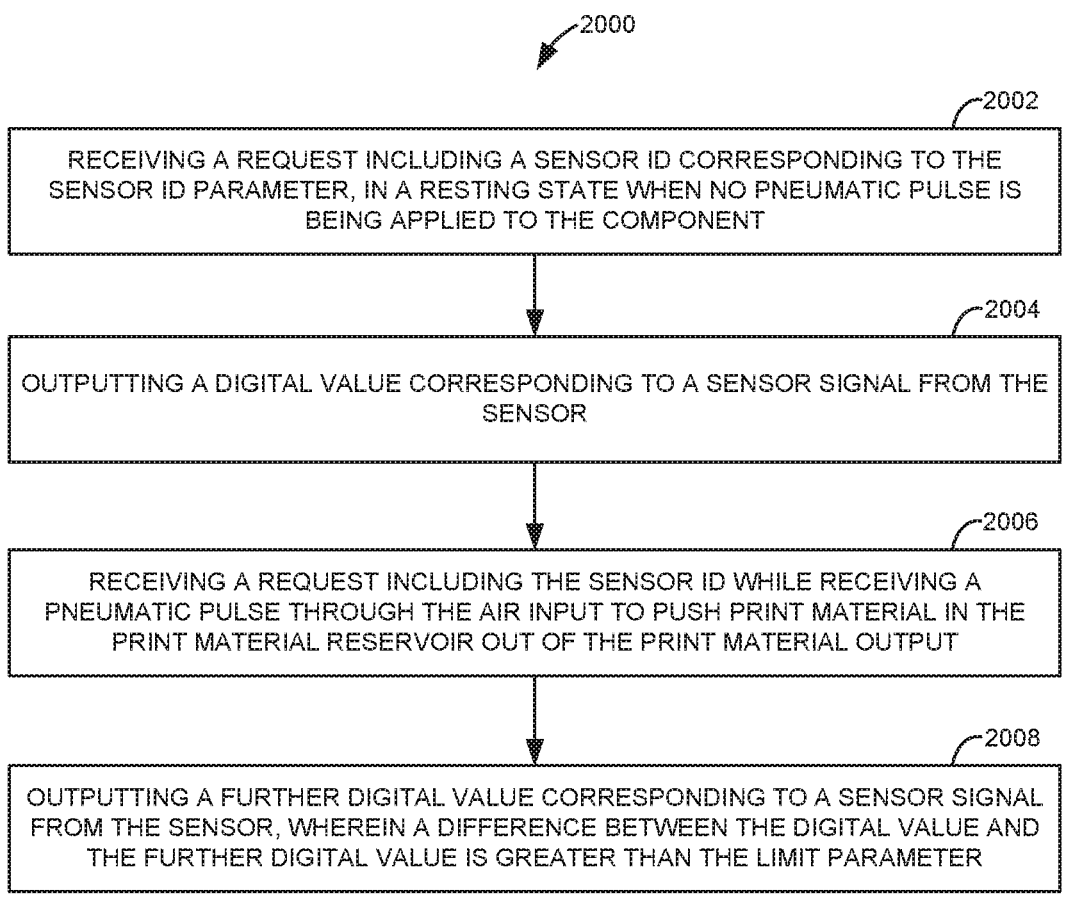
FIG. 20 is a flow diagram illustrating another example of method that may be carried out by a logic circuitry package.

FIG. 20 is a flow diagram illustrating another example of method 200 that may be carried out by a logic circuitry package, such as logic circuitry package 400a-400d, 602, 1001, or 2501, or processing circuitry 424. At 2002, method 2000 may include receiving a request including a sensor ID corresponding to the sensor ID parameter, in a resting state when no pneumatic pulse is being applied to the component. The logic circuitry package includes a sensor to detect a pneumatic actuation, for example corresponding to FIG. 9 or 10, for example a single sensor cell or an array of sensor cells. The internal reservoir pressure may be less than 0 kPa for example between 0 and −10 kPa. At 2004, method 2000 may include outputting a digital value corresponding to a sensor signal from the sensor. At 2006, method 2000 may include receiving a request including the sensor ID while receiving a pneumatic pulse through the air input to push print material in the print material reservoir out of the print material output. At 2008, method 2000 may include outputting a further digital value corresponding to a sensor signal from the sensor. A difference between the digital value and the further digital value is greater than the limit parameter.

In a further example, as explained at various locations in this disclosure, a replaceable print apparatus component may include a print material reservoir with print material inside, a print material output, an air input, and a logic circuitry package as previously described. The logic circuitry package may include a logic circuit, a sensor, and a memory storing a sensor ID parameter and a limit parameter. In this example, the logic circuit may receive a request including a sensor ID corresponding to the sensor ID parameter, in a resting state when no pneumatic pulse is being applied to the component, and output a digital value corresponding to a sensor signal from the sensor. The logic circuit may also receive a request including the sensor ID while a pneumatic pulse is being applied to the component, through the air input, to push print material in the print material reservoir out of the print material output, and output a further digital value corresponding to a sensor signal from the sensor. A difference between the digital value and the further digital value is greater than the limit parameter.

FIG. 21 is a chart 2100 illustrating one example of a plurality of sensor cell measurements during a pneumatic stimulus event. In this example, sensor cells having sensor IDs of 40, 45, 50, 55, and 60, such as illustrated in FIG. 18, are used for the measurements. In addition, the limit parameter is indicated as ADC 0, which is about 5 counts in this example. In other examples, other sensor cells may be used for the measurements and a different ADC 0 value may be used. The upper portion 2102 of chart 2100 indicates a count digital signal while the lower portion 2104 of chart 2100 indicates the sensor cell measurements. The upper portion 2102 includes the count digital signal versus time in seconds. The lower portion 2104 includes the delta ADC count (indicated on the left) and the pressure in kilopascals (indicated on the right) for each sensor cell versus time in seconds. The delta ADC counts in this example are normalized based on the resting state ADC counts for each sensor cell as previously described and illustrated with reference to FIG. 12.

A pneumatic stimulus event may include a plurality of pneumatic pulses (e.g., two in this example), where each pneumatic pulse includes a pump start and pump stop. In this example, the pneumatic stimulus event may be initiated at time 0 at 2106. The first pump start may be at 2108 followed by the first pump stop at 2110. The second pump start may be at 2112 followed by the second pump stop at 2114. As shown in the lower portion 2104 for each pulse, when the pump starts, the pressure within the print material reservoir increases from about 0 counts (e.g., about 0 kPa) to about 96 counts (e.g., about 24 kPa). When the pump stops, the pressure within the print material reservoir drops back down to about 0 counts.

Referring again to the upper portion 2102, in response to a sensor cell reading being less than ADC 0 (i.e., the limit parameter), the count digital signal is 0. In response to the sensor cell reading being greater than ADC 0, the count digital signal is 1. Each count digital signal of 1 is counted by a counter, and indicated by "Count" in the following formula. The ratio of counts to the total number of readings per pulse (i.e., between the pump start and pump stop), indicated by "Total # reads in Pulse Time", may be compared to a count threshold parameter (e.g., 816 of FIG. 8) to determine whether the pulse occurred successfully as indicated by:

$$CountA = \frac{Count * 1{,}000}{Total\ \#\ reads\ in\ Pulse\ Time}$$

$$Count_{Threshold} \le CountA \le 1{,}000$$

In the above example, a scaling factor of 1,000 is used. In other examples, however, other suitable scaling factors may be used. If CountA is greater than or equal to the count threshold parameter, the replaceable print apparatus component may be considered to be functioning correctly. If CountA is less than the count threshold parameter, the replaceable print apparatus component may be considered to be defective (e.g., leaking or other issue). The count threshold parameter 816 may be stored in the memory 800 of the logic circuitry package. The count threshold parameter may be set to facilitate detecting a defect while preventing a false rejection by the print apparatus logic circuit. The count digital signal for each sensor cell reading should be 0 before each pump start. If the count digital signal for each sensor cell reading is not 0 before each pump start, the replaceable print apparatus component may be defective (e.g., improper venting or other issue). In certain alternative examples, the output digital values may be emulated for validation by the print apparatus logic circuit, for example to prevent rejections.

Figure 22A:
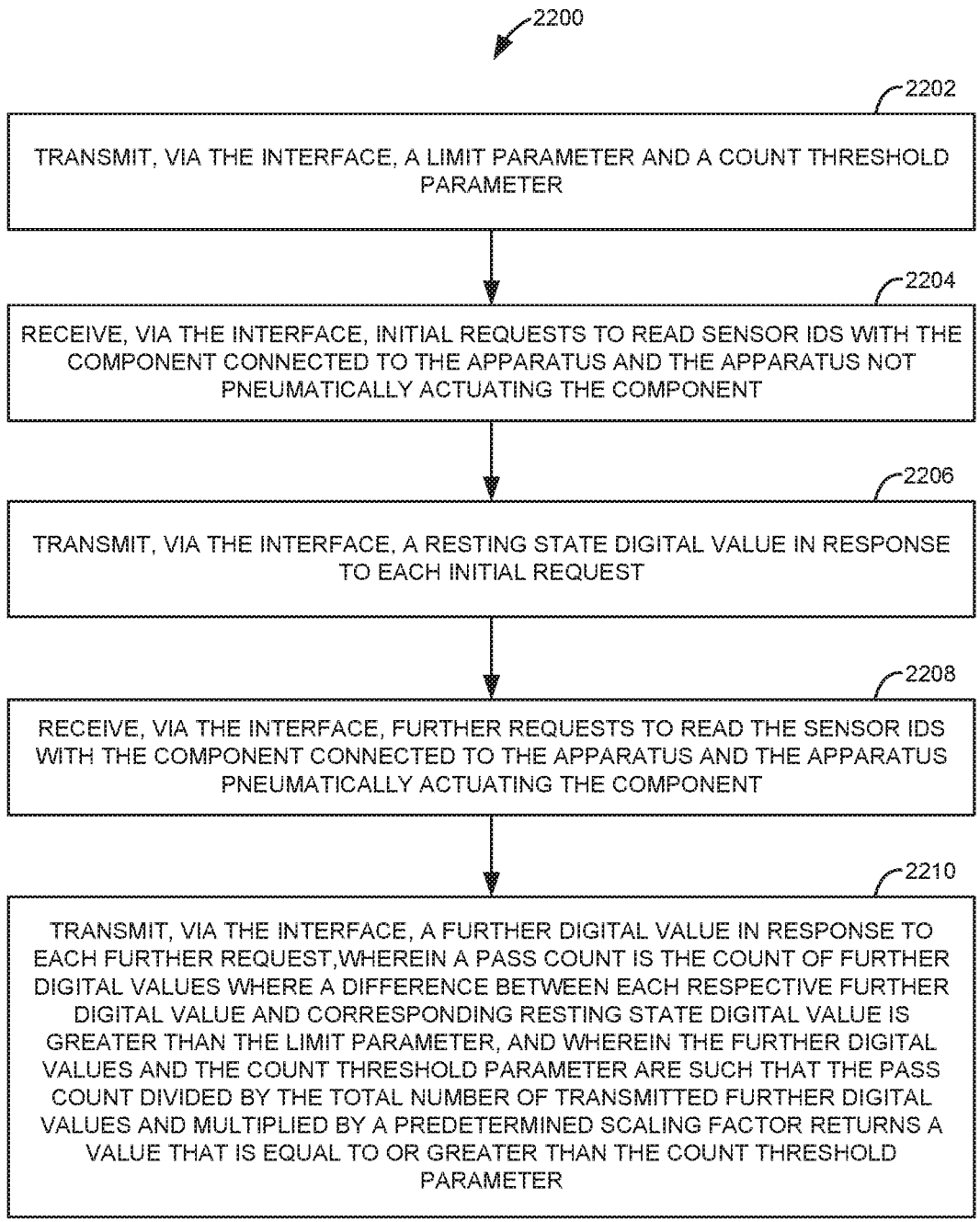
FIGS. 22A-22B are flow diagrams illustrating other example methods that may be carried out by a logic circuitry package.
Figure 22B:
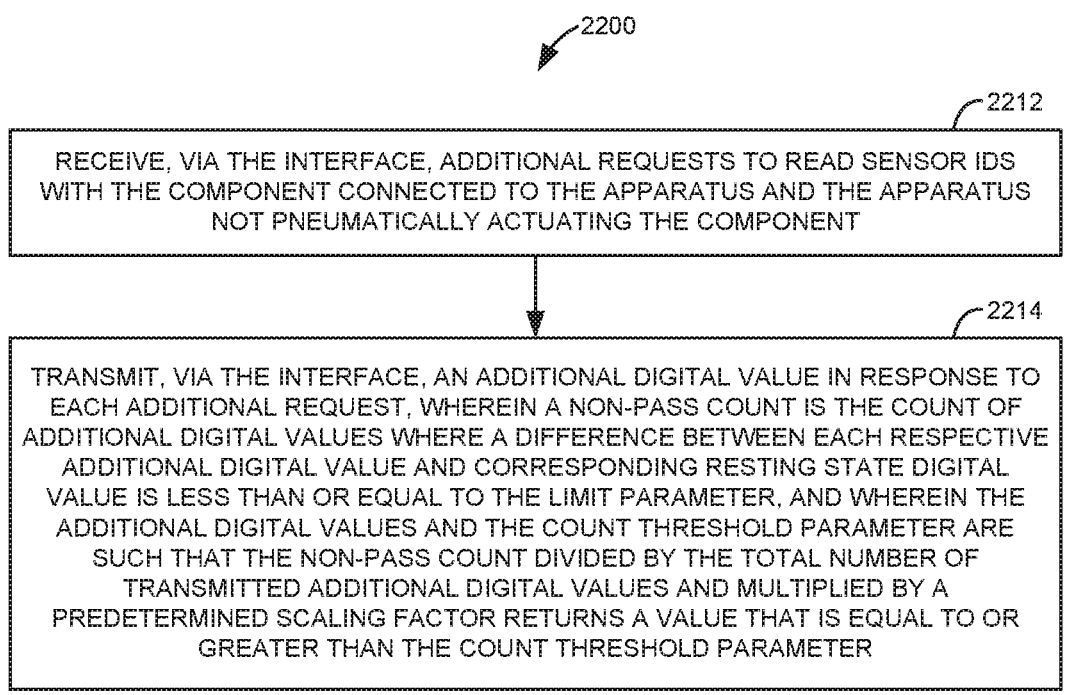

FIGS. 22A-22B are flow diagrams illustrating other example methods 2200 that may be carried out by a logic circuitry package, such as logic circuitry package 400a-400d or 602 or processing circuitry 424. As illustrated in FIG. 22A, at 2202 the at least one logic circuit may transmit, via the interface, a limit parameter and a count threshold parameter. At 2204, the at least one logic circuit may receive, via the interface, initial requests to read sensor IDs with the component connected to the apparatus and the apparatus not pneumatically actuating the component. At 2206, the at least one logic circuit may transmit, via the interface, a resting state digital value in response to each initial request. At 2208, the at least one logic circuit may receive, via the interface, further requests to read the sensor IDs with the component connected to the apparatus and the apparatus pneumatically actuating the component. At 2210, the at least one logic circuit may transmit, via the interface, a further digital value in response to each further request. A pass count is the count of further digital values where a difference between each respective further digital value and corresponding resting state digital value is greater than the limit parameter. The further digital values and the count threshold parameter are such that the pass count divided by the total number of transmitted further digital values and multiplied by a predetermined scaling factor returns a value that is equal to or greater than the count threshold parameter. In one example, the scaling factor is 1000 and the count threshold parameter is between more than 500 and less than 100. In one example, the threshold parameter divided by the scaling factor may be between 0.5 and 1. The predetermined scaling factor may be a value equaling 10 to the $n^{th}$ power, n being any positive natural number that is greater than and closest to the value of the threshold parameter. In one example, the count threshold parameter 816 is stored in a memory 800 of the logic circuitry package and the scaling factor is applied by the print apparatus logic circuit. The at least one logic circuit may transmit the limit parameter and the count threshold parameter in response to a request to a first default address of the logic circuitry package and may transmit the resting state digital values and the further digital values in response to the initial and further requests to a second default address and/or a reconfigured address of the logic circuitry package In one example, the at least one logic circuit may further, receive, via the interface, a first calibration parameter and transmit the resting state digital values in response to the initial requests and the further digital values in response to the further requests. The first calibration parameter may be an operational calibration parameter for the pre-selected sensor IDs, that returns in-range count values. The at least one logic circuit may receive, via the interface, different calibration parameters including the first calibration parameter and transmit the resting state digital values in response to the first calibration parameter. In this case, the at least one logic circuit may further transmit different digital values in response to the respective different calibration parameters. The different digital values may include the resting state digital values and at least one different digital value clipped at the end of a range defined by a natural number of bytes. The different calibration parameters include non-operational calibration parameters that return clipped values and can therefore not be used for measurement. It is noted that for certain examples, the calibration parameters are needed for proper functioning, while for other, alternative, examples that digitally emulate sensor measurements, calibration parameters may be irrelevant. In the latter example, output digital values may be generated at least partially based on a LUT and/or algorithm.

As illustrated in FIG. 22B, at 2212 the at least one logic circuit may further receive, via the interface, additional requests to read sensor IDs with the component connected to the apparatus and the apparatus not pneumatically actuating the component. At 2214, the at least one logic circuit may further transmit, via the interface, an additional digital value in response to each additional request. A non-pass count is the count of additional digital values where a difference between each respective additional digital value and corresponding resting state digital value is less than or equal to the limit parameter. The additional digital values and the count threshold parameter are such that the non-pass count divided by the total number of transmitted additional digital values and multiplied by a predetermined scaling factor returns a value that is equal to or greater than the count threshold parameter.

In an example, the at least one logic circuit may respond to predetermined commands directed to at least two default I2C addresses and to reconfigure one of the two default addresses. In this example, the at least one logic circuit may transmit the limit parameter, and/or the count threshold parameter, and/or any of the parameters illustrated in FIG. 8 in response to a first default address of the logic circuitry package and transmit the resting state digital values and the further digital values in response to the initial and further requests to a second default address and/or a reconfigured address of the logic circuitry package. The second and/or reconfigured address may be enabled by a timer period command as discussed elsewhere in this disclosure.

Figure 23:
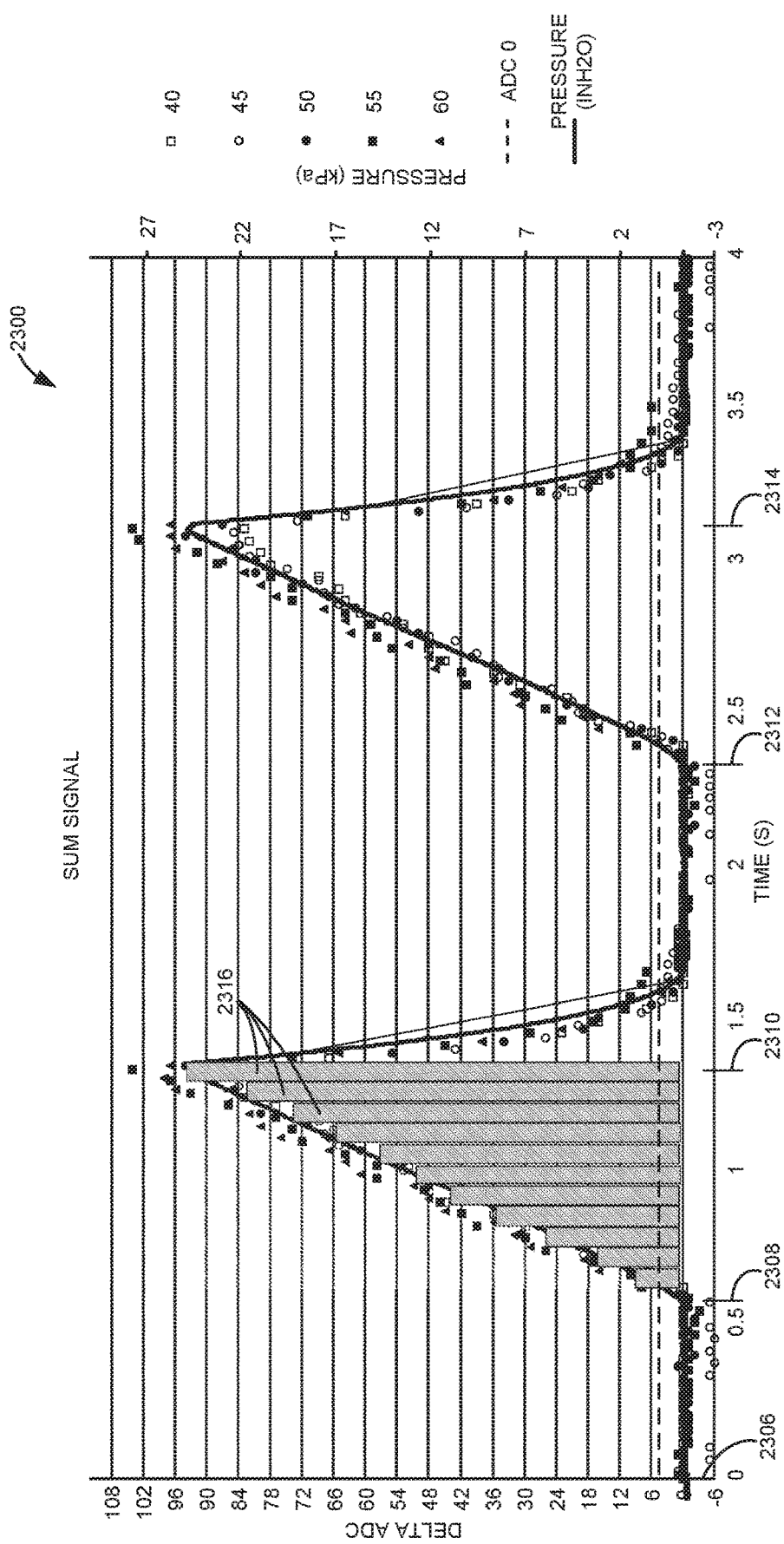
FIG. 23 is a chart illustrating another example of a plurality of sensor cell measurements during a pneumatic stimulus event.

FIG. 23 is a chart 2300 illustrating another example of a plurality of sensor cell measurements during a pneumatic stimulus event. In this example, sensor cells having sensor IDs of 40, 45, 50, 55, and 60, such as illustrated in FIG. 18, are used for the measurements. In addition, the limit parameter is indicated as ADC 0, which is about 5 counts in this example. In other examples, other sensor cells may be used for the measurements and a different ADC 0 value may be used. Chart 2300 includes the delta ADC count (indicated on the left) and the pressure in kilopascals (indicated on the right) for each sensor cell versus time in seconds. The delta ADC counts in this example are normalized based on the resting state ADC counts for each sensor cell as previously described and illustrated with reference to FIG. 12.

A pneumatic stimulus event may include a plurality of pneumatic pulses (e.g., two in this example), where each pneumatic pulse includes a pump start and pump stop. In this example, the pneumatic stimulus event may be initiated at time 0 at 2306. The first pump start may be at 2308 followed by the first pump stop at 2310. The second pump start may be at 2312 followed by the second pump stop at 2314. As shown in chart 2300 for each pulse, when the pump starts, the pressure within the print material reservoir increases from about 0 counts (e.g., about 0 kPa) to about 96 counts (e.g., about 24 kPa). When the pump stops, the pressure within the print material reservoir drops back down to about 0 counts.

Each sensor cell reading above ADC 0 (i.e., the limit parameter) is multiplied by the average sample rate to build each "box" 2316 of a Riemann sum. The area of all the boxes are summed and compared to the expected area, i.e., a sum threshold parameter (e.g., 818 of FIG. 8). If the value of the sum is too far below the sum threshold, then the pulse is considered to have not been successful indicating a defective (e.g., leaking or other issue) replaceable print apparatus component. This method can determine whether the minimum required pressure to achieve a successful pulse occurred. Over-pressurization may also be detected.

Figure 24:
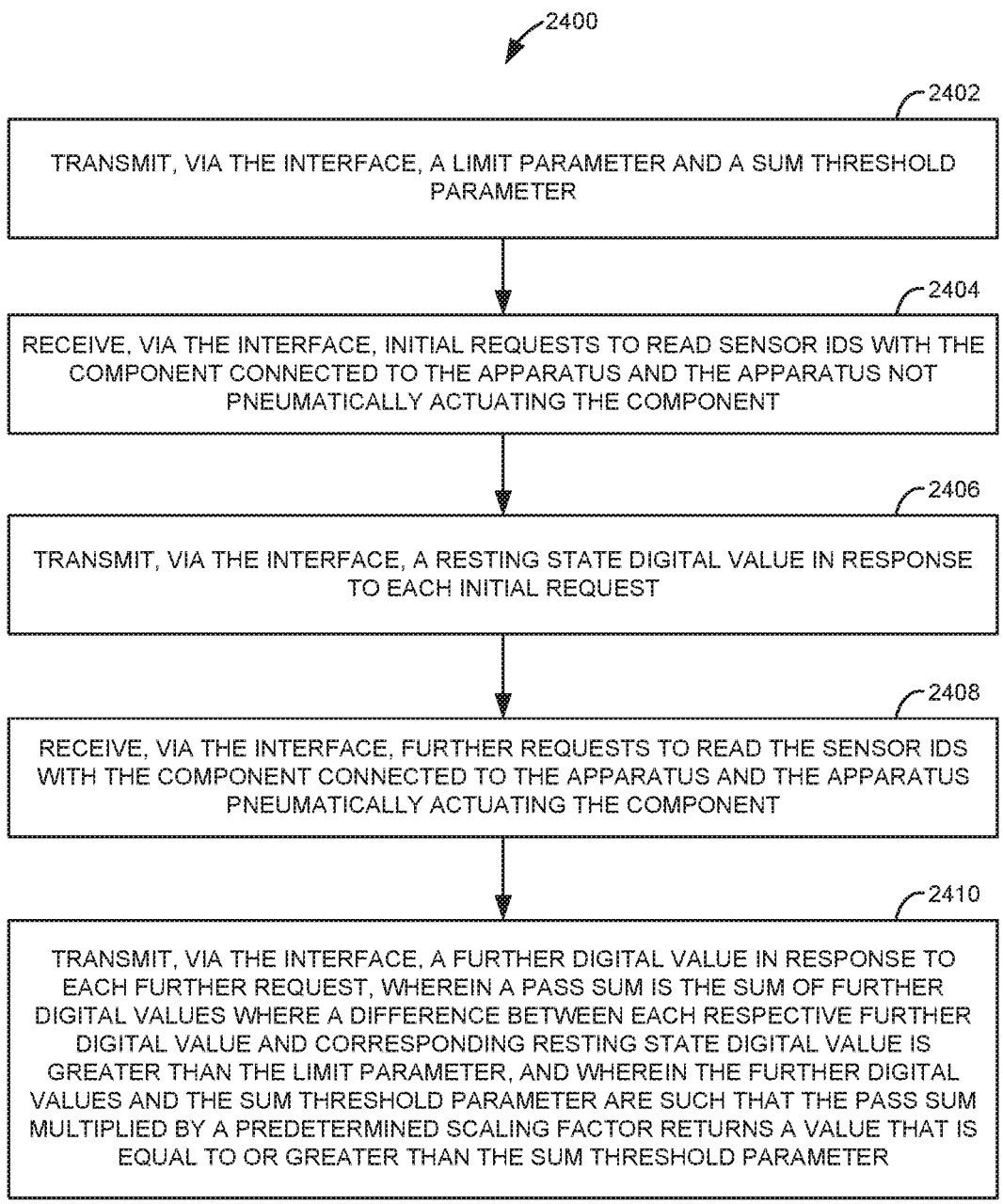
FIG. 24 is a flow diagram illustrating another example of a method that may be carried out by a logic circuitry package.

FIG. 24 is a flow diagram illustrating another example of method 2400 that may be carried out by a logic circuitry package, such as logic circuitry package 400a-400d or 602 or processing circuitry 424. At 2402, the at least one logic circuit may transmit, via the interface, a limit parameter and a sum threshold parameter. At 2404, the at least one logic circuit may receive, via the interface, initial requests to read sensor IDs with the component connected to the apparatus and the apparatus not pneumatically actuating the component. At 2406, the at least one logic circuit may transmit, via the interface, a resting state digital value in response to each initial request. At 2408, the at least one logic circuit may receive, via the interface, further requests to read the sensor IDs with the component connected to the apparatus and the apparatus pneumatically actuating the component. At 2410, the at least one logic circuit may transmit, via the interface, a further digital value in response to each further request. A pass sum is the sum of further digital values where a difference between each respective further digital value and corresponding resting state digital value is greater than the limit parameter. The further digital values and the sum threshold parameter are such that the pass sum multiplied by a predetermined scaling factor returns a value that is equal to or greater than the sum threshold parameter.

In one example, the at least one logic circuit may transmit the limit parameter and the sum threshold parameter in response to a request to a first default address of the logic circuitry package and may transmit the resting state digital values and the further digital values in response to the initial and further requests to a second default address and/or a reconfigured address of the logic circuitry package.

FIGS. 25 and 26 illustrate alternative embodiments of a logic circuitry package 2501 and logic circuit 2503. The logic circuit 2503 may include or be part of integrated circuitry such as an application specific integrated circuit, processing circuitry, a microprocessor or microcontroller, etc. The logic circuit may include a single integrated logic circuit or multiple interconnected logic circuits adapted to apply logic functions based on received parameters, to provide a certain output to be validated by a print apparatus logic circuit, wherein the output is not necessarily the result of a measured analog sensor or cell state, nor is it necessarily related to an actual print liquid level or reservoir pressure. This alternative embodiment may provide for a relatively cheap or simply alternative solution, for different purposes, that is suitable to output responses that are validated by the print apparatus logic circuit.

The logic circuit 2503 of FIG. 25 could be devised to include a single integrated circuit that executes certain functions (at least partially) virtually. For example, the logic circuit 2503 may not be equipped with, or connected to, physical sensors. In one example, the logic circuit 2503 only includes a first sensor 2555 to detect effects of a pneumatic stimulus and/or to detect a pressurization. In other examples, different sensors having different functions are provided. The logic circuit 2503 may include integrated circuitry and connections to such sensors. The logic circuit 2503 may include wired or wireless connections to sensors or between different elements of integrated circuitry.

The logic circuit 2503 may include sets of instructions 2505A and a processor 2503A to execute the instructions. A decoding function 2505, address function 2502, and/or time function 2529 may be embodied by a set of instructions 2505A, for execution by the processor 2503A. In certain "hybrid" examples of the logic circuit 2503, some of these functions may include dedicated hardware logic. In other examples, logic circuits may be devised that have both (i) virtual or digital functions and (ii) hardwired logic corresponding to other examples of this disclosure.

A logic circuit 2503 that replaces certain hardwired logic functions with virtual logic functions may be relatively cost efficient as compared to, for example, logic circuitry packages (e.g., 400d of FIG. 4E or 502 of FIG. 5A) that include secure microcontrollers as first logic circuits and, as second logic circuits, thin film packages with a plurality of sensor cell arrays. For example, the logic circuit 2503 of FIG. 25 or 26 may provide for a back-up solution in case of field failures of those more expensive circuitries including thin film sensor assemblies. Another example logic circuit 2503 is relatively easy to manufacture. Another example logic circuit 2503 may be used with service cartridges that supply service liquids, to service print liquid channels of a print apparatus. Another example logic circuit 2503 may provide for an alternative logic circuit as compared to logic circuitries including thin film sensor assemblies. In a further example, these "alternative" examples may be more robust in that they may pass certain thresholds or the like while relying to a lesser extent on proper functioning of sometimes relatively unreliable analog sensors, as compared to complex analog sensor cell arrays. Also for this alternative example, the output is conditioned by the same print apparatus logic circuit, as well as by the parameters received and stored by the logic circuitry package, and therefore different functions and features are similar to, or the same as, the examples of complex analog sensor arrays. The reader and/or skilled person will understand the analogies between the different indicated examples, even where slightly different wording may be used.

The logic circuit 2503 includes an interface 2523 to communicate with the print apparatus logic circuit, for example over a serial bus as explained earlier. The interface 2523 may include four contacts to establish digital I2C communications. The logic circuit 2503 may include a read buffer 2522 to output read values for transmission through the serial bus.

The logic circuit 2503 may load a count value into the read buffer 2522 in response to each read request. The read buffer 2522 may be configured to output count values in the output count value range (e.g., a natural number of bytes such as 1 byte, where 1 byte corresponds to 0-255).

The logic circuit 2503 may be configured to receive communications from the print apparatus logic circuit directed to a default first I2C address, at least after a first power up. The default first I2C address is the address that may distinguish the replaceable print component from other components installed in the same print apparatus.

A communication address setting function, or in short, address function 2502, of the logic circuit 2503 may be configured to process an enable command specifying a time parameter (i.e., time period), directed to the first, default I2C communications address of the logic circuitry package, and in response to the command, enable the processing of communications directed to a different I2C communications address for a duration based on the time parameter. For example, the different I2C communications address is different than the first address, and different than any of the other first addresses of the other components connected to the serial bus. For example, the different address is the second I2C address, and later, the reconfigured/new address as provided by the print apparatus logic circuit.

The address function 2502 of the logic circuit 2503 is configured to identify the enable command specifying the time parameter. The address function 2502 provides that the logic circuit 2503 responds to, or acts upon, subsequent commands directed to a second default address in response to the enable command. "Acting upon" may include the logic circuit 2503 enabling, running, setting, selecting, storing, etc., in response to commands directed to the second address, and in certain instances, responding directly to the print apparatus logic circuit.

The default second address may be the same for multiple logic circuits 2503 associated with different print material types connected or connectable to the same print apparatus serial bus. The address function 2502 is configured to identify a new address specified in a subsequent command directed to the second default address and to configure the new address as the I2C communication address for the rest of the duration. The address function 2502 may be programmed to reconfigure the second address as often as it is instructed to. In one example, the address function 2502 is programmed to again respond to communications over the first address once the duration has expired. The mentioned default first address and the default second address may be, at each session, the same while the new second address may be, at each session, different. In one example, the address logic 2502 is configured to respond to communications to the first address and not to communications to the second and/or new address outside of said durations, and to communications to the second and/or new address and not to communications to the first address during the duration.

The logic circuit 2503 may include a time function 2529 such as a time or delay function that may be ran to determine the expiry of said time period. In one example the time period encoded in an enable command, or an associated duration, is used as a parameter for determining the end of the time period using the time function. In one example, the time function 2529 includes and/or uses a timer or delay circuit as explained above with reference to FIG. 4B, 4D, 4E, or 6. The time function 2529 may be configured to monitor the time or delay circuit to determine the end of the duration, whereby upon determining the end of the duration the address function 2502 again sets the logic circuit 2503 to respond to communications to the first address. In another example a settable delay circuit is, after each enable command specifying the time parameter, set to expire at the end of the duration, whereby upon expiry the address function 2502 switches back to using the first address. In some instances, the timer or delay function 2529 may be integrated with, or considered part of, the address function 2502 to set communication addresses.

The logic circuit 2503 includes a memory 2507. The memory 2507 may include data to relate parameters to outputs, for example at least one LUT 2507-4 and/or algorithm 2507-5 that relate sets of parameters (e.g. class/sub-class/calibration etc.) to output count values, either directly or indirectly. While certain example logic circuits 2503 corresponding to FIG. 25 may not have four or more physical sensor cell arrays or sensor cells of certain other examples of this disclosure, the logic circuit 2503 may still distinguish class and sub-class and other parameters to be able to condition the output in correspondence with what the print apparatus logic circuit can validate. As mentioned previously, in this disclosure the class and sub-class parameters are also both commonly referred to as sensor IDs, or more specifically, sensor type ID and sensor cell ID, respectively.

For example, a first class (e.g., sensor ID) may be associated with different output count values depending on the presence or absence of a pneumatic event. For example, different classes may be associated with certain different operational calibration parameters. For example, certain classes may be associated with smoothly varying output count values, smoothly varying in a certain way, again depending on the calibration parameters or certain characteristics of that class. For example, a second class may be associated with first relatively low count values for certain sub-classes, and after some depletion of the print material has occurred, second relatively high count values with a minimum difference, for example of at least 10 counts, between these first and second count values. In accordance with these and other examples, identifying classes and sub-classes (e.g., sensor type IDs and sensor cell IDs), similar to cell classes and cells, respectively, facilitates outputting a count value, for example using said data (LUT 2507-4, algorithm 2507-5) to relate these sets of parameters to certain outputs that the print apparatus logic circuit may validate. Similar to earlier examples, the logic circuit 2503 may be configured to identify and generate output count values based on at least four or at least five classes and at least 20, 30, 40, 50, 80, 100, 120, for example at least 126 sub-classes, for some of the classes.

In this disclosure, a LUT 2507-4 includes one or more lists or tables to relate input parameters to outputs. In this disclosure, a look-up list is also considered to be encompassed by a LUT 2507-4. In one example, a LUT 2507-4 includes output count values. In another example, a LUT 2507-4 includes intermediate values to be used for relating parameters to output count values, for example after applying a further algorithm 2507-5, decoding function 2505 or randomizer function. For example, since there may be a limited amount of output count values (e.g., 256) and many more combinations of input parameters, references or addresses related to output count values may be stored in the LUT, associated with combinations of parameters. Similarly input parameter values may be represented directly or indirectly (e.g., after a further conversion or calculation) in the LUT 2507-4. In other examples, algorithms 2507-5 may be used to relate sets of input parameters to output count values. The LUTs 2507-4 and/or algorithm 2507-5 may be encoded in the memory 2507 in any way, for example, scrambled, encrypted, etc. The decoding function 2505 may be configured to identify the parameters and, relate these parameters to certain values in the LUT 2507-4 and/or algorithm 2507-5 to determine the output count value.

For example, a LUT may be generated during manufacture based on test cycles of a logic circuitry package of some of the other examples of this disclosure (e.g., 502 of FIG. 5A or 400d of FIG. 4E), whereby many or all combinations of input parameters may be related to output count values that the print apparatus validates.

The LUTs or lists 2507-4 may also relate time parameters to certain durations for responding to communications to the first versus the second or new address. In another example, algorithms 2507-5 may be used to relate time parameters to certain durations for responding to communications to the first versus the second or new address. In one example, multiple adjacent time parameters could be related to a single duration. In another example, the LUT 2507-4 and/or algorithm 2507-5 can relate one duration to a plurality of time periods. In certain examples, there is a direct correlation between time periods and associated durations.

In one example, a decoding logic function 2505 is configured to identify, from a command stream, time parameters, address parameters, calibration parameters, class selection parameters (e.g. sensor type IDs or sensor type ID parameters), sub-class selection parameters (e.g. sensor cell IDs or sensor cell ID parameters) and/or other parameters, to determine a corresponding output count value based on each of these parameters, for example using the LUT 2507-4 or parameters 2507-5.

The logic circuit 2503 is configured to render the lowest or highest output count value for certain calibration parameters; and output an "in-range" count value between and/or at distance (e.g., at least one count) from the lowest and highest output count value for certain other, operational, calibration parameters. In this disclosure, in-range count values are count values in a range of count values having at least one count distance from the lowest and/or highest count values of the range. The LUT 2507-4 and/or algorithm 2507-5 may be configured to associate different calibration parameters with different output values for the same other parameters, to the extent that the output count values are in-range.

The LUT 2507-4 and/or algorithm 2507-5 may be configured to associate different sub-class parameters with different output values for the same other parameters, to the extent that the output count values are in-range. As explained already, it may be that for certain low amplifier parameter values in-range count values may be output for both the first and second class based on the same operational parameters including the low amplifier parameter, but generally, first operational parameters may apply to a first class and different, second operational parameters to a second class. The decoding function 2505 may be configured to identify, from different received commands, different calibration parameter functions, and for each of these calibration parameter functions, corresponding calibration parameter values.

The logic circuit 2503 may condition the output based on the calibration parameter values in a way that is different for each corresponding calibration parameter function. For example, a (change in an) offset parameter value may have different effect on the output than a similar (change in an) amplifier parameter value. The decoding logic function 2505 may be configured to identify an offset and an amplifier parameter, whereby the logic circuit 2503 may be configured to change the output based on the offset parameter by an amount that is a function of the amplifier parameter. Again, in any of these examples, the output may be based on a stored LUT and/or algorithm, while in certain hybrid examples physical reference cells could be used to help generate the output. Similarly, the decoding function 2505 may identify (sub-)class parameter functions and (sub-)class parameter values, and the logic circuit 2503 may condition the output accordingly.

The LUT 2507-4 and/or algorithm 2507-5 may be configured so that, for a range of changing not-operational calibration parameters associated with the same class and sub-class, the associated output values remain the highest or lowest output value, that is, without changing, because these different not-operational calibration parameters are not associated with in-range values. At the same time, the logic circuit 2503 may be configured to, in a series of command-responses, vary in-range count values for different sub-class parameters (i.e., different sub-class parameter values), wherein other parameters including certain operational calibration parameters and a class parameter were last communicated before that series of command-responses. The varying in-range count values may approximately correspond to the different count values for different cells of FIG. 9 where the variation is related to noise such as inherent strains or parasitic resistance. In another example, the logic circuit 2503 is configured to output the same in-range count values in response to certain class parameters and operational calibration parameters, or having regular variations such as along a straight sloped line without noise or random deviations, also within the sub-range. In one example, the circuit may be adapted to output varying count values for the first class and the same count value for different sub-classes for the same second class.

The decoding function 2505 and/or LUT 2507-4 may be configured to associate certain classes with a plurality of sub-classes. The decoding function 2505 and/or LUT 2507-4 may be configured to associate certain classes with a single sub-class or with no sub-class.

In other examples, the logic circuit 2503 includes a first sensor 2555 and/or a second sensor 2557. The first sensor 2555 may be suitable to detect a pneumatic stimulus (e.g., in use, located near an air input of the component) and may be any of the first sensors mentioned in this disclosure, for example as described with reference to FIG. 9. The first and/or second sensor may be a single cell sensor or a sensor cell array of multiple cells. In this example, a signal from the first or second sensor 2555, 2557 may be another parameter as input for determining an output count value, for example using the LUT 2505-4 or algorithm 2505-5. For example, the first or second sensor 2555, 2557 may be consulted upon identifying a corresponding first or second class parameter. When a class parameter selects a second class, a print material level sensor 2557 and/or a data field 2527 may be consulted, and when a class parameter selects a first class, the first sensor 2555 may be consulted. This is indicated in FIG. 26.

In one example, the memory 2507 includes a print material level field 2527. The print apparatus updates that field 2527 as a function of printed pages or drops while extracting print material from the print component. The data of field 2527 can be associated with print material level data. The logic circuit 2503 may, upon identifying a corresponding (hereafter: second) class, determine output count values based on the print material level field 2527. The logic circuit 2503 may be configured to start returning second, higher count values for (e.g., initial) sub-classes of the second class after determining that the level in the field 2527 has passed a certain threshold 2590. In another example, the logic circuit 2503 may return only relatively low, first count values until the field 2527 reaches the threshold 2590 whereby the logic circuit 2503 may not include the second sensor 2527. When the logic circuit 2503 does not generate second count values at a point or threshold 2590 where the print apparatus would expect so, the print apparatus may not be able to validate the logic circuit responses after such point. Hence, the print apparatus component may require replacement at or before such point, whereby in certain examples the depleted print material may still be substantial (for example half a volume of a certain reference extra-large cartridge volume, as represented by a product ID in the memory 2507) so that the component has a useful life.

In certain examples, the second sensor 2557 for detecting a change of print material level can be an analog electrode or optical sensor or the like, adapted to determine a print material level change, whereby the detected level can be used as input parameter P2 for the LUT 2507-4 and/or algorithm 2507-5 (also see FIG. 26). In one example, the logic circuit 2503 may start using signals of the second sensor 2557 only when the value in the field 2527 has passed a certain threshold 2590.

In one example, the logic circuit 2503 is adapted to, during exhaustion of print material in a print apparatus component (which exhaustion in one example may be determined by monitoring updates of the print material level field 2527), in response to identical sub-class selection parameters associated with the second class, received at different points in time, output first lower count values and later higher count values, wherein the higher count values may be output after determining that a certain amount of depletion has occurred, for example on the basis of the field 2527 and the threshold 2590. For example, some of the higher count values may be output when the logic circuit 2503 determines that the status field 2527 passes the threshold 2590.

The logic circuit 2503 may include the first sensor 2555 to detect the effect of a pneumatic stimulus, such as a prime or hyperinflation event, as explained in various earlier examples. The sensor 2555 may detect when air is blown to the replaceable component. In certain examples, the sensor may be applied in or near the air input, or in or near a print liquid output. In other examples, the sensor 2555 may be mounted on the exterior of the component to detect a wall deflection. In yet other examples, the sensor 2555 may be connected to a pressure structure to detect the pneumatic event through component pressurization. Different examples of suitable first sensors 2555 are explained throughout this disclosure, for example with reference to FIG. 9, and may include any pressure sensor; a strain gauge; a strain gauge supported by a wall of the reservoir; a strain gauge supported by a reservoir; a metal slug (e.g., with return spring) inside of an inductor; a manometer, for example using a conductive liquid and electrical contacts that are wetted when air pressure is applied, for example located at the air interface; a manometer with (e.g., optical) sensors to measure the location of the air to liquid interface; an accelerometer; a diaphragm or slug connected to a reed (or other) switch which can detect displacement of the diaphragm; a mechanically actuated switch actuated by air displacement, a thermally actuated switch, or another suitable sensing cell. The first sensor 2555 may be adapted to generate a signal associated with a presence or absence of a pneumatic stimulus, and/or a pressure condition of the reservoir.

Certain example print apparatus components may work in the print apparatus without an air input through-port or pressure structure, that is, these example components may function without the external pressurization induced by a print apparatus air output pen. For example, these components may be provided with a clearance to clear a print apparatus air pen. The first sensor 2555 may be provided near or at the clearance, or be alternatively connected to the clearance, to sense air being blown towards the replaceable print apparatus component by the print apparatus through the print apparatus air pen.

The logic circuit 2503 may be connected to the first sensor 2555 and may be configured to, upon receiving and identifying a parameter selecting a first class, consult the sensor 2555. The sensor signal may facilitate determining a presence or absence of the pneumatic stimulus and/or determine a certain pressure condition of the reservoir, which may in turn serve as another parameter to generate the output. The logic circuit 2503 may be configured to, upon selecting the first class and receiving a subsequent sub-class selection (and read request), output a relatively low count value when the sensor 2555 generates a signal associated with the pneumatic event, and, upon receiving the same sub-class selection, at an earlier or later point in time, output a relatively high count value when the sensor 2555 does not generate the signal associated with the pneumatic event or when it generates a different signal, associated with the absence of a pneumatic event.

For example, the logic circuit 2503 may select an output count value using the LUT 2507-4 and/or algorithm 2507-5 based on the detected presence or absence of the pneumatic stimulus, whereby the presence or absence may function as another parameter P2 for determining the output count value. FIG. 26 illustrates how one example of the logic circuitry package 2501 may include the first sensor 2555 and/or second sensor 2557 and use their output as parameters P1, P2, associated with pneumatic effects and/or print material depletion, respectively, as input, alongside other input parameters sent digitally by the print apparatus such as calibration parameters CP1, CP2, class selection parameters CS and/or sub-class selection parameters SCS, to generate the output value CV. In one example, the logic circuit 2503 has only a first sensor 2555. Different sets of all the parameters P1, CP1, CP2, CS, SCS or P2, CP1, CP2, CS, SCS are related to the different count values CV as already explained above. The output count values CV may be generated using the LUT 2507-4 and/or algorithm 2507-5 whereby said parameters P1, P2, CP1, CP2, CS, SCS may be used as input.

Back to FIG. 25, in a further "hybrid" example the logic circuit 2503 may include certain reference or "dummy" cells and/or cell arrays 2581A, for example to load data or signals of the print apparatus command stream and/or to provide for certain analog characteristics of cells that the print apparatus may validate, such as parasitic resistance, noise or certain other not-nominal characteristics. The reference cells may be used to determine variations between cells. In addition, or alternatively, the logic circuit 2503 may include a randomizer function, for example to apply fuzzy random variables. Both the reference cells and/or the randomizer function are indicated by a circuit block 2581. These functions 2581 may modify output count values so as to mimic certain analog characteristics.

Furthermore, reference or dummy cells, indicated in block 2581, may be used just to load the input bitstream or to facilitate testing by the print apparatus logic circuit. The reference or dummy cells may include different resistors of different nominal characteristics, at least one diode, or other cells. Reference or dummy cells may be provided in the same amount of classes and/or sub-classes as the examples discussed elsewhere in this disclosure (e.g., with reference to FIG. 6). In other examples, the decoding function 2505 may include memory arrays such as shift registers similar to earlier explained decoding logic (e.g., 614 of FIG. 6), hereby the LUTs 2507-4 and/or algorithm 2507-5 may still be used to determine the output count value in a virtual fashion.

In the foregoing description, reference may have been made to lower and higher count values, or relatively low and relatively high count values. It should be understood that in such cases these count values are to be interpreted relative to each other, that is, that the higher or relatively high count values are higher than the lower or relatively low count values. Where high or low count values are mentioned separately, without an opposite low or high count value, respectively, these should be understood as having a certain distance, for example at least fifty counts or at least 20%, from an opposite lowest or highest count value, respectively, of the range.

In one example, the logic circuitry packages described herein mainly include hardwired routings, connections, and interfaces between different components. In another example, the logic circuitry packages may also include at least one wireless connection, wireless communication path, or wireless interface, for internal and/or external signaling, whereby a wirelessly connected element may be considered as included in the logic circuitry package and/or replaceable component. For example, certain sensors may be wireless connected to communicate wirelessly to the logic circuit/sensor circuit. For example, sensors such as pressure sensors and/or print material level sensors may communicate wirelessly with other portions of the logic circuit. These elements, that communicate wirelessly with the rest of the logic circuit, may be considered part of the logic circuit or logic circuitry package. Also, the external interface of the logic circuitry package, to communicate with the print apparatus logic circuit, may include a wireless interface. Also, while reference may be made to power routings, power interfaces, or charging or powering certain cells, certain examples of this disclosure may include a power source such as a battery or a power harvesting source that may harvest power from data or clock signals.

It may be understood by a skilled person that in the foregoing description sometimes different denominations may be used for similar features. For example, certain class and sub-class selections may also have been referred to as class and sub-class parameters; class and sub-class selection parameters; sensor type ID and sensor cell ID parameters; or sensor type parameters and sensor cell parameters, respectively. For example, identifying a second class may refer to first, identifying the class parameter, and second, identifying that the parameter value refers to a second class, so that the logic circuit can generate output count values using the second class. Accordingly, a class may be a sensor ID whereby the logic circuit may be configured to identify/receive the sensor ID from the received sensor ID parameter. For example, a command and a transaction may be the same. For example, a command and a request may be the same. For example, a time period may also have been referred to as a time parameter. Also, in various examples a second (I2C) communication address encompasses both an initial or default second address and a different/new/temporary/re-configured second address, the latter sometimes simply referred to as different/new/temporary/re-configured address. If reference is made only to the second address without further context and without specifying that it is an initial/default or different/new/temporary/re-configured address, then the second address may be interpreted as encompassing both the default and different/new/temporary/re-configured address.

In several examples it is explained that the parameters upon which the logic circuit is to base its response may include a function and a value. It should be understood that the parameter function may identify the type of parameter. Other functions described in this disclosure include logic functions such as a calibration function, a class selection function, a sub-class selection function, a time function, a communication address setting function, etc. These logic functions may be embodied by one or a combination of dedicated hardware logic and a stored set of instructions, stored on a computer readable medium, to be executed by at least one processor. A parameter function may be configured to select a corresponding logic function. In an I2C-compatible embodiment, the function may be a register address. The value may set the value of the corresponding selected function.

As explained, in certain examples, the sensor 902, 1002, 2555 (as addressed in FIGS. 9, 10, 25, and 26) can be used to detect a pressure gauge, a pressure change, a reservoir wall strain and/or a reservoir wall deflection.

Certain example circuits of this disclosure relate to outputs that vary in a certain way in response to certain commands, events and/or states. It is also explained that, unless calibrated in advance, responses to these same events and/or states may be "clipped", for example so that they cannot be characterized or are not relatable to these commands, events and/or states. For these example circuits where the output needs to be calibrated to obtain the characterizable or relatable output, it should be understood that also before required calibration (or installation) occurred these circuits are in fact already "configured" to provide for the characterizable output, that is, all means are present to provide for the characterizable output, even where calibration is yet to occur. It may be a matter of choice to calibrate a logic circuit during manufacture and/or during customer installation and/or during printing, but this does not take away that the same circuit is already "configured" to function in the calibrated state.

For example, when sensors are mounted to a reservoir wall, certain strains in that wall over the lifetime of the component may vary and may be difficult to predict while at the same time these unpredictable strains affect the output of the logic circuit. Different other circumstances such as conductivity of the print material, different packaging, in-assembly-line-mounting, etc. may also influence how the logic circuit responds to commands/events/states so that a choice may be made to calibrate at or after a first customer installation. In any of these and other examples, it is advantageous to determine (operational) calibration parameters in-situ, after first customer installation and/or between print jobs, whereby, again, these should be considered as already adapted to function in a calibrated state. Certain alternative (at least partly) "virtual" embodiments discussed in this disclosure may operate with LUTs or algorithms, which may similarly generate, before calibration or installation, clipped values, and after calibration or installation, characterizable values whereby such alternative embodiment, should also be considered as already configured or adapted to provide for the characterizable output, even before calibration/installation.

In one example, the logic circuitry package outputs count values in response to read requests. In many examples, the output of count values is discussed. In certain examples, each separate count value is output in response to each read request. In another example, a logic circuit is configured to output a series or plurality of count values in response to a single read request, for example, based on a series of pre-selected sub-classes or a complete cell array. In other examples, output may be generated without a read request.

Each of the logic circuitry packages 400a-400d, 424, 502, 602, 1001, 2501 described herein may have any feature of any other logic circuitry packages 400a-400d, 424, 502, 602, 1001, 2501 described herein (including processing circuitry 424 or sensor circuitry package 1001). Any logic circuitry packages 400a-400d, 424, 502, 602, 1001, 2501 (including processing circuitries or sensor circuitry packages) may be configured to carry out at least one method block of the methods described herein. Any first logic circuit may have any attribute of any second logic circuit, and vice versa.

Examples in the present disclosure can be provided as methods, systems or machine readable instructions, such as any combination of software, hardware, firmware or the like. Such machine readable instructions may be included on a machine readable storage medium (including but not limited to EEPROM, PROM, flash memory, disc storage, CD-ROM, optical storage, etc.) having machine readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that at least some blocks in the flow charts and block diagrams, as well as combinations thereof can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry may execute the machine readable instructions. Thus, functional modules of the apparatus and devices (for example, logic circuitry and/or controllers) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array, etc. The methods and functional modules may all be performed by a single processor or divided amongst several processors.

Such machine readable instructions may also be stored in a machine readable storage (e.g., a tangible machine readable medium) that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

The word "comprising" does not exclude the presence of elements other than those listed in a claim, "a" or "an" does not exclude a plurality, and a single processor or other unit may fulfill the functions of several units recited in the claims.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A logic circuitry package for a replaceable print apparatus component comprising an interface to communicate with a print apparatus logic circuit, and at least one logic circuit configured to:
    transmit, via the interface, a sensor ID parameter and a limit parameter, the sensor ID parameter indicating a first sensor ID;
    receive, via the interface, a first request corresponding to the first sensor ID with the component connected to the apparatus and the apparatus not pneumatically actuating the component;
    transmit, via the interface, a first digital value in response to the first request;
    receive, via the interface, a second request corresponding to the first sensor ID with the component connected to the apparatus and the apparatus pneumatically actuating the component; and
    transmit, via the interface, a second digital value in response to the second request,
    wherein a difference between the first digital value and the second digital value is greater than the limit parameter.

2. The logic circuitry package of claim 1, wherein the at least one logic circuit is configured to:
    receive, via the interface, a first calibration parameter; and
    transmit the first digital value in response to the first request and the second digital value in response to the second request.

3. The logic circuitry package of claim 2, wherein the at least one logic circuit is configured to:
    receive, via the interface, different calibration parameters including the first calibration parameter; and
    transmit the first digital value in response to the first calibration parameter.

4. The logic circuitry package of claim 3, wherein the at least one logic circuit is configured to:
    transmit different digital values in response to the respective different calibration parameters.

5. The logic circuitry package of claim 4, wherein the different digital values include the first digital value and at least one different digital value clipped at the end of a range defined by a natural number of bytes.

6. The logic circuitry package of claim 1, wherein the at least one logic circuit is configured to transmit the sensor ID parameter and the limit parameter in response to a request to a first default address of the logic circuitry package and to transmit the first and second digital values in response to the first and second requests to a second default address and/or a reconfigured address of the logic circuitry package.

7. The logic circuitry package of claim 1, wherein the at least one logic circuit is configured to:
    identify a plurality of different sensor IDs; and
    upon receiving a request corresponding to one of the plurality of sensor IDs, transmit, via the interface, a digital value in response to the request based on a sensor signal from one of the following:
        a single sensor for the plurality of sensor IDs, or
        a respective sensor cell of a plurality of sensor cells where each sensor cell of the plurality of sensor cells corresponds to a respective sensor ID of the plurality of sensor IDs.

8. The logic circuitry package of claim 1, wherein the at least one logic circuit is configured to:
    receive, via the interface, a third request corresponding to the first sensor ID with the component connected to the apparatus and the apparatus not pneumatically actuating the component; and
    transmit, via the interface, a third digital value in response to the third request,
    wherein a difference between the first digital value and the third digital value is less than or equal to the limit parameter.

9. The logic circuitry package of claim 8, wherein the at least one logic circuit is configured to, with the logic circuitry package mounted to the component and with the component connected to the apparatus and the apparatus not pneumatically actuating the component, output the first and/or third digital value at an internal reservoir pressure of the component of approximately 0 kPa gauge pressure or less.

10. The logic circuitry package of claim 1, wherein the at least one logic circuit comprises a memory storing the sensor ID parameter and the limit parameter, wherein the memory stores digitally signed data comprising the sensor ID parameter and the limit parameter.

11. The logic circuitry package of claim 1, wherein the at least one logic circuit is configured to:
    receive, via the interface, a fourth request corresponding to a second sensor ID with the component connected to the apparatus and the apparatus not pneumatically actuating the component;
    transmit, via the interface, a resting state digital value in response to the fourth request;
    receive, via the interface, a fifth request corresponding to the second sensor ID with the component connected to the apparatus and the apparatus pneumatically actuating the component; and
    transmit, via the interface, a fifth digital value in response to the fifth request, wherein a difference between the resting state digital value and the fifth digital value is greater than the limit parameter.

12. The logic circuitry package of claim 2, wherein the at least one logic circuit is configured to:
receive, via the interface, the first calibration parameter; and
transmit the resting state digital value in response to the fourth request and the fifth digital value in response to the fifth request.

13. The logic circuitry package of claim 1, wherein the at least one logic circuit comprises a memory storing the sensor ID parameter, a step parameter, and a step number parameter, and the at least one logic circuit is configured to:
transmit, via the interface, the sensor ID parameter, the step parameter, and the step number parameter to instruct the print apparatus logic circuit which further sensor IDs to address in further requests based on the stored sensor ID parameter, the step parameter, and the step number parameter whereby the step number parameter corresponds to a number of different sensor IDs and the step parameter corresponds to the step between subsequent sensor IDs;
receive, via the interface, first further requests corresponding to the different sensor IDs with the component connected to the apparatus and the apparatus not pneumatically actuating the component;
transmit, via the interface, respective resting state digital values in response to the first further requests;
receive, via the interface, second further requests corresponding to the different sensor IDs with the component connected to the apparatus and the apparatus pneumatically actuating the component; and
transmit, via the interface, digital values in response to the second further requests wherein for the majority of the digital values a difference between the digital value and the corresponding resting state digital value is greater than the limit parameter.

14. The logic circuitry package of claim 13, wherein the at least one logic circuit is configured to:
receive, via the interface, third further requests corresponding to the different sensor IDs with the component connected to the apparatus and the apparatus not pneumatically actuating the component; and
transmit, via the interface, further digital values in response to the third further requests wherein for the majority of these further digital values a difference between the further digital value and the corresponding resting state digital value is less than or equal to the limit parameter.

15. The logic circuitry package of claim 14, wherein the at least one logic circuit comprises a memory storing the sensor ID parameter, the limit parameter, the step parameter, and a step number parameter.

16. The logic circuitry package of claim 15, wherein the memory stores digitally signed data comprising the sensor ID parameter, the limit parameter, the step parameter, and the step number parameter.

17. The logic circuitry package of claim 2, wherein the at least one logic circuit is configured to:
receive, via the interface, the first calibration parameter; and
transmit said digital values in response to said requests.

18. The logic circuitry package of claim 15, wherein the at least one logic circuit is configured to:
transmit, via the interface, the step number parameter to receive, via the interface, further requests corresponding to further sensor IDs based on the sensor ID parameter, the step parameter, and the step number parameter; and
transmit, via the interface, further digital values in response to the further requests.

19. The logic circuitry package of claim 15, wherein the at least one logic circuit is configured to:
repeat the following while further requests to read a sensor ID are received:
receive, via the interface, a further request to read a sensor ID based on the sensor ID parameter and the step parameter; and
transmit, via the interface, a further digital value in response to the further request.

20. The logic circuitry package of claim 1, wherein the at least one logic circuit is configured to:
receive, via the interface, initial requests to read sensor IDs with the component connected to the apparatus and the apparatus not pneumatically actuating the component, and
transmit, via the interface, a resting state digital value in response to each initial request.

21. The logic circuitry package of claim 20, wherein the at least one logic circuit is configured to:
transmit, via the interface, a count threshold parameter;
receive, via the interface, further requests to read sensor IDs with the component connected to the apparatus and the apparatus pneumatically actuating the component; and
transmit, via the interface, a further digital value in response to each further request,
wherein a pass count is the count of further digital values where a difference between each respective further digital value and corresponding resting state digital value is greater than the limit parameter, and
wherein the further digital values and the count threshold parameter are such that the pass count divided by the total number of transmitted further digital values and multiplied by a predetermined scaling factor returns a value that is equal to or greater than the count threshold parameter.

22. A replaceable print apparatus component comprising a print material reservoir with print material inside, a print material output, an air input, and a logic circuitry package, the logic circuitry package comprising a logic circuit, a sensor, and a memory storing a sensor ID parameter and a limit parameter, wherein the logic circuit is configured to:
receive a request including a sensor ID corresponding to the sensor ID parameter, in a resting state when no pneumatic pulse is being applied to the component, and output a digital value corresponding to a sensor signal from the sensor; and
receive a request including the sensor ID while a pneumatic pulse is being applied to the component, through the air input, to push print material in the print material reservoir out of the print material output, and output a further digital value corresponding to a sensor signal from the sensor;
wherein a difference between the digital value and the further digital value is greater than the limit parameter.

* * * * *